US011650851B2

(12) United States Patent
Palermo et al.

(10) Patent No.: US 11,650,851 B2
(45) Date of Patent: May 16, 2023

(54) EDGE SERVER CPU WITH DYNAMIC DETERMINISTIC SCALING

(71) Applicant: Intel Corporation, Santa Clara, CA (US)

(72) Inventors: Stephen T. Palermo, Chandler, AZ (US); Nikhil Gupta, Portland, OR (US); Vasudevan Srinivasan, Portland, OR (US); Christopher MacNamara, Limerick (IE); Sarita Maini, Santa Clara, CA (US); Abhishek Khade, Chandler, AZ (US); Edwin Verplanke, Chandler, AZ (US); Lokpraveen Mosur, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 556 days.

(21) Appl. No.: 16/678,888

(22) Filed: Nov. 8, 2019

(65) Prior Publication Data
US 2020/0125389 A1 Apr. 23, 2020

Related U.S. Application Data

(60) Provisional application No. 62/830,946, filed on Apr. 8, 2019, provisional application No. 62/827,494, filed on Apr. 1, 2019.

(51) Int. Cl.
*G06F 9/50* (2006.01)
*G06F 9/455* (2018.01)

(52) U.S. Cl.
CPC .......... *G06F 9/505* (2013.01); *G06F 9/45558* (2013.01); *G06F 9/5044* (2013.01);
(Continued)

(58) Field of Classification Search
CPC ............... G06F 9/45558; G06F 9/5044; G06F 2009/4557; G06F 2009/45595
See application file for complete search history.

(56) References Cited

U.S. PATENT DOCUMENTS

2009/0210741 A1* 8/2009 Yamaoka .............. G06F 9/5094
713/600
2013/0318379 A1* 11/2013 Seshadri ................. G06F 1/206
713/320

(Continued)

*Primary Examiner* — Jacob D Dascomb
(74) *Attorney, Agent, or Firm* — Schwegman Lundberg & Woessner, P.A.

(57) ABSTRACT

Methods, apparatus, systems and machine-readable storage media of an edge computing device using an edge server CPU with dynamic deterministic scaling is disclosed. A processing circuitry arrangement includes processing circuitry with processor cores operating at a center base frequency and memory. The memory includes instructions configuring the processing circuitry to configure a first set of the processor cores of the CPU to switch the operating at the center base frequency to operating at a first modified base frequency, and a second set of the processor cores to switch the operating at the center base frequency to operating at a second modified base frequency. A same processor core within the first set or the second set can be configured to switch operating between the first modified base frequency or the second modified base frequency.

25 Claims, 28 Drawing Sheets

(52) U.S. Cl.
CPC ............... *G06F 2009/4557* (2013.01); *G06F 2009/45595* (2013.01)

(56) References Cited

U.S. PATENT DOCUMENTS

| | | | |
|---|---|---|---|
| 2016/0259664 A1* | 9/2016 | Guan | G06F 9/45504 |
| 2016/0321112 A1* | 11/2016 | Iwashina | H04L 47/70 |
| 2017/0371692 A1* | 12/2017 | Connolly | G06F 9/45558 |
| 2019/0272002 A1* | 9/2019 | Seenappa | G06F 1/324 |
| 2020/0159303 A1* | 5/2020 | Van Cleve | G06F 1/324 |

* cited by examiner

EDGE SERVER CPU WITH DYNAMIC DETERMINISTIC SCALING

PRIORITY CLAIM

This application claims the benefit of priority to the following provisional applications:
U.S. Provisional Patent Application Ser. No. 62/827,494, filed Apr. 1, 2019, and titled "EDGE SERVER CPU WITH DYNAMIC DETERMINISTIC SCALING;" and
U.S. Provisional Patent Application Ser. No. 62/830,946, filed Apr. 8, 2019, and titled "EDGE SERVER CPU WITH DYNAMIC DETERMINISTIC SCALING."
Each of the above-listed provisional patent applications is incorporated herein by reference in its entirety.

TECHNICAL FIELD

Embodiments described herein generally relate to data processing, network communication, and communication system implementations, and in particular, to techniques for implementing an edge server central processing unit (CPU) supporting dynamic deterministic scaling of processor cores.

BACKGROUND

Edge computing, at a general level, refers to the transition of compute and storage resources closer to endpoint devices (e.g., consumer computing devices, user equipment, etc.) in order to optimize total cost of ownership, reduce application latency, improve service capabilities, and improve compliance with security or data privacy requirements. Edge computing may, in some scenarios, provide a cloud-like distributed service that offers orchestration and management for applications among many types of storage and compute resources. As a result, some implementations of edge computing have been referred to as the "edge cloud" or the "fog", as powerful computing resources previously available only in large remote data centers are moved closer to endpoints and made available for use by consumers at "edge" of the network.

Edge computing use cases in mobile network settings have been developed for integration with multi-access edge computing (MEC) approaches, also known as "mobile edge computing." MEC approaches are designed to allow application developers and content providers to access computing capabilities and an information technology (IT) service environment in dynamic mobile network settings at the edge of the network. Limited standards have been developed by the European Telecommunications Standards Institute (ETSI) industry specification group (ISG) in an attempt to define common interfaces for the operation of MEC systems, platforms, hosts, services, and applications.

Edge computing, MEC, and related technologies attempt to provide reduced latency, increased responsiveness, and more available computing power than offered in traditional cloud network services and wide area network connections. However, the integration of mobility and dynamically launched services to some mobile use and device processing use cases has led to limitations with orchestration, functional coordination, and resource management, especially in complex mobility settings where many participants (devices, hosts, tenants, service providers, operators) are involved. Edge computing, and MEC approaches, especially when used to provide mobile subscriber services, are typically limited to the amount of compute capacity and power limitations of the particular edge server. Mobile services including voice, data, and video are also subjected to latency and bandwidth requirements necessary to provide end user service quality. Scoping and sizing edge servers for a particular number of subscribers considering the uncertainty of what the actual services the mobile subscribers will be running also adds the challenge of right sizing solutions. In sum, more compute capacity while maintaining deterministic latency within a particular power envelope is addressed by this disclosure. Specifically, by allowing a group of CPU cores to run at a higher deterministic frequency without major power increases, allows for extra capacity to support bursts of mobile subscribers' services using the same Edge, MEC Server.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1A:
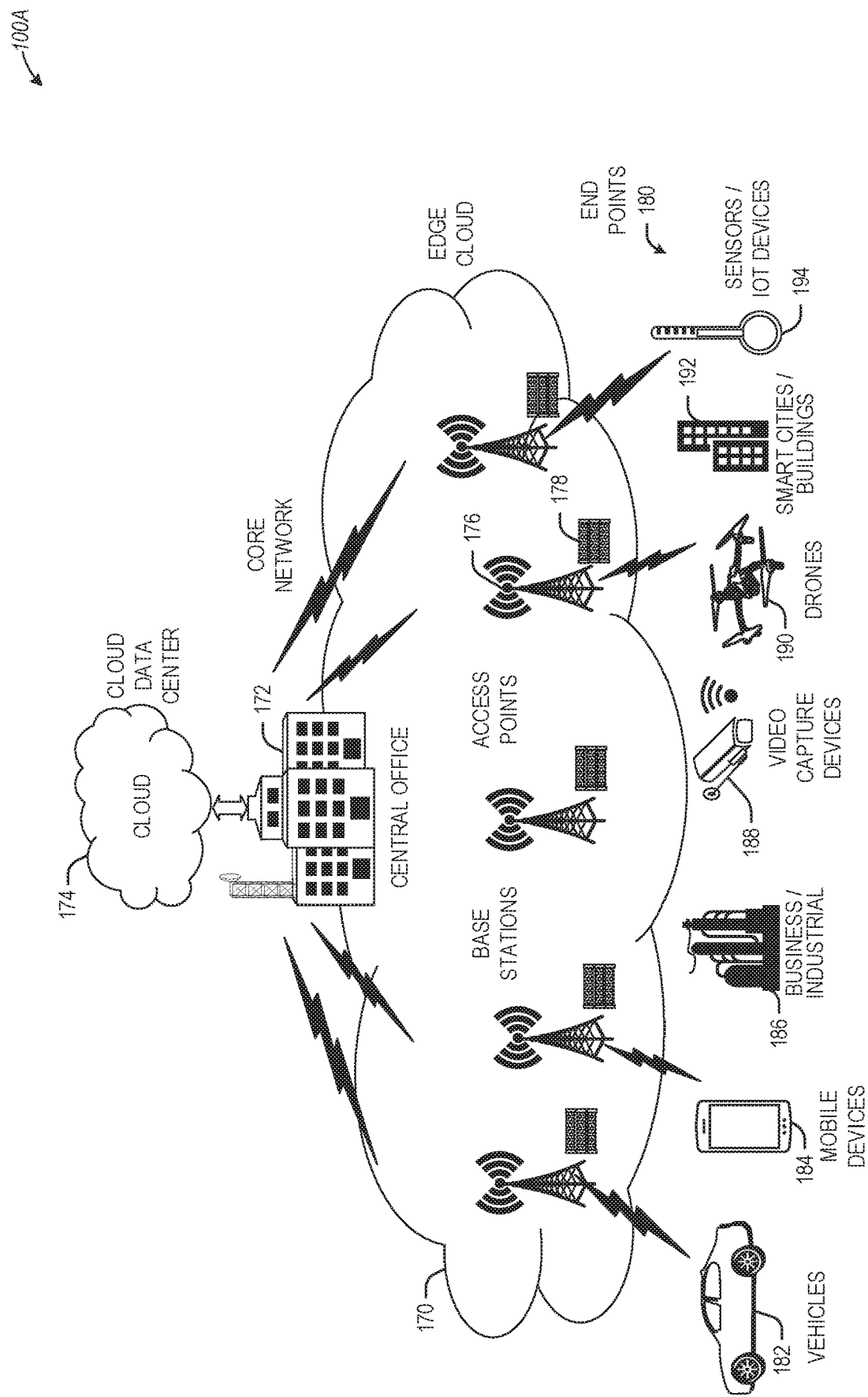
FIG. 1A illustrates an overview of an edge cloud configuration for edge computing, according to an example.

In the following description, methods, configurations, and related apparatuses are disclosed for an edge computing server CPU configured with dynamic deterministic scaling of processor core resources. These may benefit a variety of use cases, such as fifth-generation (5G) network communications among automotive devices, including those use cases termed as vehicle-to-vehicle (V2V), vehicle-to-infrastructure (V2I), and vehicle-to-everything (V2X). As with most edge computing and MEC installations, the goal with the present configurations is to bring the application endpoints as close to the vehicular environment, or other endpoints, as possible and to dynamically adjust compute resources as well as resources used by one or more network (e.g., 5G) slices, including resource usage accountability using blockchain traceability techniques, to enable low latency or high bandwidth services with optimal QoS. These systems and techniques may be implemented in, or augment, virtualized environments that may be implemented within various types of MEC, network function virtualization (NFV), Cloud-Native, or fully virtualized 5G network environments.

The present techniques and configurations may be utilized in connection with many aspects of current networking systems, but are provided with reference to IoT, MEC, and NFV deployments. The present techniques and configurations specifically may be (but are not required to be) relevant to the standards and approaches published in ETSI GS MEC-003 "Mobile Edge Computing (MEC); Framework and Reference Architecture" (e.g., V2.0.3); ETSI GS NFV-SEC 013 "Network Functions Virtualization (NFV) Release 3; Security; Security Management and Monitoring" (e.g., v. 3.1.1) and related MEC, NFV, or networked operational implementations. However, while the present techniques and configurations may provide significant benefits to MEC architectures and other IoT device network architectures, the applicability of the present techniques and configurations may be extended to any number of edge computing devices or fog computing platforms.

The following provides a detailed discussion of these techniques within specific systems and services, but which are applicable to the larger context of IoT, Fog network, and edge computing deployments. Further, the disclosed MEC architectures and service deployment examples provide one illustrative example of a Fog device or Fog system, but many other combinations and layouts of devices and systems located at the edge of a network may be provided. Further, the techniques disclosed herein may relate to other IoT and network communication standards and configurations, and other intermediate processing entities and architectures.

In some aspects, techniques disclosed herein can be used in connection with an edge server CPU capable of scaling processor core resources to provide flexible deterministic computing resources for communication service provider capacity, especially for evolving 5G architectures. 5G architectures, capacity planning, and standards are evolving. Communication Service providers (CoSPs) can be challenged with how much compute capacity to be placed at the edge and at the core. 5G will require low device latency (1-4 ms) and high device density (e.g., 1 million connected devices per square kilometer) supporting fixed and wireless devices.

Techniques disclosed herein include a workload-optimized edge server CPU containing a mechanism to support at least two groups (or sets) of cores with different guaranteed frequencies, and a method of orchestrating Communication Service Provider Applications (Virtual Network Functions or VNFs) necessary to provide the flexibility to address the issue of unclear 5G architecture capacity requirements. Service providers may use techniques disclosed herein to reduce the need to over-compensate because of unknown mobile subscriber needs and reduce network capacity dynamically for efficiency. More specifically, different sets of the same processor cores in the same CPU can be configured to operate at two (or more) different base frequencies (e.g., a high base frequency and a low base frequency), and NFV instances can be instantiated (e.g., using virtual resources) using the same processor cores in the same CPU operating at the low base frequency, the high base frequency, or the processor cores operating at both base frequencies. In this regard, the same processor core in the same CPU can scale to a deterministic performance level (i.e., a deterministic turbo) and can be configured to operate at different base frequency (e.g., low, high, or any other number of base frequencies).

For example, all processor cores of a CPU can initially be configured to operate at a center base frequency. In response to a request/command for multi-frequency core operation (e.g., to trigger one or more of the processor core management and configuration functionalities discussed herein), a first set of the processor cores (also referred to as "low priority cores") are configured to operate at a first modified base frequency and a second set of the processor cores (also referred to as "high priority cores") are configured to operate at a second modified base frequency (e.g., the first modified base frequency is lower than the center base frequency, and the second modified base frequency being higher than the center base frequency). Additionally, telemetry parameters (e.g., a number of active network subscribers that are currently in communication with a network host, minimal network resource requirements for an MEC app or virtual CPUs (e.g., for a virtual machine) executing an NFV instance as a virtual service, including minimum processor core requirements and processor core base frequency requirements, bandwidth use, and so forth) may be retrieved and may be used to pin (or assign) one or more of the low priority cores and/or high priority cores as virtual CPU cores for executing the MEC app or NFV instance. The use of the cores can be dynamically adjusted (e.g., execution of the instantiated NFV instance can be moved from high to low or vice versa) based on, e.g., utilization of a network service associated with the NFV as indicated by network traffic associated with the NFV, number of subscribers associated with the network service provided by the NFV, a number of processor cores used for executing the NFV, and so forth. In this regard, power utilization by the processor cores when functioning at the center base frequency may be approximately the same as when the high and low priority cores are activated, but the processing efficiency when the high and low priority cores are used is higher than when all cores operate at the center base frequency.

FIG. 1A is a block diagram 100A showing an overview of a configuration for edge computing, which includes a layer of processing referenced in many of the following examples as an "edge cloud". As shown, the edge cloud 170 is co-located at an edge location, such as the base station 176, a local processing hub 178, or a central office 172, and thus may include multiple entities, devices, and equipment instances. The edge cloud 170 is located much closer to the endpoint (consumer and producer) data sources 180 (e.g., autonomous vehicles 182, user equipment 184, business and industrial equipment 186, video capture devices 188, drones 190, smart cities and building devices 192, sensors and IoT devices 194, etc.) than the cloud data center 174. Compute, memory, and storage resources (including processor core resources using the core scaling techniques discussed herein) which are offered at the edges in the edge cloud 170 are critical to providing ultra-low latency response times for services and functions used by the endpoint data sources 180 as well as reduce network backhaul traffic from the edge cloud 170 toward cloud data center 174 thus improving energy consumption and overall network usages among other benefits.

Compute, memory, and storage are scarce resources, and generally, decrease depending on the edge location (e.g., fewer processing resources being available at consumer endpoint devices than at a base station or at a central office). However, the closer that the edge location is to the endpoint (e.g., UEs), the more that space and power are constrained. Thus, edge computing, as a general design principle, attempts to minimize the number of resources needed for network services, through the distribution of more resources which are located closer both geographically and in-network access time.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance); configurations based on the type of compute, memory, storage, fabric, acceleration, or like resources available to edge locations, tiers of locations, or groups of locations; the service, security, and management and orchestration capabilities; and related objectives to achieve usability and performance of end services.

Edge computing is a developing paradigm where computing is performed at or closer to the "edge" of a network, typically through the use of a compute platform implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with compute hardware that performs virtualized network functions and offers compute resources for the execution of services and consumer functions for connected devices. These and other scenarios may involve the use of coordinated acceleration, as provided in the discussion below.

Figure 1B:
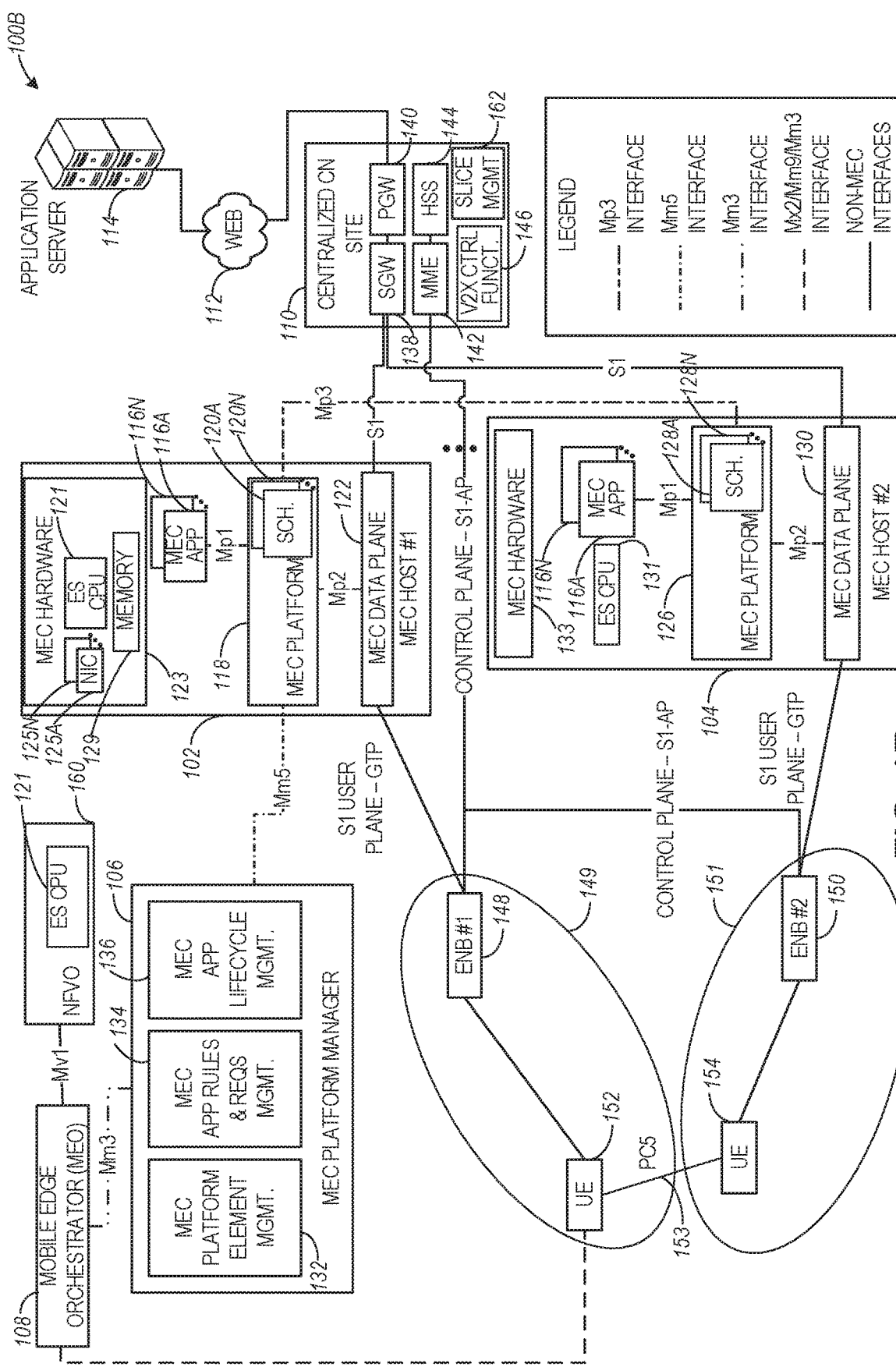
FIG. 1B illustrates a MEC communication infrastructure with a common core network, the MEC infrastructure using one or more edge server CPUs with dynamic deterministic scaling, according to an example.

FIG. 1B illustrates a MEC communication infrastructure with a common core network, the MEC infrastructure using one or more edge server CPUs with dynamic deterministic scaling, according to an example. The connections represented by some form of a dashed line (as noted in the legend in FIG. 1B) may be defined according to a specification from an ETSI MEC standards family.

The MEC communication infrastructure 100B can include entities from a MEC-based architecture as well as entities from a third-generation partnership project (3GPP) based architecture. For example, the MEC communication infrastructure 100B can include a plurality of MEC hosts such as MEC hosts 102 and 104, a MEC platform manager 106, and a MEC orchestrator 108. The 3GPP based entities can include a centralized core network (CN) 110 coupled to an application server 114 via the network 112 (e.g., the Internet), as well as radio access networks (RANs) represented by base stations 148 and 150 coupled to corresponding user equipments (UEs) 152 and 154. The base stations 148 and 150 can include evolved Node-Bs (eNBs), Next Generation Node-Bs (gNBs), or other types of base stations operating in connection with a 3GPP wireless family of standards or another type of wireless standard.

In some aspects, the MEC communication infrastructure 100B can be implemented by different network operators in the same country and/or in different countries, using different network traffic types. For example, the radio access network associated with base station 148 (with a coverage area 149) can be within a first public land mobile network (PLMN) (i.e., associated with a first mobile services provider or operator and a first network traffic type), and base station 150 (with a coverage area 151) can be within a second public land mobile network (PLMN) (i.e., associated with a second mobile services provider or operator and a second network traffic type). As used herein, the terms "mobile services provider" and "mobile services operator" are interchangeable.

In this regard, the MEC communication infrastructure 100B can be associated with a multi-operator scenario composed of two coverage areas 149 and 151 where communication services (e.g., V2X services) can be provided, with each coverage area being operated by a mobile services operator. Additionally, each of the UEs 152 and 154 can be configured for network slice operation, where each UE can use one or more types of network slices configured by, e.g., the core network 110 using the slice management functionality 162 in coordination with one or more entities of the MEC communication infrastructure 100B.

The solid line connections in FIG. 1B represent non-MEC connections, such as utilizing 3GPP cellular network connections S1, S1-AP, etc. Other connection techniques (e.g., protocols) and connections may also be used. Accordingly, in the scenario of FIG. 1B, the system entities (e.g., MEC orchestrator 108, MEC platform manager 106, MEC hosts 102, 104 are connected by MEC (or NFV) logical links (indicated with dashed lines), in addition to network infrastructure links (e.g., a 5G Long Term Evolution (LTE) network, such as provided among UEs 152, 154, eNBs 148, 150, a CN site 110, etc.) (indicated with solid lines). A further connection to cloud services (e.g., an application server 114 access via the network 112) may also be connected via backhaul network infrastructure links.

Techniques disclosed herein apply to 2G/3G/4G/LTE/ LTE-A (LTE Advanced) and 5G networks, with the examples and aspects disclosed using 4G/LTE networks. In aspects, the CN 110 may be an evolved packet core (EPC) network, a NextGen Packet Core (NPC) network (e.g., a 5G network), or some other type of CN (e.g., as illustrated in reference to FIGS. 2A-3E). In an EPC (Evolved Packet Core, or distributed EPC), which is associated with 4G/LTE, the CN 110 can include a serving gateway (S-GW or SGW) 138, a packet data network (PDN) gateway (P-GW or PGW) 140, a mobility management entity (MME) 142, and a home subscriber server (HSS) 144 coupled to a V2X control function 146. In 5G, the Core Network is referred to as the NextGen Packet Network (NPC). In NPC (and as illustrated in FIGS. 3A-3D), the S/P-GW is replaced with a user plane function (UPF), and the MME is replaced with two individual functional components, the Access Management Function (AMF) and the Session Management Function (SMF). The 4G HSS is split into different entities in 5G: the Authentication Server Function (AUSF) and the Universal Data Management (UDM), with the subscription data being managed via the Universal Data Management (UDM) function. In EPC, the S1 interface can be split into two parts: the S1-U (user plane) interface which carries traffic data between the eNBs 148, 150 and the S-GW 138 via the MEC hosts 102, 104, and the S1-AP (control plane) interface which is a signaling interface between the eNBs 148, 150 and the MME 142.

The MME 142 may be similar in function to the control plane of legacy Serving General Packet Radio Service (GPRS) Support Nodes (SGSN). The MMIE 142 may manage mobility aspects in access such as gateway selection and tracking area list management. The HSS 144 may comprise a database for network users, including subscription-related information to support the network entities' handling of communication sessions, including subscription information associated with V2X communications. The CN 110 may comprise one or several HSSs 144, depending on the number of mobile subscribers, on the capacity of the equipment, on the organization of the network, etc. For example, the HSS 144 can provide support for routing/ roaming, authentication, authorization (e.g., V2X communication authorization), naming/addressing resolution, location dependencies, etc.

The S-GW 138 may terminate the S1 interface 413 towards the RANs of eNBs 148, 150, and route data packets between the RANs and the CN 110. In addition, the S-GW 138 may be a local mobility anchor point for inter-RAN node handovers and also may provide an anchor for inter-3GPP mobility. Other responsibilities may include charging and some policy enforcement.

The P-GW 140 may terminate an SGi interface toward a PDN. The P-GW 140 may route data packets between the RANs and external networks such as a network including the application server (AS) 114 (alternatively referred to as application function (AF)) via an Internet Protocol (IP) interface (e.g., an interface to the network 112 coupled to the AS 114. The P-GW 140 can also communicate data to other external networks, which can include the Internet, IP multimedia subsystem (IPS) network, and other networks. Generally, the application server 114 may be an element offering applications that use IP bearer resources with the core network (e.g., UMTS Packet Services (PS) domain, LTE PS data services, etc.). The application server 114 can also be configured to support one or more communication services (e.g., Voice-over-Internet Protocol (VoIP) sessions, PTT sessions, group communication sessions, social networking services, etc.) for the UEs 152, 154 via the CN 110 and one or more of the MEC hosts 102, 104.

The P-GW 140 may further include a node for policy enforcement and charging data collection. A Policy and Charging Enforcement Function (PCRF) (not illustrated in FIG. 1B) can be the policy and charging control element of the CN 110. In a non-roaming scenario, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF may be communicatively coupled to the application server 114 via the P-GW 140. The application server 114 may signal the PCRF to indicate a new service flow and select the appropriate Quality of Service (QoS) and charging parameters.

The V2X control function 146 is used in connection with authorizing UEs to use V2X services based on HSS information (e.g., subscription information managed by the HSS 144), assist one or more UEs in obtaining the network address of an application server (e.g., 114) or a V2X application server, as well as providing V2X configuration parameters for direct communication (i.e., device-to-device communications). The interface for direct device-to-device communication is referred to as PC5. The PC5 parameters may be provided by the V2X control function 146 to one or more UEs for purposes of configuring V2X communication between the UEs.

The slice management function 162 can be used for configuring one or more network slices (e.g., 5G slices) for use by UEs or other devices within the communication architecture 100B.

The MEC hosts 102, . . . , 104 can be configured in accordance with the ETSI GS MEC-003 specification. The MEC host 102 can include a MEC platform 118, which can be coupled to one or more MEC applications (apps) such as MEC apps 116A, . . . , 116N (collectively, MEC app 116) and to MEC data plane 122. The MEC host 104 can include an MEC platform 126, which can be coupled to a MEC app 116 and MEC data plane 130. The MEC platform manager 106 can include a MEC platform element management module 132, MEC application rules and requirements management module 134, and MEC application lifecycle management module 136. The MEC host 102 also includes MEC hardware 123, such as network interfaces (e.g. network interface cards or NICs) 125A, . . . , 125N, one or more CPUs such as the edge server CPU 121, and memory 129. Additional description of the MEC related entities 102, 104, 106, and 108 are provided hereinbelow in connection with FIG. 4A.

In some aspects, the MEC apps 116A, . . . , 116N can each provide an NFV instance configured to process network connections associated with a specific network traffic type (e.g., 2G, 3G, 4G, 5G or another network traffic type). In this regard, the terms "MEC app" and "NFV" (or "MEC NFV") are used interchangeably. Additionally, the term "NFV" and "NFV instance" are used interchangeably. The MEC platform 118 can further include one or more schedulers 120A, . . . , 120N (collectively, a scheduler 120). Each of the schedulers 120A, . . . , 120N may comprise suitable circuitry, logic, interfaces, and/or code and is configured to manage instantiation of NFVs 116A, . . . , 116N (collectively, an NFV 116). More specifically, a scheduler 120 can select a CPU (e.g., one of the CPUs 121) and/or other network resources for executing/instantiating the NFV 116. Additionally, since each of the NFVs 116A, . . . , 16N is associated with processing a different network traffic type, the scheduler 120 can further select a NIC (e.g., from the available NICs 125A, . . . , 125N) for use by the NFV 116. Each of the schedulers 120A, . . . , 120N can have a different type of SLA and QoS requirements, based on the network traffic type handled by the associated NFV. For example, each traffic type (e.g., 2G, 3G, 4G, 5G, or any other type of wireless connection to the MEC host) has an associated class of service (CloS) (e.g., 2G_low, 2G_mid, 2G_high, etc.) which can be preconfigured in the MEC host, defining CloS-specific resource requirements (i.e., I/O, memory, processing power, etc.) for different loads of that particular traffic type.

FIG. 1B further illustrates MEC host 104 including MEC hardware 133, edge server CPU 131 (which can be part of the hardware 133), and schedulers 128A, . . . , 128N, which can have the same functionality as MEC hardware 123, edge server CPU 121, and schedulers 120A, . . . , 120N described in connection with MEC host 102.

In some aspects, the MEC architecture 100B (or any of the MEC architectures discussed herein) can be configured to provide functionalities in accordance with the ETSI GS MEC-003 specification and/or the ETSI GR MEC-017 specification.

In some aspects, the MEC architecture 100B can use network resources with an edge server CPU (such as the edge server CPU 121) that is configured for dynamic deterministic scaling of processing resources, such as processor cores. For example, the edge server CPU 121 can be used by one or more network nodes within the MEC architecture 100B, including MEC hosts (such as 102 and 104) or network nodes used for running the MEO 108, the NFVO 160, the MEC platform manager 106, or other network nodes associated with communication traffic between the UEs and one or more other entities of the MEC architecture 100B. Functionalities of the edge server CPU 121 are further discussed hereinbelow in reference to FIG. 11-FIG. 20.

Figure 2A:
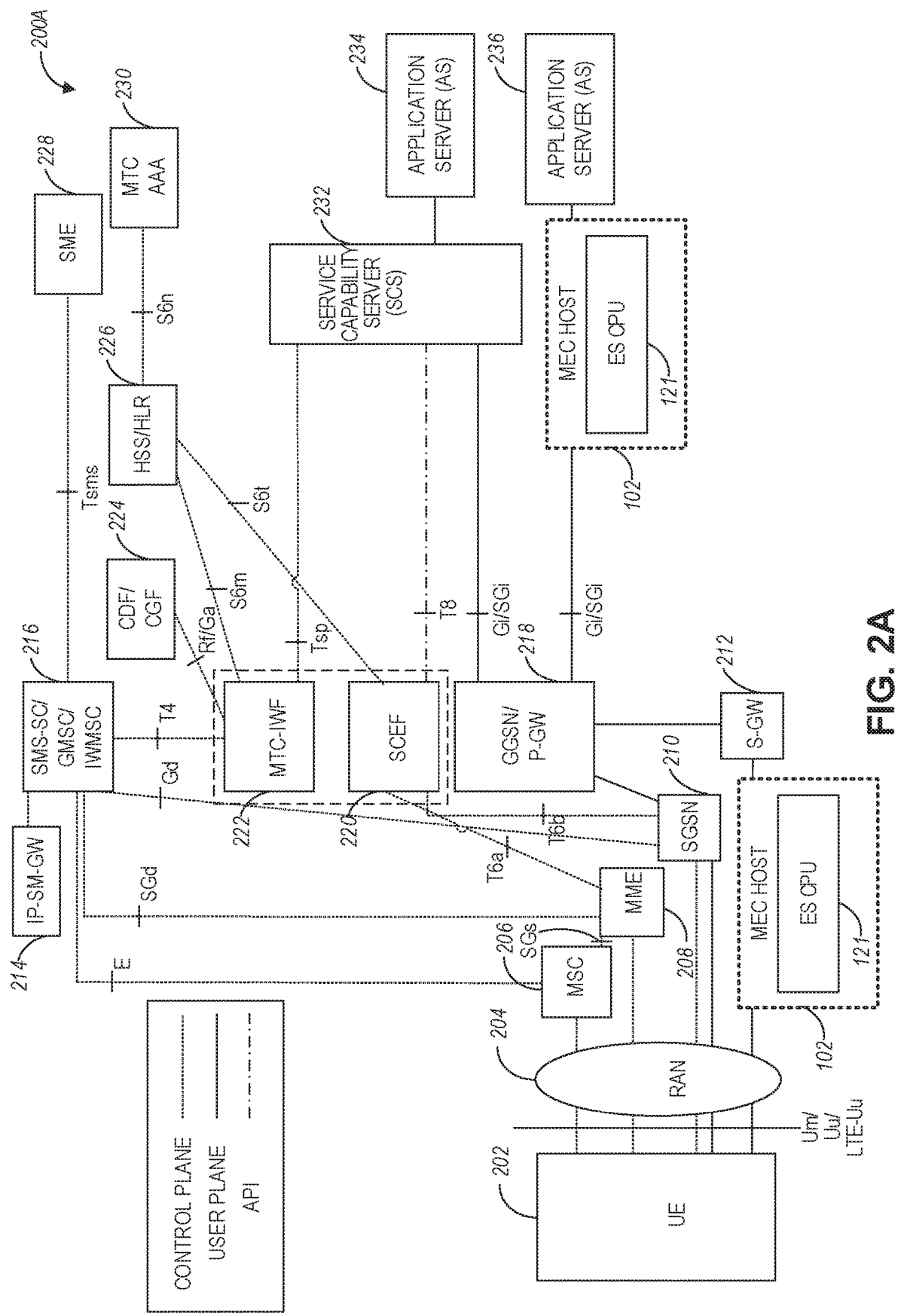
FIG. 2A illustrates an example Cellular Internet-of-Things (CIoT) network architecture with a MEC host using an edge server CPU with dynamic deterministic scaling, according to an example.

FIG. 2A illustrates an example Cellular Internet-of-Things (CIoT) network architecture with a MEC host using an edge server CPU with dynamic deterministic scaling, according to an example. Referring to FIG. 2A, the CIoT architecture 200A can include the UE 202 and the RAN 204 coupled to a plurality of core network entities. In some aspects, the UE 202 can be a machine-type communication (MTC) UE. The CIoT network architecture 200A can further include a mobile services switching center (MSC) 206, MME 208, a serving GPRS support node (SGSN) 210, a S-GW 212, an IP-Short-Message-Gateway (IP-SM-GW) 214, a Short Message Service-Service Center (SMS-SC)/gateway mobile service center (GMSC)/Interworking MSC (IWMSC) 216, MTC interworking function (MTC-IWF) 222, a Service Capability Exposure Function (SCEF) 220, a gateway GPRS support node (GGSN)/Packet-GW (P-GW) 218, a charging data function (CDF)/charging gateway function (CGF) 224, a home subscriber server (HSS)/a home location register (HLR) 226, short message entities (SME) 228, MTC authorization, authentication, and accounting (MTC AAA) server 230, a service capability server (SCS) 232, and application servers (AS) 234 and 236. In some aspects, the SCEF 220 can be configured to securely expose services and capabilities provided by various 3GPP network interfaces. The SCEF 220 can also provide means for the discovery of the exposed services and capabilities, as well as access to network capabilities through various network application programming interfaces (e.g., API interfaces to the SCS 232).

FIG. 2A further illustrates various reference points between different servers, functions, or communication nodes of the CIoT network architecture 200A. Some example reference points related to MTC-IWF 222 and SCEF 220 include the following: Tsms (a reference point used by an entity outside the 3GPP network to communicate with UEs used for MTC via SMS), Tsp (a reference point used by a SCS to communicate with the MTC-IWF related control plane signaling), T4 (a reference point used between MTC-IWF 222 and the SMS-SC 216 in the HPLMN), T6a (a reference point used between SCEF 220 and serving MME 208), T6b (a reference point used between SCEF 220 and serving SGSN 210), T8 (a reference point used between the SCEF 220 and the SCS/AS 234, 236), S6m (a reference point used by MTC-IWF 222 to interrogate HSS/HLR 226), S6n (a reference point used by MTC-AAA server 230 to interrogate HSS/HLR 226), and S6t (a reference point used between SCEF 220 and HSS/HLR 226).

In some aspects, the UE 202 can be configured to communicate with one or more entities within the CIoT architecture 200A via the RAN 204 (e.g., CIoT RAN) according to a Non-Access Stratum (NAS) protocol, and using one or more radio access configuration, such as a narrowband air interface, for example, based on one or more communication technologies, such as Orthogonal Frequency-Division Multiplexing (OFDM) technology. As used herein, the term "CIoT UE" refers to a UE capable of CIoT optimizations, as part of a CIoT communications architecture. In some aspects, the NAS protocol can support a set of NAS messages for communication between the UE 202 and an Evolved Packet System (EPS) Mobile Management Entity (MME) 208 and SGSN 210. In some aspects, the CIoT network architecture 200A can include a packet data network, an operator network, or a cloud service network, having, for example, among other things, servers such as the Service Capability Server (SCS) 232, the AS 234, or one or more other external servers or network components.

The RAN 204 can be coupled to the HSS/HLR servers 226 and the AAA servers 230 using one or more reference points including, for example, an air interface based on an S6a reference point, and configured to authenticate/authorize CIoT UE 202 to access the CIoT network. The RAN 204 can be coupled to the CIoT network architecture 200A using one or more other reference points including, for example, an air interface corresponding to an SGi/Gi interface for 3GPP accesses. The RAN 204 can be coupled to the SCEF 220 using, for example, an air interface based on a T6a/T6b reference point, for service capability exposure. In some aspects, the SCEF 220 may act as an API GW towards a third-party application server such as server 234. The SCEF 220 can be coupled to the HSS/HLR 226 and MTC AAA 230 servers using an S6t reference point and can further expose an Application Programming Interface to network capabilities.

In certain examples, one or more of the CIoT devices disclosed herein, such as the UE 202, the RAN 204, etc., can include one or more other non-CIoT devices, or non-CIoT devices acting as CIoT devices, or having functions of a CIoT device. For example, the UE 202 can include a smartphone, a tablet computer, or one or more other electronic device acting as a CIoT device for a specific function, while having other additional functionality. In some aspects, the RAN 204 can include a CIoT enhanced Node B (CIoT eNB) communicatively coupled to a CIoT Access Network Gateway (CIoT GW). In certain examples, the RAN 204 can include multiple base stations (e.g., CIoT eNBs or other types of base stations) connected to the CIoT GW, which can include MSC 206, MME 208, SGSN 210, or S-GW 212. In certain examples, the internal architecture of RAN 204 and the CIoT GW may be left to the implementation and need not be standardized.

In some aspects, the CIoT architecture 200A can include one or more MEC hosts that can provide a communication link between different components of the CIoT architecture. For example, MEC host 102 can be coupled between the RAN 204 and the S-GW 212. In this case, the MEC host 102 can use one or more NFV instances to process wireless connections with the RAN 204 and the S-GW 212. The MEC host 102 can also be coupled between the P-GW 218 and the application server 236. In this case, the MEC host 102 can use the one or more NFV instances to process wireless connections originating from or terminating at the P-GW 218 and the application server 236. In some aspects, the MEC host 102 includes an edge server CPU 121, which is configured according to techniques disclosed herein to provide dynamic deterministic scaling of processor resources (e.g., processor cores).

Figure 2B:
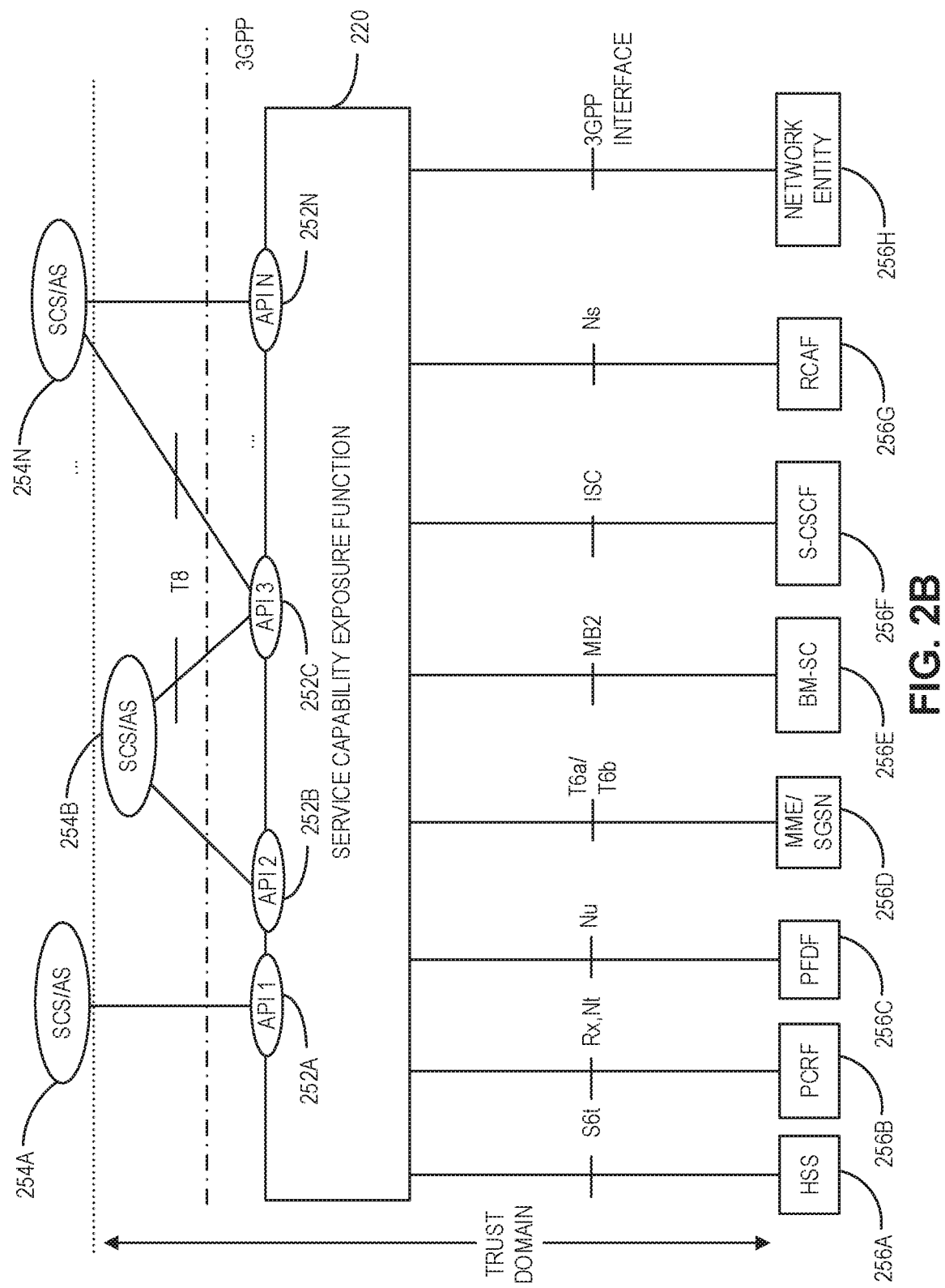
FIG. 2B illustrates an example Service Capability Exposure Function (SCEF) used by the CIoT network architecture of FIG. 2B, according to an example.

FIG. 2B illustrates an example Service Capability Exposure Function (SCEF) used by the CIoT network architecture of FIG. 2B, according to an example. Referring to FIG. 2B, the SCEF 220 can be configured to expose services and capabilities provided by 3GPP network interfaces to external third-party service provider servers hosting various applications. In some aspects, a 3GPP network such as the CIoT architecture 200A, can expose the following services and capabilities: a home subscriber server (HSS) 256A, a policy and charging rules function (PCRF) 256B, a packet flow description function (PFDF) 256C, a MME/SGSN 256D, a broadcast multicast service center (BM-SC) 256E, a serving call server control function (S-CSCF) 256F, a RAN congestion awareness function (RCAF) 256G, and one or more other network entities 256H. The above-mentioned services and capabilities of a 3GPP network can communicate with the SCEF 220 via one or more interfaces as illustrated in FIG. 2B. The SCEF 220 can be configured to expose the 3GPP network services and capabilities to one or more applications running on one or more service capability server (SCS)/application server (AS), such as SCS/AS 254A, 254B, ..., 254N. Each of the SCS/AS 254A-254N can communicate with the SCEF 220 via application programming interfaces (APIs) 252A, 252B, 252C, ..., 252N, as seen in FIG. 2B.

Figure 3A:
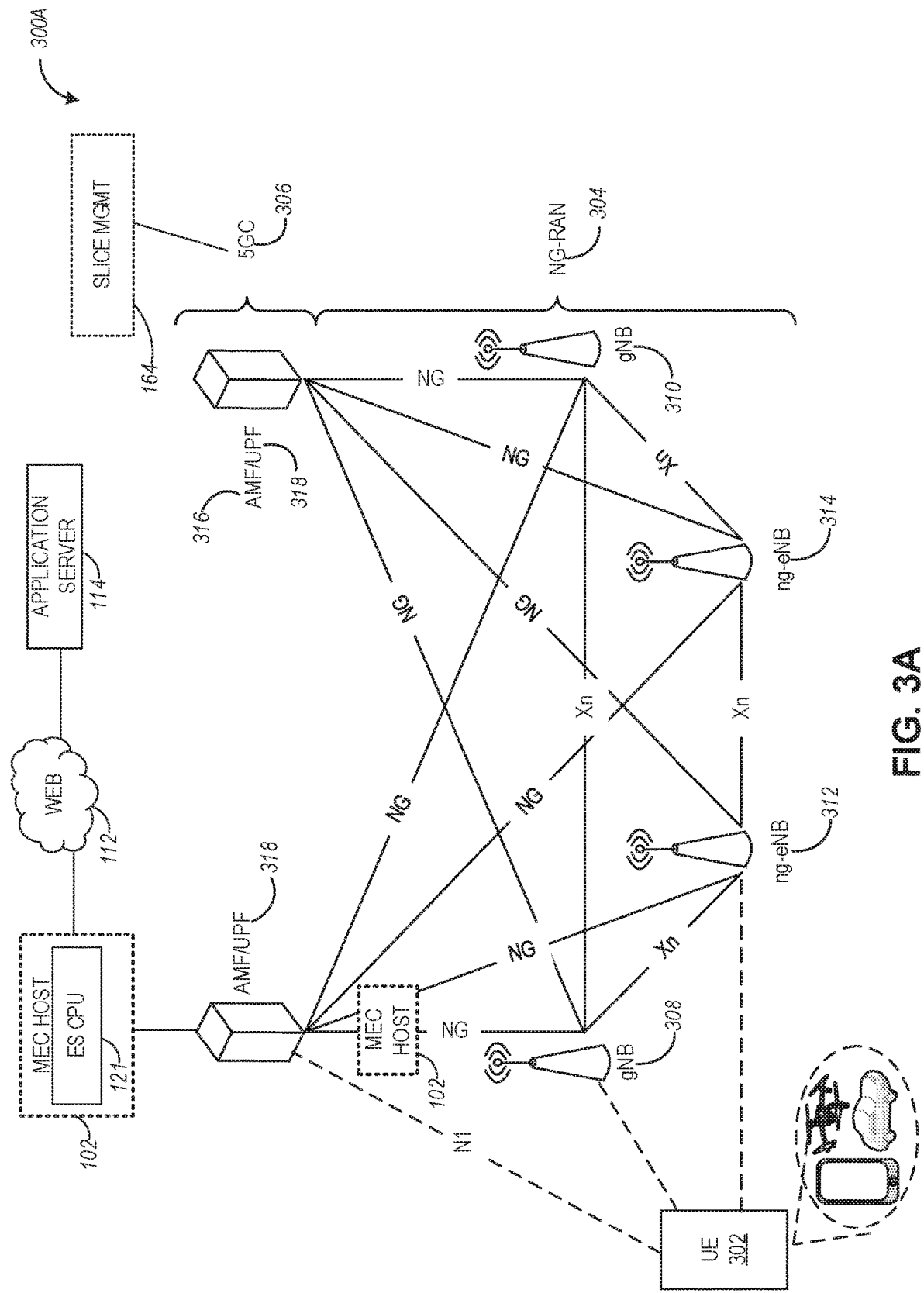
FIG. 3A is a simplified diagram of an example Next-Generation (NG) system architecture with a MEC host using an edge server CPU with dynamic deterministic scaling, according to an example.

FIG. 3A is a simplified diagram of an example Next-Generation (NG) system architecture with a MEC host using an edge server CPU with dynamic deterministic scaling, according to an example. Referring to FIG. 3A, the NG system architecture 300A includes NG-RAN 304 and a 5G network core (5GC) 306. The NG-RAN 304 can include a plurality of NG-RAN nodes, for example, gNBs 308 and 310, and NG-eNBs 312 and 314. The gNBs 308/310 and the NG-eNBs 312/314 can be communicatively coupled to the UE 302 via a wireless connection. The core network 306 (e.g., a 5G core network or 5GC) can include an access and mobility management function (AMF) 316 or a user plane function (UPF) 318. The AMF 316 and the UPF 318 can be communicatively coupled to the gNBs 308/310 and the NG-eNBs 312/314 via NG interfaces. More specifically, in some aspects, the gNBs 308/310 and the NG-eNBs 312/314 can be connected to the AMF 316 by N2 interface, and to the UPF 318 by N3 interface. The gNBs 308/310 and the NG-eNBs 312/314 can be coupled to each other via Xn interfaces.

In some aspects, a gNB 308 can include a node providing New Radio (NR) user plane and control plane protocol termination towards the UE and can be connected via the NG interface to the 5GC 306. In some aspects, an NG-eNB 312/314 can include a node providing evolved universal terrestrial radio access (E-UTRA) user plane and control plane protocol terminations towards the UE and is connected via the NG interface to the 5GC 306. In some aspects, any of the gNBs 308/310 and the NG-eNBs 312/314 can be implemented as a base station (BS), a mobile edge server, a small cell, a home eNB, although aspects are not so limited.

In some aspects, the NG system architecture 300A can include one or more MEC hosts that can provide a communication link between different components of the NG architecture. For example, MEC host 102 can provide an interface between the AMF 316 (or UPF 318) in the 5GC 306 and the application server 114. The MEC host 102 can use one or more NFV instances to process wireless connections with the 5GC 306 and the application server 114. The MEC host 102 can also be coupled between one or more of the gNBs (e.g., gNB 308) and the AMF/UPF in the 5GC 306. In this case, the MEC host 102 can use the one or more NFV instances to process wireless connections originating from or terminating at the gNB 308 and the 5GC 306.

In some aspects, the MEC host 102 includes an edge server CPU 121, which is configured according to techniques disclosed herein to provide dynamic deterministic scaling of processor resources, such as processor cores. More specifically, different sets of processor cores of the CPU can be configured to operate at different base frequencies (e.g., a high base frequency and a low base frequency), and the NFV instances can be instantiated (e.g., using virtual resources) using processor cores operating at the low base frequency, the high base frequency, or cores operating at both base frequencies. The use of the cores can be dynamically adjusted, e.g., based on the utilization of a network service associated with the NFV, network traffic associated with the NFV, number of subscribers associated with the network service provided by the NFV, and so forth. In some aspects, the 5G core 306 can provide slice management functionalities performed by the slice management function 162.

In some aspects, the system architecture 300A (which can be the same as 100B) can be a 5G-NR system architecture providing network slicing and supporting policy configuration and enforcement between network slices as per service level agreements (SLAs) within the RAN 304 (or 204). Additionally and as illustrated in greater detail in FIG. 3E, the RAN 304 can provide separation of central unit control plane (CU-CP) and central unit user plane (CU-UP) functionalities while supporting network slicing (e.g., using resource availability and latency information communication via different RAN interfaces, such as E1, F1-C, and F1-U interfaces). In some aspects, the UE 302 (or 152) can communicate RRC signaling to the gNB 308 for establishing a connection with an entity (e.g., UPF 318) of the 5GC 306. The gNB 308 can include separate distributed units (DUs), CU-CP, and CU-UP entities (as illustrated in FIG. 3E). The CU-CP entity can obtain resource utilization and latency information from the DU and CU-UP entities and select a DU/CU-UP pair based on such information for purposes of configuring the network slice. Network slice configuration information associated with the configured network slice (including resources for use while communicating via the slice) can be provided to the UE 302 for purposes of initiating data communication with the 5GC UPF entity 318 using the network slice.

Figure 3B:
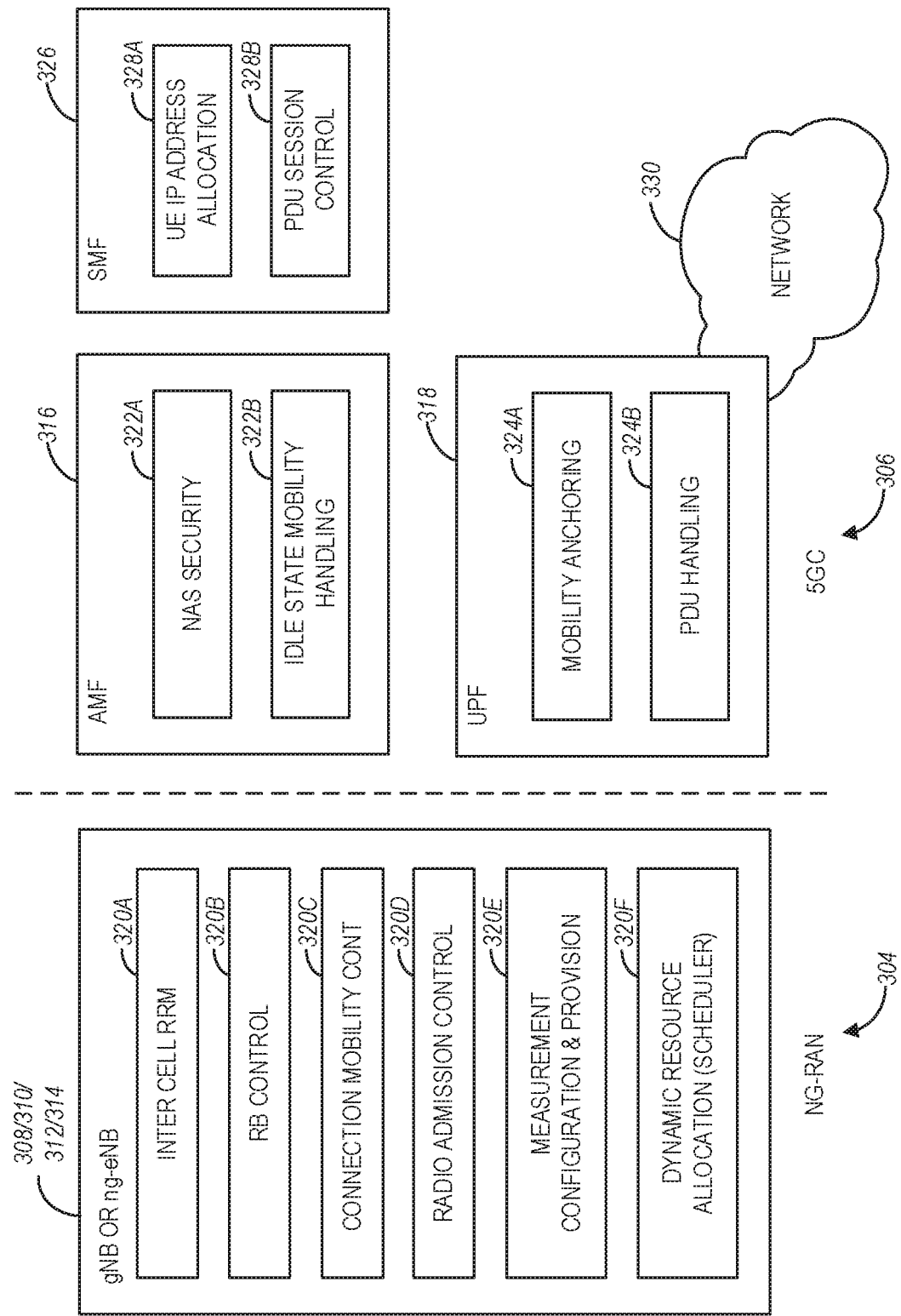
FIG. 3B illustrates an example functional split between next generation radio access network (NG-RAN) and the 5G Core network (5GC) in connection with the NG system architecture of FIG. 3A, according to an example.

FIG. 3B illustrates an example functional split between next generation radio access network (NG-RAN) and the 5G Core network (5GC) in connection with the NG system architecture of FIG. 3A, according to an example. FIG. 3B illustrates some of the functionalities the gNBs 308/310 and the NG-eNBs 312/314 can perform within the NG-RAN 304, as well as the AMF 316, the UPF 318, and a Session Management Function (SMF) 326 (not illustrated in FIG. 3A) within the 5GC 306. In some aspects, the 5GC 306 can provide access to a network 330 (e.g., the Internet) to one or more devices via the NG-RAN 304.

In some aspects, the gNBs 308/310 and the NG-eNBs 312/314 can be configured to host the following functions: functions for Radio Resource Management (e.g., inter-cell radio resource management 320A, radio bearer control 320B, connection mobility control 320C, radio admission control 320D, measurement and measurement reporting configuration for mobility and scheduling 320E, and dynamic allocation of resources to UEs in both uplink and downlink (scheduling) 320F); IP header compression; encryption and integrity protection of data; selection of an AMF at UE attachment when no routing to an AMF can be determined from the information provided by the UE; routing of User Plane data towards UPF(s); routing of Control Plane information towards AMF; connection setup and release; scheduling and transmission of paging messages (originated from the AMF); scheduling and transmission of system broadcast information (originated from the AMF or Operation and Maintenance); transport level packet marking in the uplink; session management; support of network slicing; QoS flow management and mapping to data radio bearers; support of UEs in RRC_INACTIVE state; distribution function for non-access stratum (NAS) messages; radio access network sharing; dual connectivity; and tight interworking between NR and E-UTRA, to name a few.

In some aspects, the AMF 316 can be configured to host the following functions, for example: NAS signaling termination; NAS signaling security 322A; access stratum (AS) security control; inter-core network (CN) node signaling for mobility between 3GPP access networks; idle state/mode mobility handling 322B, including mobile device, such as a UE reachability (e.g., control and execution of paging retransmission); registration area management; support of intra-system and inter-system mobility; access authentication; access authorization including check of roaming rights; mobility management control (subscription and policies); support of network slicing; or SMF selection, among other functions.

The UPF 318 can be configured to host the following functions, for example: mobility anchoring 324A (e.g., anchor point for Intra-/Inter-RAT mobility); packet data unit (PDU) handling 324B (e.g., external PDU session point of interconnect to data network); packet routing and forwarding; packet inspection and user plane part of policy rule enforcement; traffic usage reporting; uplink classifier to support routing traffic flows to a data network; branching point to support multi-homed PDU session; QoS handling for user plane, e.g., packet filtering, gating, UL/DL rate enforcement; uplink traffic verification (SDF to QoS flow mapping); or downlink packet buffering and downlink data notification triggering, among other functions.

The Session Management Function (SMF) 326 can be configured to host the following functions, for example: session management; UE IP address allocation and management 328A; selection and control of user plane function (UPF); PDU session control 328B, including configuring traffic steering at UPF 318 to route traffic to proper destination; control part of policy enforcement and QoS; or downlink data notification, among other functions.

Figure 3C:
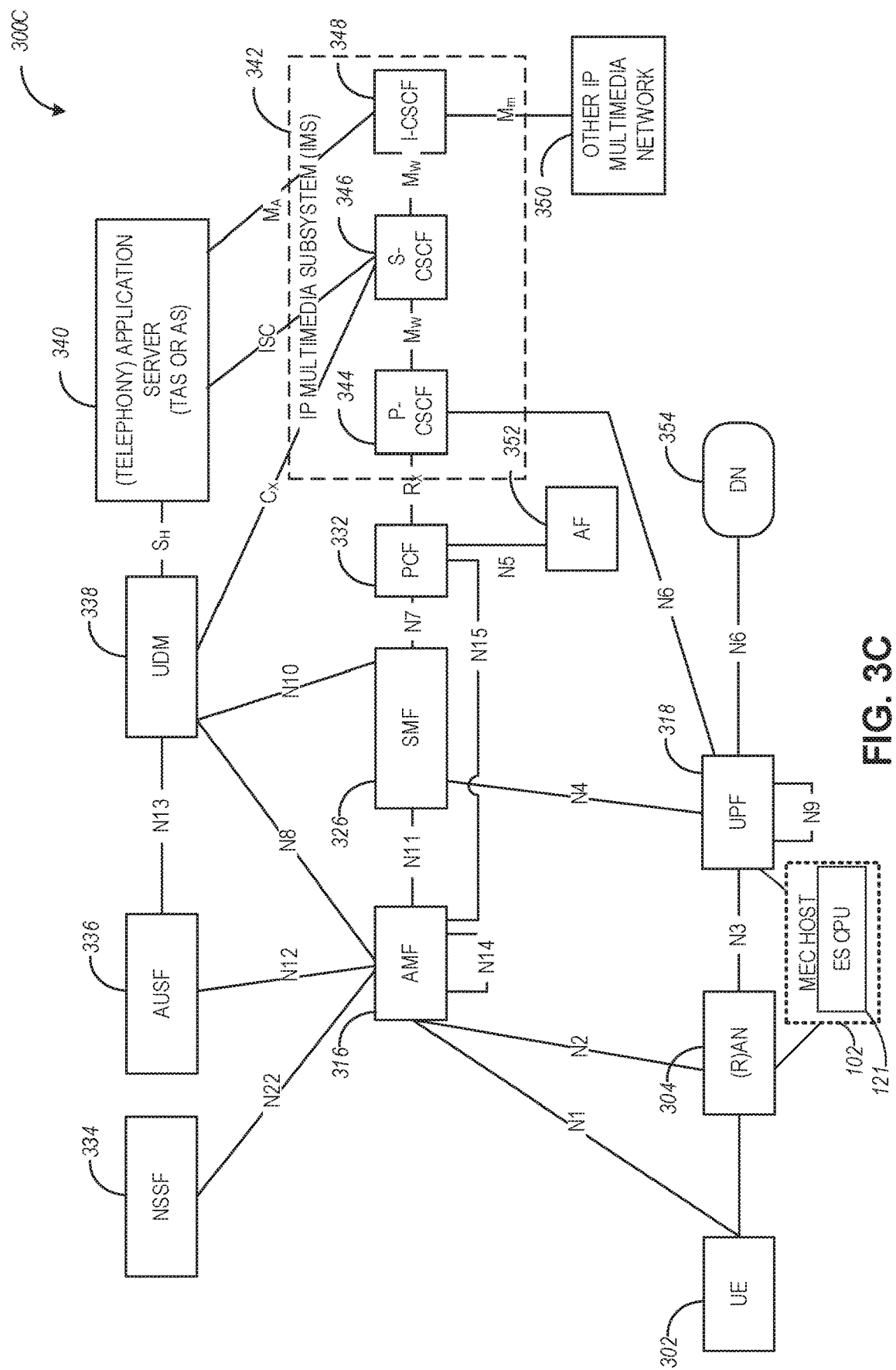
FIG. 3C and FIG. 3D illustrate non-roaming 5G system architectures with a MEC host using an edge server CPU, according to an example.
Figure 3D:
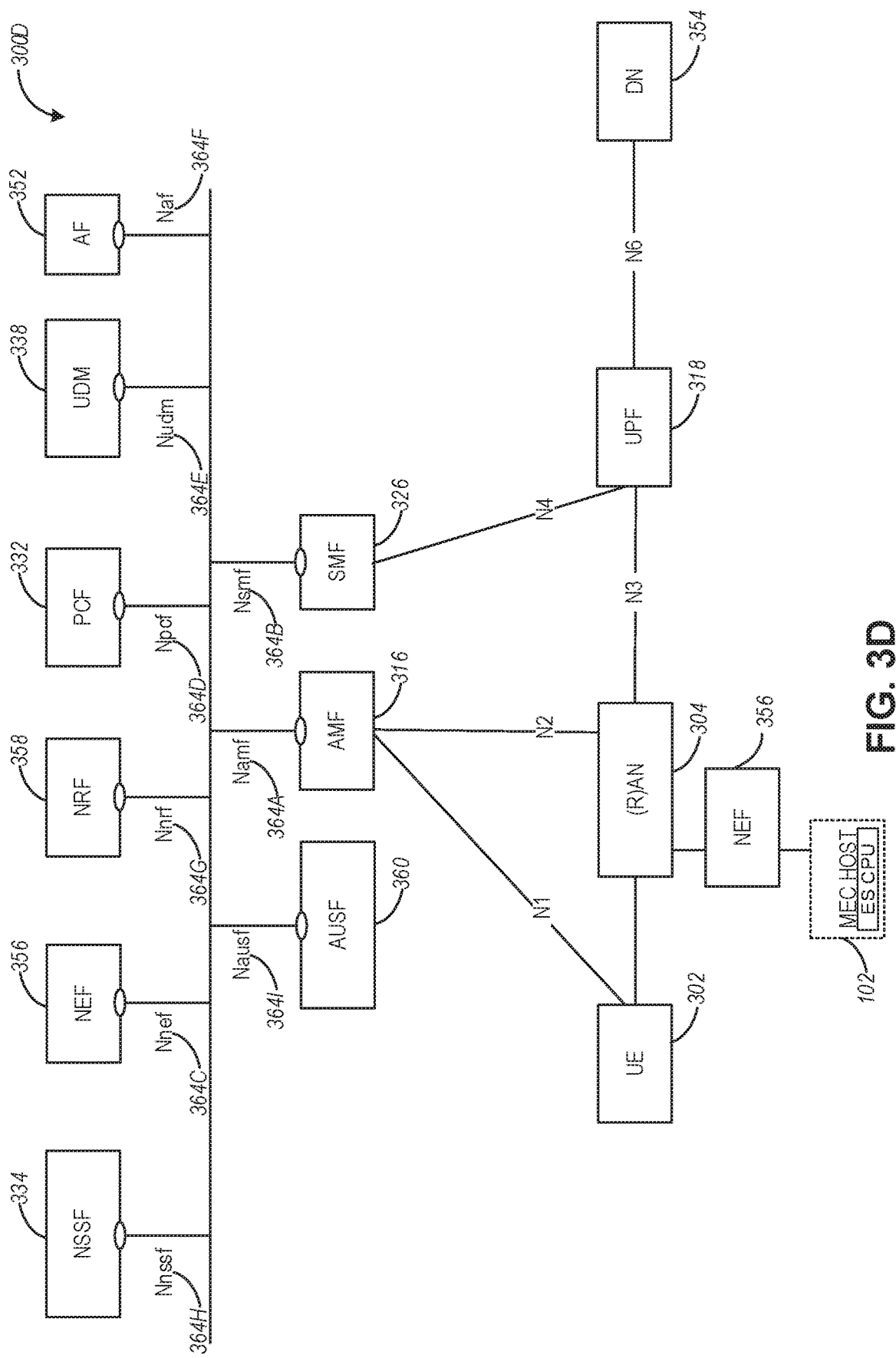
Figure 3E:
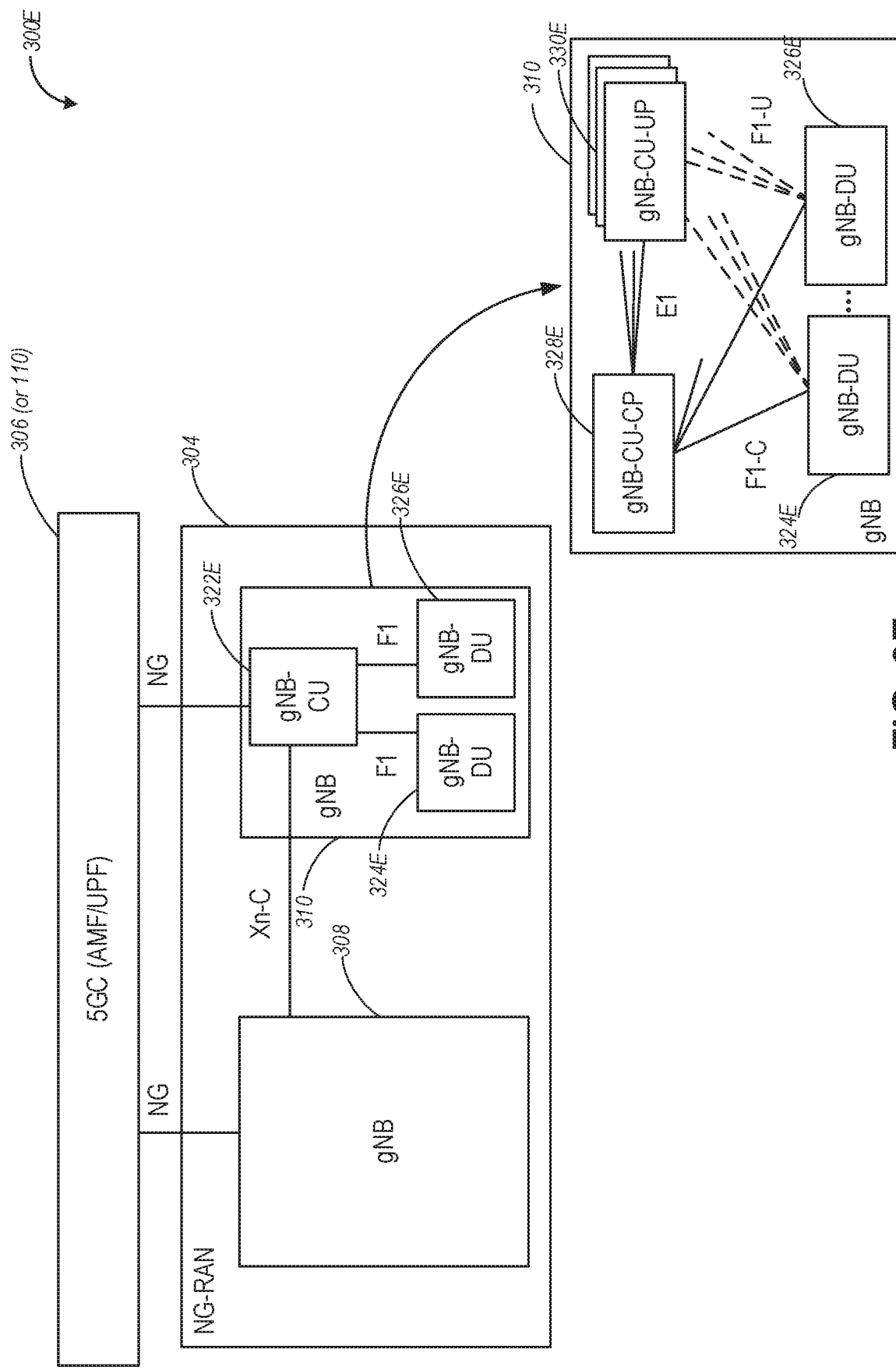
FIG. 3E illustrates components of an example 5G-NR architecture with control unit control plane (CU-CP)-control unit user plane (CU-UP) separation, according to an example.

FIG. 3C and FIG. 3D illustrate example non-roaming 5G system architectures with a MEC host using an edge server CPU, according to an example. Referring to FIG. 3C, an example 5G system architecture 300C is illustrated in a reference point representation. More specifically, UE 302 can be in communication with RAN 304 as well as one or more other 5G core (5GC) network entities. The 5G system architecture 300C includes a plurality of network functions (NFs), such as access and mobility management function (AMF) 316, session management function (SMF) 326, policy control function (PCF) 332, application function (AF) 352, user plane function (UPF) 318, network slice selection function (NSSF) 334, authentication server function (AUSF) 336, and unified data management (UDM) 338.

The UPF 318 can provide a connection to a data network (DN) 354, which can include, for example, operator services, Internet access, or third-party services. The AMF 316 can be used to manage access control and mobility and can also include network slice selection functionality. The SMF 326 can be configured to set up and manage various sessions according to network policy. The UPF 318 can be deployed in one or more configurations according to the desired service type. The PCF 332 can be configured to provide a policy framework using network slicing, mobility management, and roaming (similar to PCRF in a 4G communication system). The UDM 338 can be configured to store subscriber profiles and data (similar to an HSS in a 4G communication system), such as V2X subscription information or another type of subscription information for services available within the architecture 300C.

In some aspects, the 5G system architecture 300C includes an IP multimedia subsystem (IMS) 342 as well as a plurality of IP multimedia core network subsystem entities, such as call session control functions (CSCFs). More specifically, the IMS 342 includes a CSCF, which can act as a proxy CSCF (P-CSCF) 344, a serving CSCF (S-CSCF) 346, an emergency CSCF (E-CSCF) (not illustrated in FIG. 3C), or interrogating CSCF (I-CSCF) 348. The P-CSCF 344 can be configured to be the first contact point for the UE 302 within the IMS 342. The S-CSCF 346 can be configured to handle the session states in the network, and the E-CSCF can be configured to handle certain aspects of emergency sessions such as routing an emergency request to the correct emergency center or public safety answering point (PSAP). The I-CSCF 348 can be configured to function as the contact point within an operator's network for all IMS connections destined to a subscriber of that network operator, or a roaming subscriber currently located within that network operator's service area. In some aspects, the I-CSCF 348 can be connected to another IP multimedia network 350, e.g. an IMS operated by a different network operator.

In some aspects, the UDM 338 can be coupled to an application server 340, which can include a telephony application server (TAS) or another application server (AS) including a MEC host. The AS 340 can be coupled to the IMS 342 via the S-CSCF 346 or the I-CSCF 348. In some aspects, the 5G system architecture 300C can use one or more MEC hosts to provide an interface and offload processing of wireless communication traffic. For example and as illustrated in FIG. 3C, the MEC host 102 can provide a connection between the RAN 304 and UPF 318 in the core network. The MEC host 102 can use one or more NFV instances instantiated on virtualization infrastructure within the host to process wireless connections to and from the RAN 304 and the UPF 318. Additionally, the MEC host 102 can use the edge server CPU 121, which is configured according to techniques disclosed herein to provide dynamic deterministic scaling of processor resources, such as processor cores.

FIG. 3D illustrates an example 5G system architecture 300D in a service-based representation. System architecture 300D can be substantially similar to (or the same as) system architecture 300C. In addition to the network entities illustrated in FIG. 3C, system architecture 300D can also include a network exposure function (NEF) 356 and a network repository function (NRF) 358. In some aspects, 5G system architectures can be service-based and interaction between network functions can be represented by corresponding point-to-point reference points Ni (as illustrated in FIG. 3C) or as service-based interfaces (as illustrated in FIG. 3D).

A reference point representation shows that interaction can exist between corresponding NF services. For example, FIG. 3C illustrates the following reference points: N1 (between the UE 302 and the AMF 316), N2 (between the RAN 304 and the AMF 316), N3 (between the RAN 304 and the UPF 318), N4 (between the SMF 326 and the UPF 318), N5 (between the PCF 332 and the AF 352), N6 (between the UPF 318 and the DN 354), N7 (between the SMF 326 and the PCF 332), N8 (between the UDM 338 and the AMF 316), N9 (between two UPFs 318), N10 (between the UDM 338 and the SMF 326), N11 (between the AMF 316 and the SMF 326), N12 (between the AUSF 336 and the AMF 316), N13 (between the AUSF 336 and the UDM 338), N14 (between two AMFs 316), N15 (between the PCF 332 and the AMF 316 in case of a non-roaming scenario, or between the PCF 332 and a visited network and AMF 316 in case of a roaming scenario), N16 (between two SMFs; not shown), and N22 (between AMF 316 and NSSF 334). Other reference point representations not shown in FIG. 3C can also be used.

In some aspects, as illustrated in FIG. 3D, service-based representations can be used to represent network functions within the control plane that enable other authorized network functions to access their services. In this regard, 5G system architecture 300D can include the following service-based interfaces: Namf 364A (a service-based interface exhibited by the AMF 316), Nsmf 364B (a service-based interface exhibited by the SMF 326), Nnef 364C (a service-based interface exhibited by the NEF 356), Npcf 364D (a service-based interface exhibited by the PCF 332), Nudm 364E (a service-based interface exhibited by the UDM 338), Naf 364F (a service-based interface exhibited by the AF 352), Nnrf 364G (a service-based interface exhibited by the NRF 358), Nnssf 364H (a service-based interface exhibited by the NSSF 334), Nausf 364I (a service-based interface exhibited by the AUSF 360). Other service-based interfaces (e.g., Nudr, N5g-eir, and Nudsf) not shown in FIG. 3D can also be used.

In some aspects, the NEF 356 can provide an interface to a MEC host such as MEC host 102 with an edge server CPU using the techniques discussed herein for processor core scaling, which can be used to process wireless connections with the RAN 304.

FIG. 3E illustrates components of an example 5G-NR architecture with a control unit control plane (CU-CP)-control unit user plane (CU-UP) separation, according to an example. Referring to FIG. 3E, the 5G-NR architecture 300E can include a 5G core (5GC) 306 and NG-RAN 304. The NG-RAN 304 can include one or more gNBs such as gNB 308 and 310. In some aspects, network elements of the NG-RAN 304 may be split into central and distributed units, and different central and distributed units, or components of the central and distributed units, may be configured for performing different protocol functions (e.g., different protocol functions of the protocol layers).

In some aspects, the gNB 308 can comprise or be split into one or more of a gNB Central Unit (gNB-CU) 322E and gNB Distributed Unit(s) (gNB-DU) 324E, 326E. Additionally, the gNB 308 can comprise or be split into one or more of a gNB-CU-Control Plane (gNB-CU-CP) 328E and a gNB-CU-User Plane (gNB-CU-UP) 330E. The gNB-CU 322E is a logical node configured to host the radio resource control (RRC) layer, service data adaptation protocol (SDAP) layer, and packet data convergence protocol layer (PDCP) protocols of the gNB or RRC, and PDCP protocols of the E-UTRA-NR gNB (en-gNB) that controls the operation of one or more gNB-DUs. The gNB-DU (e.g., 324E or 326E) is a logical node configured to host the radio link control layer (RLC), medium access control layer (MAC), and physical layer (PHY) layers of the gNB 128A, 128B or en-gNB, and its operation is at least partly controlled by gNB-CU 322E. In some aspects, one gNB-DU (e.g., 324E) can support one or multiple cells.

The gNB-CU 322E comprises a gNB-CU-Control Plane (gNB-CU-CP) entity 328E and a gNB-CU-User Plane entity (gNB-CU-UP) 330E. The gNB-CU-CP 328E is a logical node configured to host the RRC and the control-plane part of the PDCP protocol of the gNB-CU 322E for an en-gNB or a gNB. The gNB-CU-UP 330E is a logical (or physical) node configured to host the user-plane part of the PDCP protocol of the gNB-CU 322E for an en-gNB, and the user plane part of the PDCP protocol and the SDAP protocol of the gNB-CU 322E for a gNB.

The gNB-CU 322E and the gNB-DUs 324E, 326E can communicate via the F1 interface, and the gNB 308 can communicate with the gNB-CU 322E via the Xn-C interface. The gNB-CU-CP 328E and the gNB-CU-UP 330E can communicate via the E1 interface(s). Additionally, the gNB-CU-CP 328E and the gNB-DUs 324E, 326E can communicate via the F1-C interface, and the gNB-DUs 324E, 326E, and the gNB-CU-UP 330E can communicate via the F1-U interface.

In some aspects, the gNB-CU 322E terminates the F1 interface connected with the gNB-DUs 324E, 326E, and in other aspects, the gNB-DUs 324E, 326E terminate the F1 interface connected with the gNB-CU 322E. In some aspects, the gNB-CU-CP 328E terminates the E1 interface connected with the gNB-CU-UP 330E and the F1-C interface connected with the gNB-DUs 324E, 326E. In some aspects, the gNB-CU-UP 330E terminates the E1 interface connected with the gNB-CU-CP 328E and the F1-U interface connected with the gNB-DUs 324E, 326E.

In some aspects, the F1 interface is a point-to-point interface between endpoints and supports the exchange of signaling information between endpoints and data transmission to the respective endpoints. The F1 interface can support the control plane and user plane separation and separate the Radio Network Layer and the Transport Network Layer. In some aspects, the E1 interface is a point-to-point interface between a gNB-CU-CP and a gNB-CU-UP and supports the exchange of signaling information between endpoints. The E1 interface can separate the Radio Network Layer and the Transport Network Layer, and in some aspects, the E1 interface may be a control interface not used for user data forwarding.

Referring to the NG-RAN 304, the gNBs 308, 310 of the NG-RAN 304 may communicate to the 5GC 306 via the NG interfaces, and can be interconnected to other gNBs via the Xn interface. In some aspects, the gNBs 308, 310 can be configured to support FDD mode, TDD mode, or dual-mode operation. In certain aspects, for EN-DC, the S1-U interface and an X2 interface (e.g., X2-C interface) for a gNB, consisting of a gNB-CU and gNB-DUs, can terminate in the gNB-CU.

In some aspects, gNB 310 supporting CP/UP separation, includes a single CU-CP entity 328E, multiple CU-UP entities 330E, and multiple DU entities 324E, ..., 326E, with all entities being configured for network slice operation. As illustrated in FIG. 3E, each DU entity 324E, ..., 326E can have a single connection with the CU-CP 328E via an F1-C interface. Each DU entity 324E, ..., 326E can be connected to multiple CU-UP entities 330E using F1-U interfaces. The CU-CP entity 328E can be connected to multiple CU-UP entities 330E via E1 interfaces. Each DU entity 324E, ..., 326E can be connected to one or more UEs, and the CU-UP entities 330E can be connected to a user plane function (UPF) and the 5G core 306.

In some aspects, the NG-RAN 304 can be configured to support latency measurements over the F1-U interface so that the UP elements including DU entities (324E, ..., 326E) and CU-UP entities 330E are able to communicate latency information to other neighboring UP elements. In this regard, network slicing can be supported in the NG-RAN 304 with the separation of CP/UP. In some aspects, slice-level isolation and improved resource utilization can be provided by the central RRM in the CU-CP 328E.

In some aspects, procedures associated with network slicing include operations and communications over the E1 interface, the F1-C interface, and the F1-U interface. With these procedures, the CU-CP 328E can select the appropriate DU and CU-UP entities to serve the specific network slicing request associated with a certain service level agreement (SLA).

In some aspects, the procedure over the E1 interface can include information collection from the CU-UP entities 330E and resource management in the CU-CP 328E. Specifically, the information collection can include resource availability indication and latency indication, while resource management can include resource allocation and resource release. The CU-CP 328E can be configured to collect the information from the CU-UP entities 330E periodically or issue an on-demanding query based on a network slice request. In some aspects, a resource availability indication procedure can allow the CU-UP entities 330E to inform the CU-CP 328E of the availability of resources to process a network slicing request. For example, the indication of the available resource can assist the CU-CP 328E to determine whether the specific CU-UP can serve the specific network slice requesting associated with a certain SLA.

In some aspects, a resource allocation procedure can allow the CU-CP 328E to allocate the resource in the CU-UP 330E that is associated with a specific slice. Upon the reception of a request for a network slice creation, the CU-CP 328E can select the CU-UP 330E (e.g., one of the CU-UP entities) following the indicated SLA and allocate the resource in the selected CU-UP to the network slice. In some aspects, a resource release procedure can allow the CU-CP 328E to release the resource in the CU-UP that is assigned to an established network slice. Upon the removal of the slice, the CU-CP 328E can notify the corresponding CU-UP to release the resource used by the removed network slice.

Figure 3F:
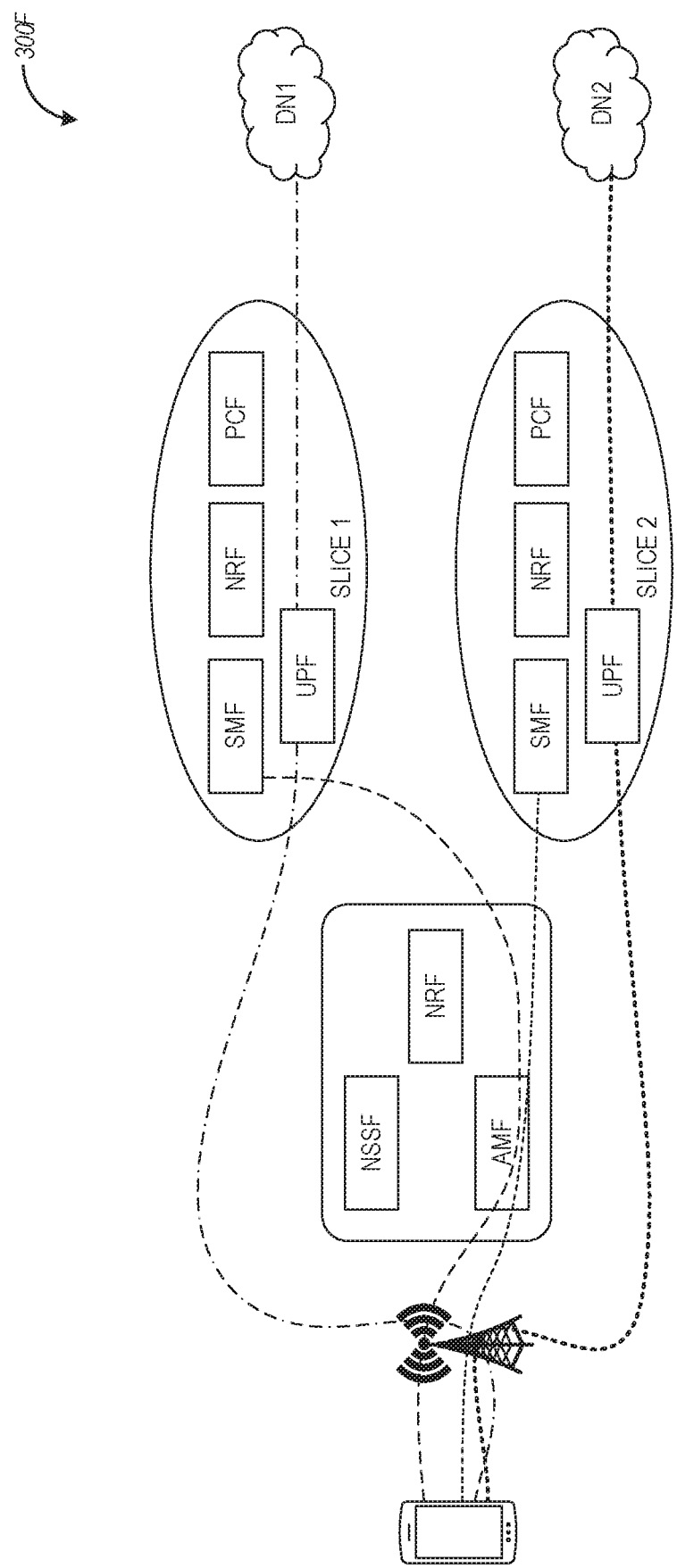
FIG. 3F illustrates examples of network slices, according to an example.

FIG. 3F illustrates a diagram 300F with examples of network slices, according to an example. A RAN can support differentiated handling of traffic between preconfigured, isolated RAN slices. How to perform this can be left to the implementation. The selection of the RAN slice will be based on IDs (which can be the slice service type and slice differentiator defined above) provided by the device or core network. A RAN slice may or may not be available at a given location. RAN will select the core network slice. QoS differentiation within a RAN slice will be supported as well.

As used herein, the term "network slicing" refers to the partitioning of the physical network into multiple virtual networks customized to meet a diverse set of vertical requirements. Network slicing can be relevant for 3GPP Rel. 15 and beyond, and relevant 3GPP specifications include TS 23.501 (5GS Archit.), TS 22.261 (5G Requirements), and TS 28.531/28.532 (5G Slice Management).

Referring to FIG. 3F, the Network Slice Selection Function (NSSF) supports selecting the Network Slice instances to serve the UE, determining the allowed NSSAI (Network Slice Selection Assistance Information) and determining the AMF set to be used to serve the UE. NSSF is a new functionality not existing in EPC. A Network Slice Template (NST) is defined as a subset of attributes' values used for the creation of instances of Network Slice Information Object Class (IOC). The content of NST may not be standardized by 3GPP, i.e., it may be defined by MNO and vendor.

In some aspects, slice selection is determined by the network (AMF or NSSF), based on network slice policy with the assisted information (NSSAI) sent by the UE. In some aspects, a maximum of 8 network slices per UE may be used.

Automotive example: a vehicle may need to simultaneously connect to multiple slice instances, belonging to different Slice/Service Types (SSTs), to support different performance requirements of multiple automotive use cases. For example, Software Update and Tele-Operated Driving use cases could be associated with eMBB slice and URLLC slice respectively, based on their KPI requirements.

Figure 4A:
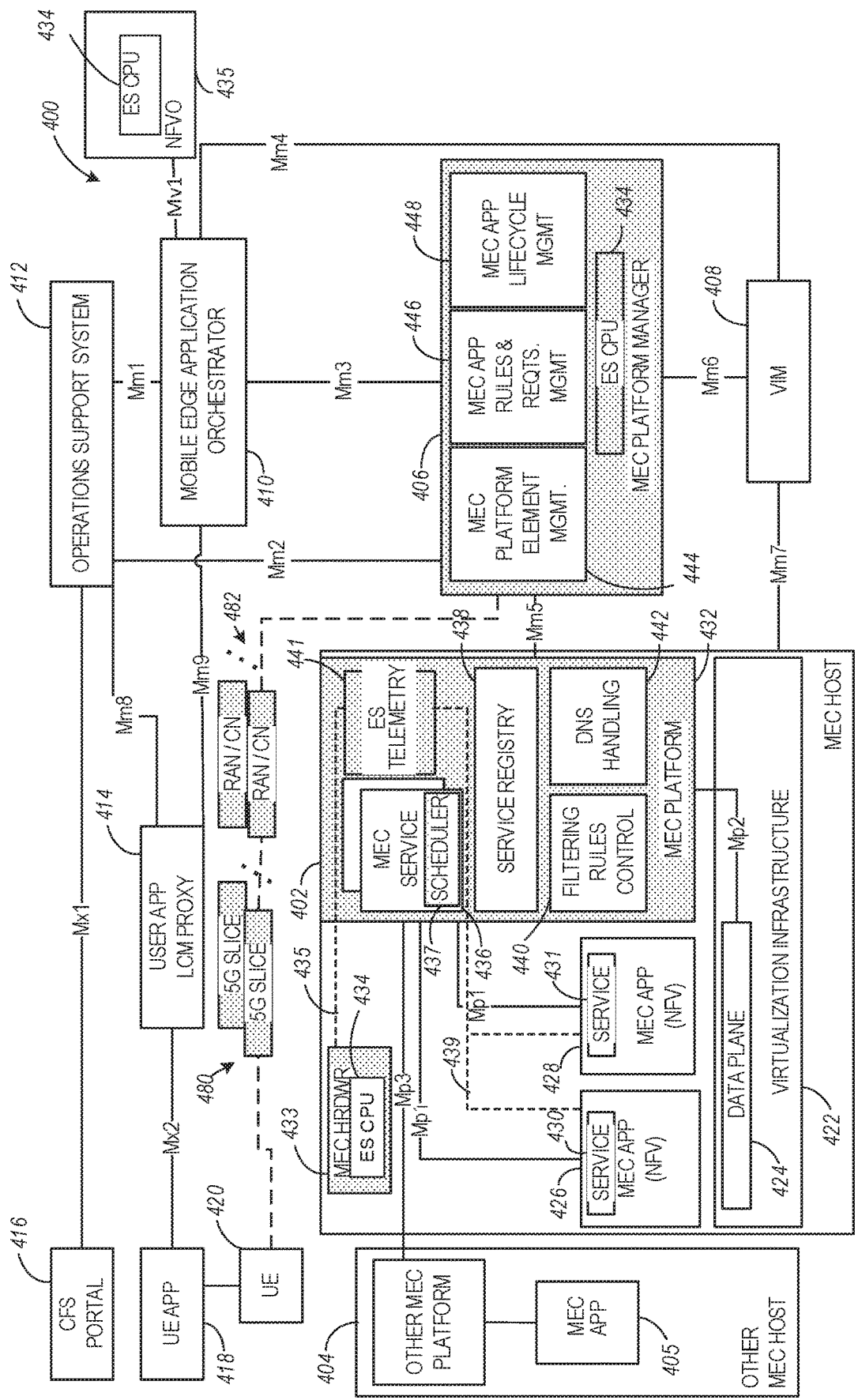
FIG. 4A illustrates a MEC network architecture modified for supporting an edge server CPU with dynamic deterministic scaling, according to an example.

FIG. 4A illustrates a MEC network architecture 400 modified for supporting an edge server CPU with dynamic deterministic scaling, according to an example. FIG. 4A specifically illustrates a MEC architecture 400 with MEC hosts 402 and 404 providing functionalities in accordance with the ETSI GS MEC-003 specification, with the shaded blocks used to indicate processing aspects for the MEC architecture configuration described herein in connection with dynamic deterministic scaling of the processor resources. Specifically, enhancements to the MEC platform 432 and the MEC hardware 433 may be used for providing dynamic deterministic scaling of the processor resources within the MEC architecture 400. This may include switching processing of network traffic or network applications associated with UEs or other subscribers within the MEC network architecture 400 between different sets of processor cores, where each set of processor cores is associated with a different base frequency.

Referring to FIG. 4A, the MEC network architecture 400 can include MEC hosts 402 and 404, a virtualization infrastructure manager (VIM) 408, an MEC platform manager 406, an MEC orchestrator 410, an NFV orchestrator (NFVO) 435, an operations support system 412, a user app proxy 414, a UE app 418 running on UE 420, and CFS portal 416. The MEC host 402 can include a MEC platform 432 with filtering rules control module 440, a DNS handling module 442, service registry 438, and MEC services 436. The MEC services 436 can include at least one scheduler 437, which can be used to select resources for instantiating MEC apps (or NFV instances, or NFVs) 426 and 428 upon virtualization infrastructure 422. The MEC apps 426 and 428 can be configured to provide services 430/431, which can include processing network communications traffic of different types associated with one or more wireless connections (e.g., connections to one or more RAN or core network entities as illustrated in FIGS. 1B-3D).

The MEC hardware 433 and the at least one scheduler 437 can be similar to the MEC hardware 123 and the scheduler 120A discussed in connection with FIG. 1B. In some aspects, the MEC hardware 433 can include an edge server CPU 434 which can be similar to the edge server CPU 121 mentioned hereinabove and can be used in connection with dynamic deterministic scaling of processing resources. In some aspects, the MEC hardware 433 for the MEC platform 432 can include an edge server telemetry module 441, which can be configured to monitor communication traffic as well as various other telemetry parameters (e.g., a number of active network subscribers that are currently in communication with the MEC host 402, minimal network resource requirements for an MEC app including minimum processor core requirements and processor core base frequency requirements, bandwidth use for an MEC app, and so forth).

The edge server CPU 434 can be configured to communicate with the telemetry module 441 to obtain such network telemetry parameters and dynamically scale the processor core usage based on the obtained information. For example, CPU 434 can be configured with a first set of processor cores configured to operate at a low base frequency (which can be deemed a low priority set of cores) and a second set of processor cores configured to operate at a high base frequency (i.e., higher than the base frequency of the first set of processor cores) (which can be deemed a high priority set of cores). In this regard, processing of communication traffic, services (e.g. 430 and 431), MEC apps, or other NFV instances associated with communication between one or more UEs and other network nodes within the MEC network architecture 400 can be offloaded from one set of processor cores to another set of processor cores (so that exclusively high priority cores, exclusively low priority cores, or a mixture of high and low priority cores are used) based on information received from the telemetry module 441. In some aspects, assigning a specific processor core or switching between processor cores used for processing network traffic associated with a given service, a MEC application, or other network traffic can be based on subscriber identity (i.e., UE specific assignment of processing for resources) or can be application-specific.

In some aspects, the CPU 434 can monitor the usage of the high-priority processor core set and can downgrade and offload to the low priority core set based on one or more parameters monitored by the telemetry module 441 falling below a predetermined threshold. Similarly, the CPU 434 can offload processing from the low priority core to the high-priority core when monitored parameters (e.g., a number of active UEs communicating with the MEC host 402) increase above a predetermined threshold.

The MEC platform manager 406 can include MEC platform element management module 444, MEC app rules and requirements management module 446, and MEC app lifecycle management module 448. The various entities within the MEC architecture 400 can perform functionalities as disclosed by the ETSI GS MEC-003 specification.

In some aspects, UE 420 can be configured to communicate to one or more of the core networks 482 via one or more of the network slices 480. In some aspects, the core networks 482 can use slice management functions (e.g., as provided by slice management function 162) to dynamically configure slices 480, including dynamically assign a slice to a UE, reassign a slice to a UE, dynamically allocate or reallocate resources used by one or more of the slices 480, or other slice related management functions. One or more of the functions performed in connection with slice management can be initiated based on user requests (e.g., via a UE) or request by a service provider.

In some aspects, the edge server CPU 434 can also be implemented within other network nodes of the MEC architecture 400, including the network node used for implementing the MEC platform manager 406. Additional dynamic deterministic scaling of processor resources and use cases are illustrated in connection with FIG. 11-FIG. 20.

Figure 4B:
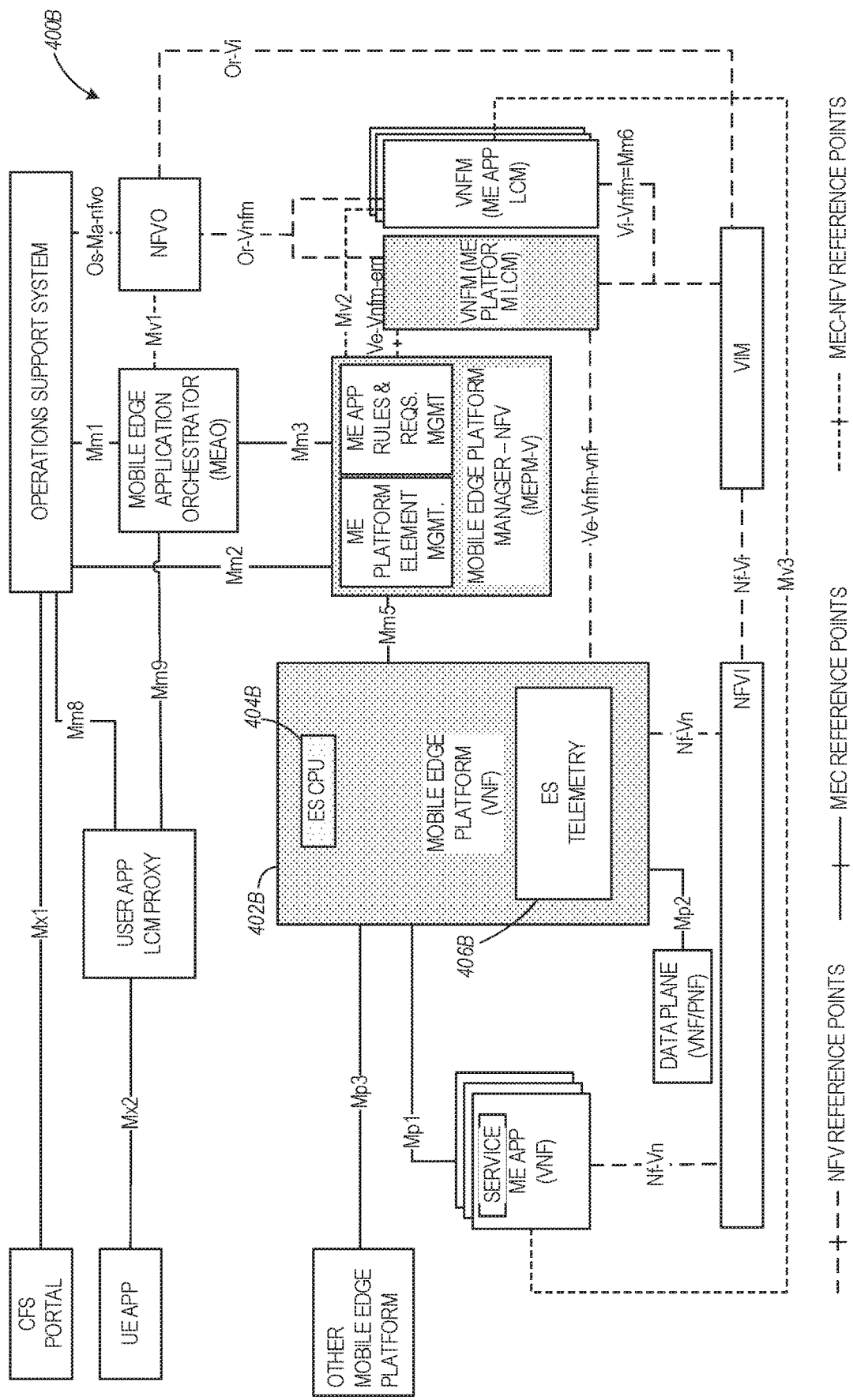
FIG. 4B illustrates a MEC reference architecture in a Network Function Virtualization (NFV) environment using an edge server CPU with dynamic deterministic scaling, according to an example.

FIG. 4B illustrates a MEC reference architecture 400B in a Network Function Virtualization (NFV) environment using an edge server CPU with dynamic deterministic scaling, according to an example. The MEC architecture 400B can be configured to provide functionalities in accordance with the ETSI GR MEC-017 specification.

In some aspects, ETSI MEC can be deployed in an NFV environment as illustrated in FIG. 4B. In some aspects, the MEC platform is deployed as a virtualized network function (VNF). The ME applications can appear like VNFs towards the ETSI NFV Management and Orchestration (MANO) components. This allows the re-use of ETSI NFV MANO functionality. In some aspects, the full set of MANO functionality may be unused and certain additional functionality may be needed. Such a specific ME application is denoted by the name "ME app (VNF)" as discussed herein. In some aspects, the virtualization infrastructure is deployed as an NFVI and its virtualized resources are managed by the virtualized infrastructure manager (VIM). For that purpose, one or more of the procedures defined by ETSI NFV Infrastructure specifications, i.e. ETSI GS NFV-INF 003, ETSI GS NFV-INF 004, and ETSI GS NFV-INF 005 can be used.

In some aspects, the ME applications (or VNFs) will be managed like individual VNFs, allowing that a MEC-in-NFV deployment can delegate certain orchestration and Life Cycle Management (LCM) tasks to the NFVO and VNFM functional blocks, as defined by ETSI NFV MANO.

In some aspects, the Mobile Edge Platform Manager (MEPM) can be transformed into a "Mobile Edge Platform Manager—NFV" (MEPM-V) that delegates the LCM part to one or more virtual network function manager(s) (VNFM (s)). The Mobile Edge Orchestrator (MEO), as defined in the MEC reference architecture ETSI GS MEC-003, can be transformed into a "Mobile Edge Application Orchestrator" (MEAO) that uses the NFVO for resource orchestration, and for orchestration of the set of ME app VNFs as one or more NFV Network Services (NSs).

In some aspects, the Mobile Edge Platform VNF, the MEPM-V, and the VNFM (ME platform LCM) can be deployed as a single package as per the ensemble concept in 3GPP TR 32.842, or that the VNFM is a Generic VNFM as per ETSI GS NFV-IFA 009 and the Mobile Edge Platform VNF and the MEPM-V are provided by a single vendor.

In some aspects, the Mp1 reference point between a ME application and the ME platform can be optional for the ME application, unless it is an application that provides and/or consumes a ME service.

In some aspects, the Mm3* reference point between MEAO and MEPM-V is based on the Mm3 reference point, as defined by ETSI GS MEC-003. Changes may be configured to this reference point to cater to the split between MEPM-V and VNFM (ME applications LCM).

In some aspects, the following new reference points (Mv1, Mv2, and Mv3) are introduced between elements of the ETSI MEC architecture and the ETSI NFV architecture to support the management of ME app VNFs. The following reference points are related to existing NFV reference points, but only a subset of the functionality may be used for ETSI MEC, and extensions may be necessary: Mv1 (this reference point connects the MEAO and the NFVO; it is related to the Os-Ma-nfvo reference point, as defined in ETSI NFV); Mv2 (this reference point connects the VNF Manager that performs the LCM of the ME app VNFs with the MEPM-V to allow LCM related notifications to be exchanged between these entities; it is related to the Ve-Vnfm-em reference point as defined in ETSI NFV, but may possibly include additions, and might not use all functionality offered by Ve-Vnfm-em); Mv3 (this reference point connects the VNF Manager with the ME app VNF instance, to allow the exchange of messages e.g. related to ME application LCM or initial deployment-specific configuration; it is related to the Ve-Vnfm-vnf reference point, as defined in ETSI NFV, but may include additions, and might not use all functionality offered by Ve-Vnfm-vnf.

In some aspects, the following reference points are used as they are defined by ETSI NFV: Nf-Vn (this reference point connects each ME app VNF with the NFVI); Nf-Vi (this reference point connects the NFVI and the VIM); Os-Ma-nfvo (this reference point connects the OSS and the NFVO. It is primarily used to manage NSs, i.e. a number of VNFs connected and orchestrated to deliver a service); Or-Vnfm (this reference point connects the NFVO and the VNFM; it is primarily used for the NFVO to invoke VNF LCM operations); Vi-Vnfm (this reference point connects the VIM and the VNFM; it is primarily used by the VNFM to invoke resource management operations to manage the cloud resources that are needed by the VNF; it is assumed in an NFV-based MEC deployment that this reference point corresponds 1:1 to Mm6); and Or-Vi (this reference point connects the NFVO and the VIM; it is primarily used by the NFVO to manage cloud resources capacity).

In some aspects, one or more of the network nodes within the MEC architecture 400B (e.g., a network node 402B used for executing the Mobile Edge platform or VNF) can implement an edge server CPU 404B and an edge server telemetry module 406B. The edge server CPU 404B and the telemetry module 406B can perform functionalities similar to the edge server CPU 434 or the telemetry module 441 discussed in connection with FIG. 4A.

Even though techniques disclosed herein for network slicing and resource management are discussed in connection with MEC-related architectures where at least one MEC entity is present, the disclosure is not limited in this regard and the disclosed techniques may be used in architectures that do not use MEC entities. For example, techniques associated with network slicing and resource management (including processor core resources management and scaling), can be performed in non-MEC architectures as well.

Even though techniques disclosed herein are described in connection with a MEC architecture and 5G architecture, the disclosure is not limited in this regard and the disclosed techniques can be used with other types of wireless architectures (e.g., 2G, 3G, 4G, etc.) that use one or more MEC entities, as well as according to any spectral management schemes. Additionally, the radio links described herein may operate according to any radio communication technologies and/or standards. Furthermore, aspects described herein can be used in the context of any spectrum management scheme including a dedicated licensed spectrum, unlicensed spectrum, (licensed) shared spectrum (such as Licensed Shared Access (LSA) in 2.3-2.4 GHz, 3.4-3.6 GHz, 3.6-3.8 GHz and further frequencies, and Spectrum Access System (SAS)/Citizen Broadband Radio System (CBRS) in 3.55-3.7 GHz and further frequencies).

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources. Some of the features in this document are defined for the network side, such as Access Points, eNodeBs, New Radio (NR) or next generation Node-Bs (gNodeB or gNB), such as used in the context of 3GPP fifth-generation (5G) communication systems, etc. Still, a User Equipment (UE) may take this role as well and act as an Access Points, eNodeBs, gNodeBs, etc. Accordingly, some or all features defined for network equipment may be implemented by a UE or a mobile computing device.

Figure 5:
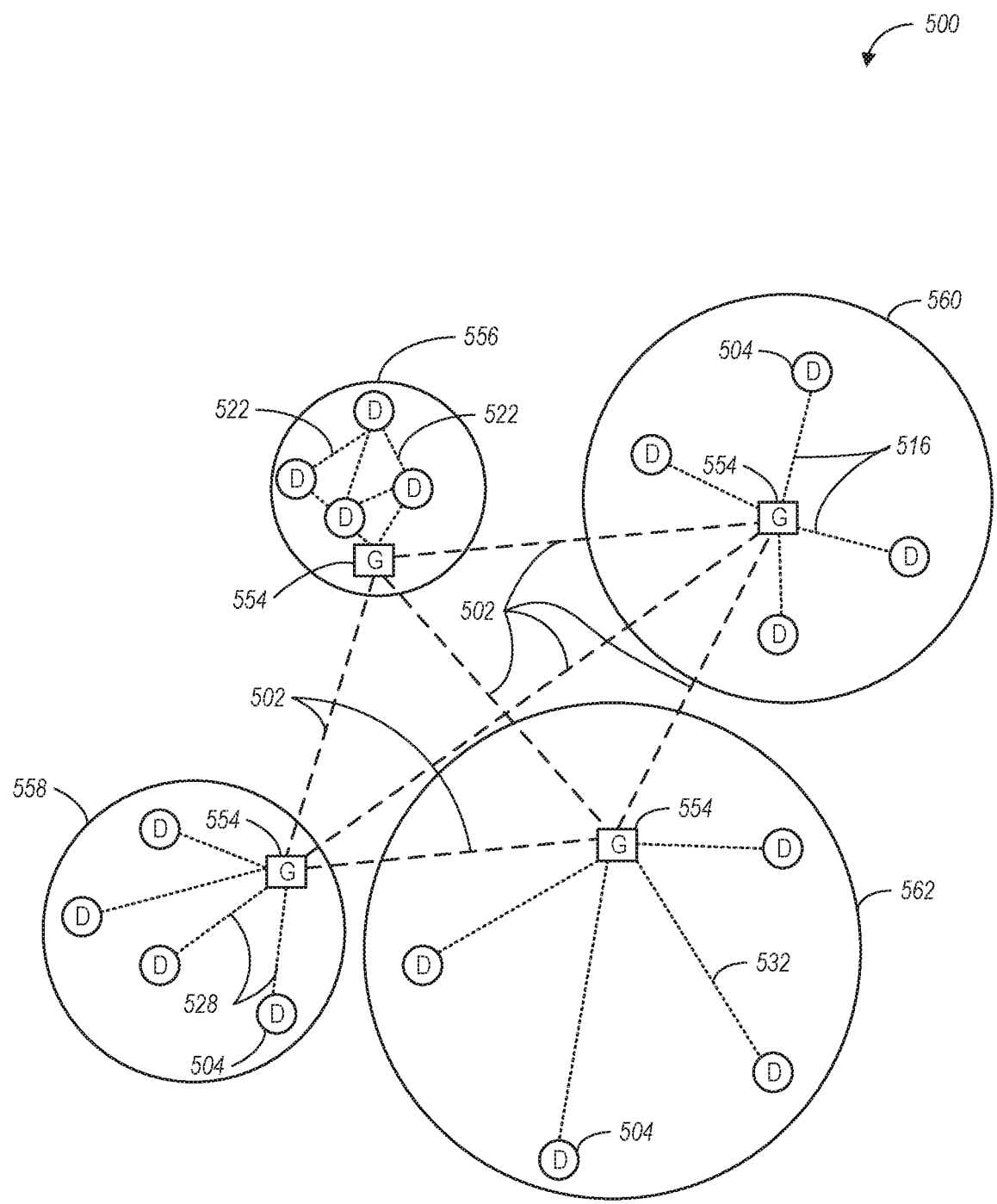
FIG. 5 illustrates a domain topology for respective Internet-of-Things (IoT) networks coupled through links to respective gateways, according to an example.

In further examples, the preceding examples of network communications and operations may be integrated with IoT and like device-based network architectures. FIG. 5 illustrates an example domain topology for respective IoT networks coupled through links to respective gateways. The IoT is a concept in which a large number of computing devices are interconnected to each other and to the Internet to provide functionality and data acquisition at very low levels. Thus, as used herein, an Edge/IoT processing device may include a semi-autonomous device performing a function, such as sensing or control, among others, in communication with other Edge/IoT processing devices and a wider network, such as the Internet.

MEC use cases have been envisioned to integrate into a number of network and application settings, including those to support network arrangements of IoT deployments. Edge/IoT processing devices are physical or virtualized objects that may communicate on a network (typically at the edge or endpoint of a network) and may include sensors, actuators, and other input/output components, such as to collect data or perform actions from a real-world environment. For example, Edge/IoT processing devices may include low-powered devices that are embedded or attached to everyday things, such as buildings, vehicles, packages, etc., to provide sensing, data, or processing functionality. Recently, Edge/IoT processing devices have become more popular and thus applications and use cases using these devices have proliferated.

Various standards have been proposed to more effectively interconnect and operate Edge/IoT processing devices and IoT network use cases, including those with MEC and mobile network architectures. Some of the relevant communication and network architecture standards include those distributed by groups such as ETSI, 3rd Generation Partnership Project (3GPP), Institute of Electrical and Electronics Engineers (IEEE), in addition to specialized IoT application interaction architecture and configuration standards distributed by working groups such as the Open Connectivity Foundation (OCF).

Often, Edge/IoT processing devices are limited in memory, size, or functionality, enabling larger numbers to be deployed for a similar cost to smaller numbers of larger devices. However, an Edge/IoT processing device may be a smartphone, laptop, tablet, PC, or other larger device. Further, an Edge/IoT processing device may be a virtual device, such as an application on a smartphone or another computing device. Edge/IoT processing devices may include IoT gateways, used to couple Edge/IoT processing devices to other Edge/IoT processing devices and to cloud applications, for data storage, process control, and the like.

Networks of Edge/IoT processing devices may include commercial and home automation devices, such as water distribution systems, electric power distribution systems, pipeline control systems, plant control systems, light switches, thermostats, locks, cameras, alarms, motion sensors, and the like. The Edge/IoT processing devices may be accessible through remote computers, servers, and other systems, for example, to control systems or access data.

The future growth of the Internet and like networks may involve very large numbers of Edge/IoT processing devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of Edge/IoT processing devices and networks present a number of new challenges in a heterogeneous network of connectivity comprising a combination of wired and wireless technologies.

FIG. 5 specifically provides a simplified drawing of a domain topology that may be used for a number of IoT networks comprising Edge/IoT processing devices 504, with the IoT networks 556, 558, 560, 562, coupled through backbone links 502 to respective gateways 554. For example, a number of Edge/IoT processing devices 504 may communicate with a gateway 554, and with each other through the gateway 554. To simplify the drawing, not every Edge/IoT processing device 504, or communications link (e.g., link 516, 522, 528, or 532) is labeled. The backbone links 502 may include any number of wired or wireless technologies, including optical networks, and may be part of a local area network (LAN), a wide area network (WAN), or the Internet. Additionally, such communication links facilitate optical signal paths among both Edge/IoT processing devices 504 and gateways 554, including the use of MUXing/deMUXing components that facilitate the interconnection of the various devices.

The network topology may include any number of types of IoT networks, such as a mesh network provided with the network 556 using Bluetooth low energy (BLE) links 522. Other types of IoT networks that may be present include a wireless local area network (WLAN) network 558 used to communicate with Edge/IoT processing devices 704 through IEEE 802.11 (Wi-Fi®) links 528, a cellular network 560 used to communicate with Edge/IoT processing devices 504 through an LTE/LTE-A (4G) or 5G cellular network, and a low-power wide-area (LPWA) network 562, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with the use of a variety of network and internet application protocols such as the Constrained Application Protocol (CoAP). The respective IoT networks may also be integrated with coordinator devices that provide a chain of links that form the cluster tree of linked devices and networks.

Each of these IoT networks may provide opportunities for new technical features, such as those described herein. The improved technologies and networks may enable the exponential growth of devices and networks, including the use of IoT networks into fog devices or systems. As the use of such improved technologies grows, the IoT networks may be developed for self-management, functional evolution, and collaboration, without needing direct human intervention. Improved technologies may even enable IoT networks to function without centralized controlled systems. Accordingly, the improved technologies described herein may be used to automate and enhance network management and operation functions far beyond current implementations.

In an example, communications between Edge/IoT processing devices 504, such as over the backbone links 502, may be protected by a decentralized system for authentication, authorization, and accounting (AAA). In a decentralized AAA system, distributed payment, credit, audit, authorization, and authentication systems may be implemented across the interconnected heterogeneous network infrastructure. This enables systems and networks to move towards autonomous operations. In these types of autonomous operations, machines may even contract for human resources and negotiate partnerships with other machine networks. This may enable the achievement of mutual objectives and balanced service delivery against outlined, planned service level agreements as well as achieve solutions that provide metering, measurements, traceability, and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the Edge/IoT processing devices. The integration of sensory systems may enable systematic and autonomous communication and coordination of service delivery against contractual service objectives, orchestration and QoS-based swarming and fusion of resources. Some of the individual examples of network-based resource processing include the following.

The mesh network 556, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource-based trust and service indices may be inserted to improve the data integrity, quality, assurance and deliver a metric of data confidence.

The WLAN network 558, for instance, may use systems that perform standards conversion to provide multi-standard connectivity, enabling Edge/IoT processing devices 504 using different protocols to communicate. Further systems may provide seamless interconnectivity across a multi-standard infrastructure comprising visible Internet resources and hidden Internet resources.

Communications in the cellular network 560, for instance, may be enhanced by systems that offload data, extend communications to more remote devices, or both. The LPWA network 562 may include systems that perform non-Internet protocol (IP) to IP interconnections, addressing, and routing. Further, each of the Edge/IoT processing devices 504 may include the appropriate transceiver for wide-area communications with that device. Further, each Edge/IoT processing device 504 may include other transceivers for communications using additional protocols and frequencies. This is discussed further with respect to the communication environment and hardware of an IoT processing device depicted in FIG. 7.

Finally, clusters of Edge/IoT processing devices may be equipped to communicate with other Edge/IoT processing devices as well as with a cloud network. This may enable the Edge/IoT processing devices to form an ad-hoc network between the devices, enabling them to function as a single device, which may be termed a fog device, fog platform, or fog network. This configuration is discussed further with respect to FIG. 6 below.

Figure 6:
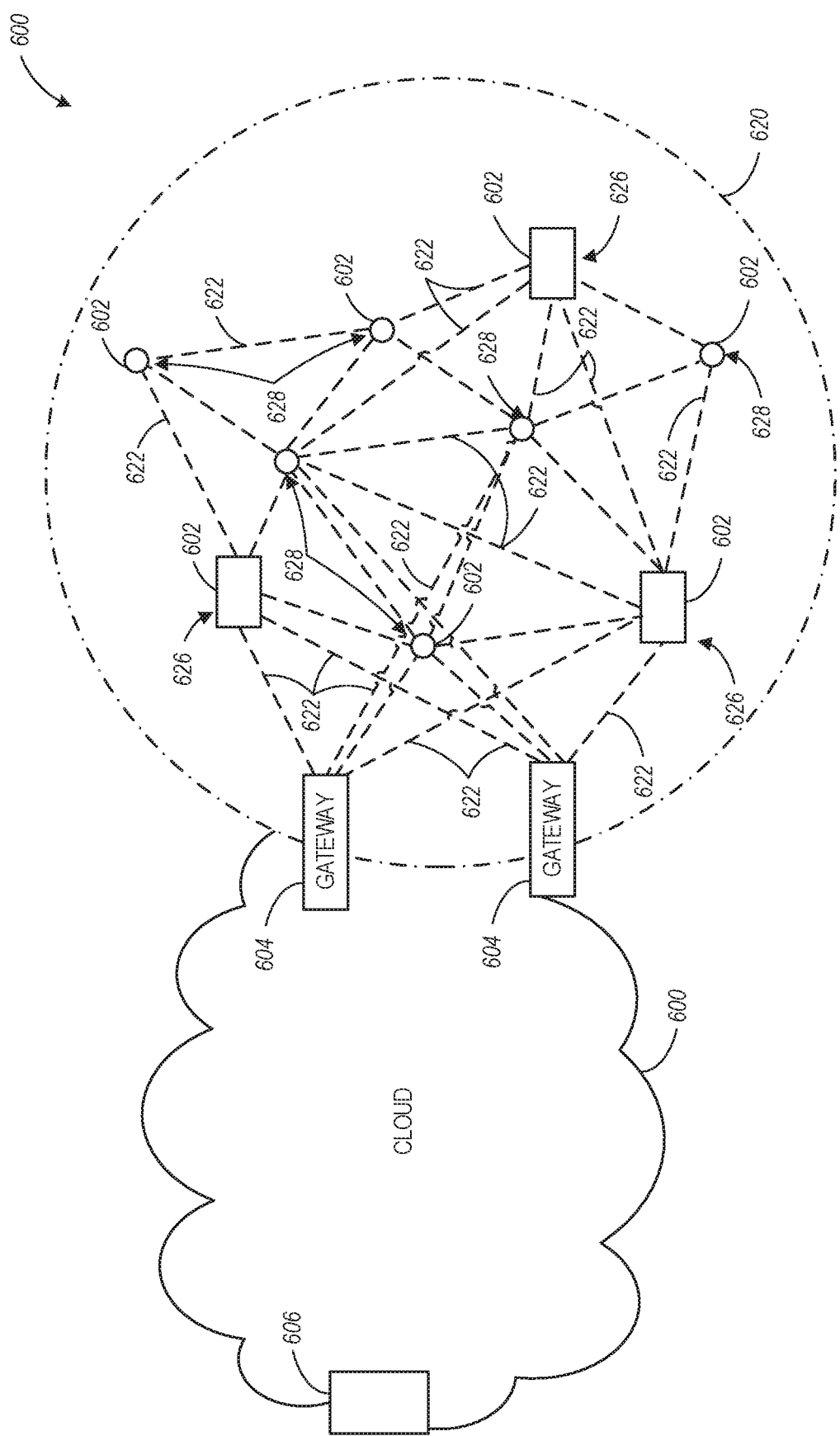
FIG. 6 illustrates a cloud-computing network in communication with a mesh network of Edge/IoT processing devices operating as fog devices at the edge of the cloud computing network, according to an example.

FIG. 6 illustrates a cloud-computing network in communication with a mesh network of Edge/IoT processing devices (devices 602) operating as fog devices at the edge of the cloud computing network, according to an example. The mesh network of Edge/IoT processing devices may be termed a fog network 620, established from a network of devices operating at the edge of the cloud 600. To simplify the diagram, not every Edge/IoT processing device 602 is labeled.

The fog network 620 may be considered to be a massively interconnected network wherein a number of Edge/IoT processing devices 602 are in communications with each other, for example, by radio links 622. The fog network 620 may establish a horizontal, physical, or virtual resource platform that can be considered to reside between IoT edge devices and cloud or data centers. A fog network, in some examples, may support vertically-isolated, latency-sensitive applications through layered, federated, or distributed computing, storage, and network connectivity operations. However, a fog network may also be used to distribute resources and services at and among the edge and the cloud. Thus, references in the present document to the "edge", "fog", and "cloud" are not necessarily discrete or exclusive of one another.

As an example, the fog network 620 may be facilitated using an interconnect specification released by the Open Connectivity Foundation™ (OCF). This standard enables devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of Edge/IoT processing devices 602 are shown in this example, gateways 604, data aggregators 626, and sensors 628, although any combinations of Edge/IoT processing devices 602 and functionality may be used. The gateways 604 may be edge devices that provide communications between the cloud 600 and the fog 620 and may also provide the backend process function for data obtained from sensors 628, such as motion data, flow data, temperature data, and the like. The data aggregators 626 may collect data from any number of the sensors 628 and perform the back-end processing function for the analysis. The results, raw data, or both may be passed along to the cloud 600 through the gateways 604. The sensors 628 may be full Edge/IoT processing devices 602, for example, capable of both collecting data and processing the data. In some cases, the sensors 628 may be more limited in functionality, for example, collecting the data and enabling the data aggregators 626 or gateways 604 to process the data.

Communications from any of the Edge/IoT processing devices 602 may be passed along a convenient path (e.g., a most convenient path) between any of the Edge/IoT processing devices 602 to reach the gateways 604. In these networks, the number of interconnections provides substantial redundancy, enabling communications to be maintained, even with the loss of a number of Edge/IoT processing devices 602. Further, the use of a mesh network may enable Edge/IoT processing devices 602 that are very low power or located at a distance from infrastructure to be used, as the range to connect to another Edge/IoT processing devices 602 may be much less than the range to connect to the gateways 604.

The fog network 620 provided from these Edge/IoT processing devices 602 may be presented to devices in the cloud 600, such as a server 606, as a single device located at the edge of the cloud 600, e.g., a fog device. In this example, the alerts coming from the Fog device may be sent without being identified as coming from a specific Edge/IoT processing devices 602 within the fog 620. In this fashion, the fog 620 may be considered a distributed platform that provides computing and storage resources to perform processing or data-intensive tasks such as data analytics, data aggregation, and machine learning, among others.

In some examples, the Edge/IoT processing devices 602 may be configured using an imperative programming style, e.g., with each Edge/IoT processing devices 602 having a specific function and communication partners. However, the Edge/IoT processing devices 602 forming the fog device may be configured in a declarative programming style, enabling the Edge/IoT processing devices 602 to reconfigure their operations and communications, such as to determine needed resources in response to conditions, queries, and device failures. As an example, a query from a user located at a server 606 about the operations of a subset of equipment monitored by the Edge/IoT processing devices 602 may result in the fog 620 device selecting the Edge/IoT processing devices 602, such as particular sensors 628, needed to answer the query. The data from these sensors 628 may then be aggregated and analyzed by any combination of the sensors 628, data aggregators 626, or gateways 604, before being sent on by the fog 620 device to the server 606 to answer the query. In this example, Edge/IoT processing devices 602 in the fog 620 may select the sensors 628 used based on the query, such as adding data from flow sensors or temperature sensors. Further, if some of the Edge/IoT processing devices 602 are not operational, other Edge/IoT processing devices 602 in the fog 620 device may provide analogous data, if available.

In other examples, the operations and functionality described above may be embodied by an Edge/IoT processing device machine in the example form of an electronic processing system, within which a set or sequence of instructions may be executed to cause the electronic processing system to perform any one of the methodologies discussed herein, according to an example. The machine may be an Edge/IoT processing device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine.

Further, these and like examples to a processor-based system shall be taken to include any set of one or more machines that are controlled by or operated by a processor, set of processors, or processing circuitry (e.g., a machine in the form of a computer, UE, MEC processing device, IoT processing device, etc.) to individually or jointly execute instructions to perform any one or more of the methodologies discussed herein. Accordingly, in various examples, applicable means for processing (e.g., processing, controlling, generating, evaluating, etc.) may be embodied by such processing circuitry.

Figure 7:
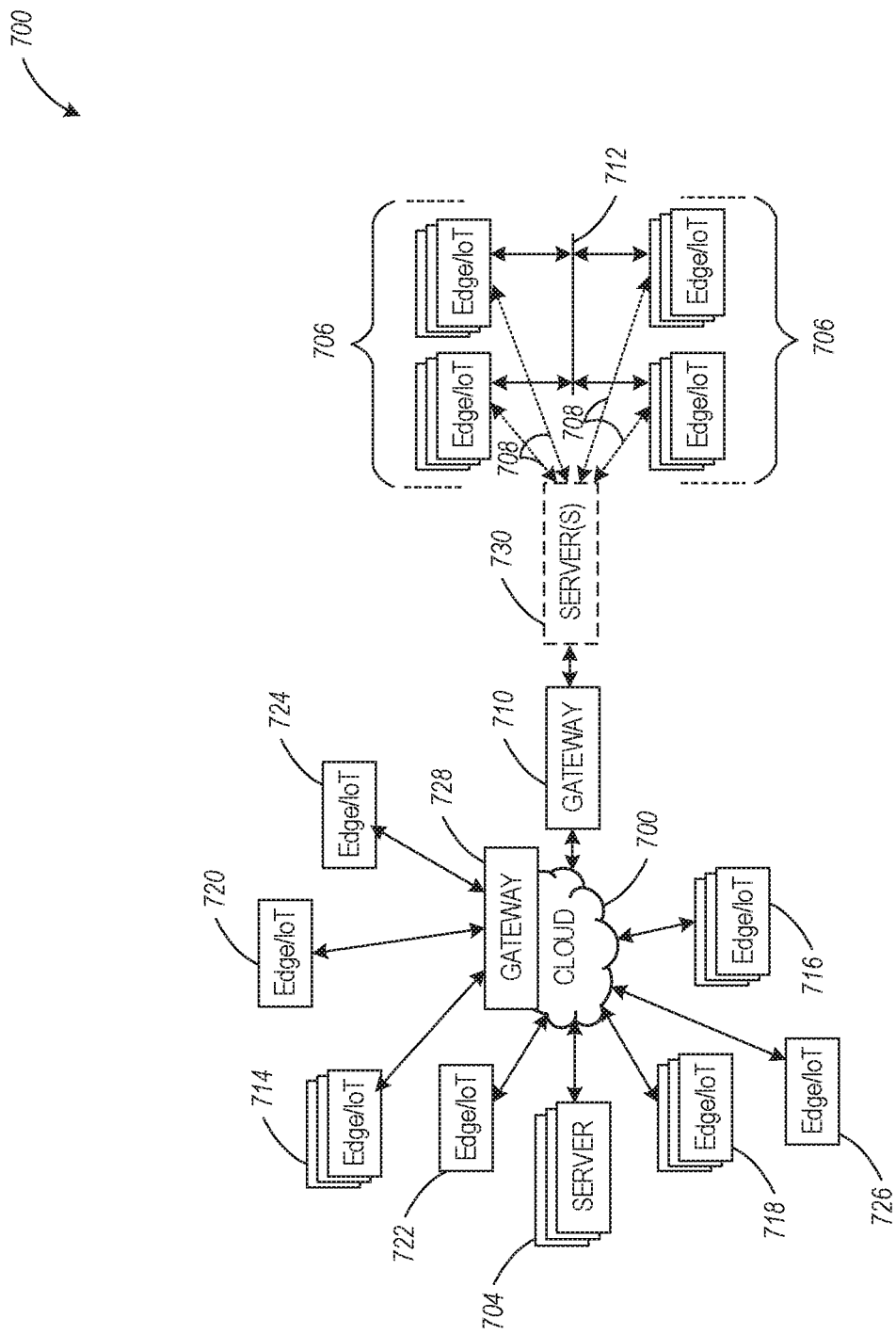
FIG. 7 illustrates a block diagram of a cloud computing network in communication with a number of Edge/IoT processing devices, according to an example.

FIG. 7 illustrates a block diagram of a cloud computing network, or cloud 700, in communication with a number of Edge/IoT processing devices, according to an example. The cloud computing network (or "cloud") 700 may represent the Internet or may be a local area network (LAN), or a wide area network (WAN), such as a proprietary network for a company. The Edge/IoT processing devices may include any number of different types of devices, grouped in various combinations. For example, a traffic control group 706 may include Edge/IoT processing devices along streets in a city. These Edge/IoT processing devices may include stoplights, traffic flow monitors, cameras, weather sensors, and the like. The traffic control group 706, or other subgroups, may be in communication with the cloud 700 through wired or wireless links 708, such as LPWA links, optical links, and the like. Further, a wired or wireless sub-network 712 may allow the Edge/IoT processing devices to communicate with each other, such as through a local area network, a wireless local area network, and the like. The Edge/IoT processing devices may use another device, such as a gateway 710 or 728 to communicate with remote locations such as the cloud 700; the Edge/IoT processing devices may also use one or more servers 730 to facilitate communication with the cloud 700 or with the gateway 710. For example, the one or more servers 730 may operate as an intermediate network node to support a local edge cloud or fog implementation among a local area network. Further, the gateway 728 that is depicted may operate in a cloud-to-gateway-to-many edge devices configuration, such as with the various Edge/IoT processing devices 714, 720, 724 being constrained or dynamic to an assignment and use of resources in the cloud 700.

Other example groups of Edge/IoT processing devices may include remote weather stations 714, local information terminals 716, alarm systems 718, automated teller machines 720, alarm panels 722, or moving vehicles, such as emergency vehicles 724 or other vehicles 726, among many others. Each of these Edge/IoT processing devices may be in communication with other Edge/IoT processing devices, with servers 704, with another IoT fog platform or system, or a combination therein. The groups of Edge/IoT processing devices may be deployed in various residential, commercial, and industrial settings (including in both private or public environments).

As may be seen from FIG. 7, a large number of Edge/IoT processing devices may be communicating through the cloud 700. This may allow different Edge/IoT processing devices to request or provide information to other devices autonomously. For example, a group of Edge/IoT processing devices (e.g., the traffic control group 706) may request a current weather forecast from a group of remote weather stations 714, which may provide the forecast without human intervention. Further, an emergency vehicle 724 may be alerted by an automated teller machine 720 that a burglary is in progress. As the emergency vehicle 724 proceeds towards the automated teller machine 720, it may access the traffic control group 706 to request clearance to the location, for example, by lights turning red to block cross traffic at an intersection insufficient time for the emergency vehicle 724 to have unimpeded access to the intersection.

Clusters of Edge/IoT processing devices, such as the remote weather stations 714 or the traffic control group 706, may be equipped to communicate with other Edge/IoT processing devices as well as with the cloud 700. This may allow the Edge/IoT processing devices to form an ad-hoc network between the devices, allowing them to function as a single device, which may be termed a fog platform or system.

Figure 8:
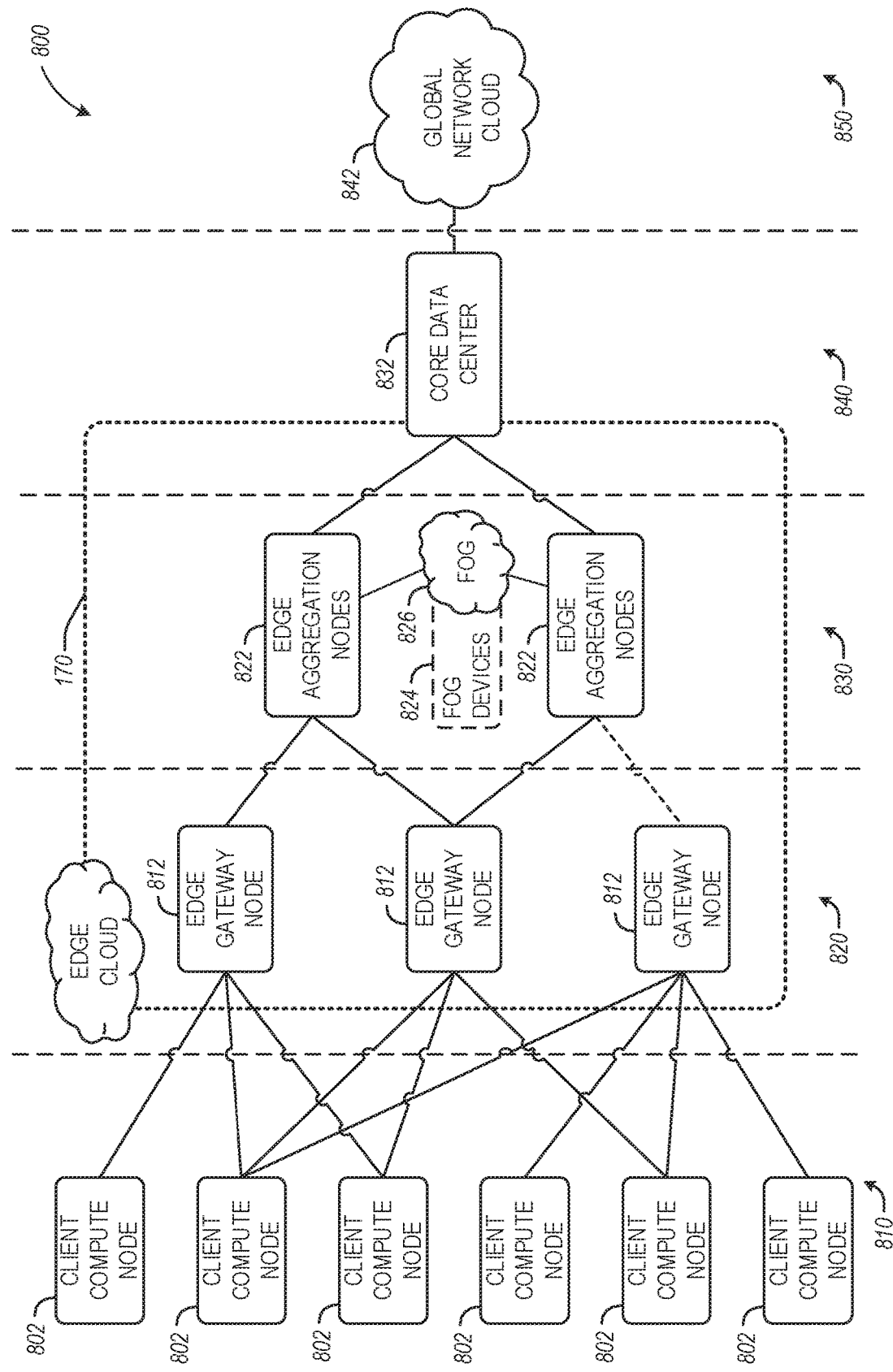
FIG. 8 provides an overview of layers of distributed compute deployed among an edge computing system, according to an example.

FIG. 8 provides an overview of layers of distributed compute deployed among an edge computing system, according to an example. More specifically, FIG. 8 generically depicts an edge-computing system for providing edge services and applications to multi-stakeholder entities, as distributed among one or more client compute nodes 802, one or more edge gateway nodes 812, one or more edge aggregation nodes 822, one or more core data centers 832, and a global network cloud 842, as distributed across layers of the network. The implementation of the edge computing system may be provided at or on behalf of a telecommunication service provider ("telco", or "TSP"), internet-of-things service provider, cloud service provider (CSP), enterprise entity, or any other number of entities.

Each node or device of the edge computing system is located at a particular layer corresponding to layers 810, 820, 830, 840, and 850. For example, the client compute nodes 802 are each located at an endpoint layer 810, while each of the edge gateway nodes 812 is located at an edge devices layer 820 (local level) of the edge computing system. Additionally, each of the edge aggregation nodes 822 (and/or fog devices 824, if arranged or operated with or among a fog networking configuration 826) is located at a network access layer 830 (an intermediate level). Fog computing (or "fogging") generally refers to extensions of cloud computing to the edge of an enterprise's network, typically in a coordinated distributed or multi-node network. Some forms of fog computing provide the deployment of compute, storage, and networking services between end devices and cloud computing data centers, on behalf of the cloud computing locations. Such forms of fog computing provide operations that are consistent with edge computing as discussed herein; many of the edge computing aspects discussed herein are applicable to fog networks, fogging, and fog configurations. Further, aspects of the edge computing systems discussed herein may be configured as a fog, or aspects of fog may be integrated into an edge-computing architecture.

The core data center 832 is located at a core network layer 840 (a regional or geographically-central level), while the global network cloud 842 is located at a cloud data center layer 850 (a national or global layer). The use of "core" is provided as a term for a centralized network location-deeper in the network-which is accessible by multiple edge nodes or components; however, a "core" does not necessarily designate the "center" or the deepest location of the network. Accordingly, the core data center 832 may be located within, at, or near the edge cloud 170.

Although an illustrative number of client compute nodes 802, edge gateway nodes 812, edge aggregation nodes 822, core data centers 832, and global network clouds 842 are shown in FIG. 8, it should be appreciated that the edge computing system may include more or fewer devices or systems at each layer. Additionally, as shown in FIG. 8, the number of components of each layer 810, 820, 830, 840, and 850 generally increases at each lower level (i.e., when moving closer to endpoints). As such, one edge gateway node 812 may service multiple client compute nodes 802, and one edge aggregation node 822 may service multiple edge gateway nodes 812.

Consistent with the examples provided herein, each client compute node 802 may be embodied as any type of endpoint component, device, appliance, or "thing" capable of communicating as a producer or consumer of data. Further, the label "node" or "device" as used in the edge computing system 800 does not necessarily mean that such node or device operates in a client or slave role; rather, any of the nodes or devices in the edge computing system 800 refer to individual entities, nodes, or subsystems which include discrete or connected hardware or software configurations to facilitate or use the edge cloud 170.

As such, the edge cloud 170 is formed from network components and functional features operated by and within the edge gateway nodes 812 and the edge aggregation nodes 822 of layers 820, 830, respectively. The edge cloud 170 may be embodied as any type of network that provides edge computing and/or storage resources which are proximately located to radio access network (RAN) capable endpoint devices (e.g., mobile computing devices, IoT devices, smart devices, etc.), which are shown in FIG. 8 as the client compute nodes 802. In other words, the edge cloud 170 may be envisioned as an "edge" which connects the endpoint devices and traditional mobile network access points that serves as an ingress point into service provider core networks, including carrier networks (e.g., Global System for Mobile Communications (GSM) networks, Long-Term Evolution (LTE) networks, 5G networks, etc.), while also providing storage and/or compute capabilities. Other types and forms of network access (e.g., Wi-Fi, long-range wireless networks) may also be utilized in place of or in combination with such 3GPP carrier networks.

In some examples, the edge cloud 170 may form a portion of or otherwise provide an ingress point into or across a fog networking configuration 826 (e.g., a network of fog devices 824, not shown in detail), which may be embodied as a system-level horizontal and distributed architecture that distributes resources and services to perform a specific function. For instance, a coordinated and distributed network of fog devices 824 may perform computing, storage, control, or networking aspects in the context of an IoT system arrangement. Other networked, aggregated, and distributed functions may exist in the edge cloud 170 between the core data center layer 850 and the client endpoints (e.g., client compute nodes 802). Some of these are discussed in the following sections in the context of network functions or service virtualization, including the use of virtual edges and virtual services which are orchestrated for multiple stakeholders.

As discussed in more detail below, the edge gateway nodes 812 and the edge aggregation nodes 822 cooperate to provide various edge services and security to the client compute nodes 802. Furthermore, because each client compute node 802 may be stationary or mobile, each edge gateway node 812 may cooperate with other edge gateway devices to propagate presently provided edge services and security as the corresponding client compute node 802 moves about a region. To do so, each of the edge gateway nodes 812 and/or edge aggregation nodes 822 may support multiple tenancies and multiple stakeholder configurations, in which services from (or hosted for) multiple service providers and multiple consumers may be supported and coordinated across a single or multiple compute devices.

[0163]1 In further examples, any of the compute nodes or devices discussed with reference to the present edge computing systems and environment may be fulfilled based on the components depicted in FIG. 8-FIG. 10. Each edge compute node may be embodied as a type of device, appliance, computer, or other "thing" capable of communicating with another edge, networking, or endpoint components. For example, an edge compute device may be embodied as a smartphone, a mobile compute device, a smart appliance, an in-vehicle compute system (e.g., a navigation system), or other device or system capable of performing the described functions.

Figure 9:
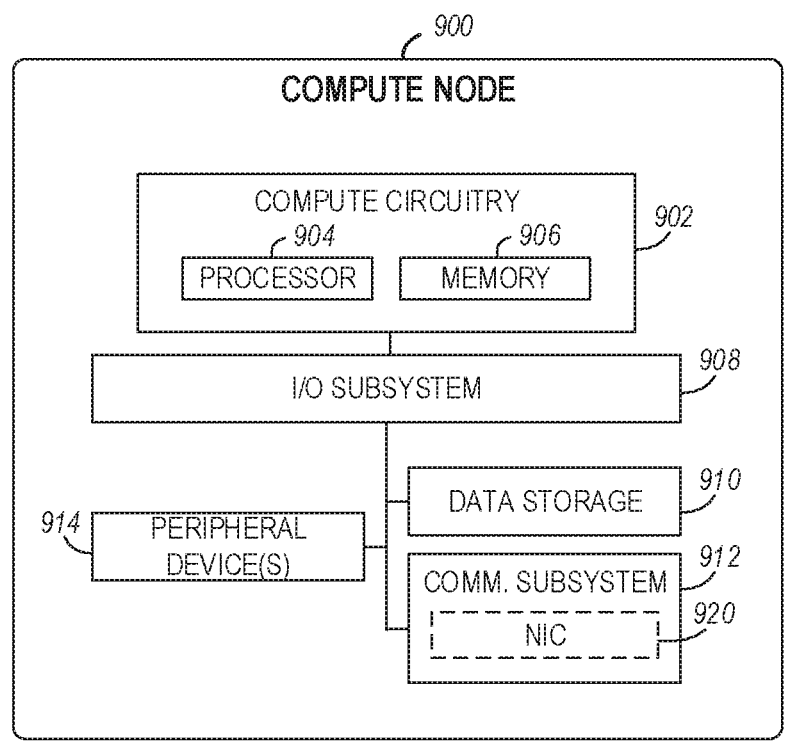
FIG. 9 provides an overview of example components for compute deployed at a compute node in an edge-computing system, according to an example.

FIG. 9 provides an overview of example components for compute deployed at a compute node in an edge-computing system, according to an example. FIG. 10 provides a further overview of example components within a computing device in an edge-computing system for implementing the techniques (e.g., operations, processes, methods, and methodologies) described herein, according to an example. In the simplified example depicted in FIG. 9, an edge compute node 900 includes a compute engine (also referred to herein as "compute circuitry") 902, an input/output (I/O) subsystem 908, data storage 910, a communication circuitry subsystem 912, and, optionally, one or more peripheral devices 914. In other examples, each compute device may include other or additional components, such as those used in personal or server computing systems (e.g., a display, peripheral devices, etc.). Additionally, in some examples, one or more of the illustrative components may be incorporated in, or otherwise form a portion of, another component.

The compute node 900 may be embodied as any type of engine, device, or collection of devices capable of performing various compute functions. In some examples, the compute node 900 may be embodied as a single device such as an integrated circuit, an embedded system, a field-programmable gate array (FPGA), a system-on-a-chip (SOC), or other integrated system or device. In the illustrative example, the compute node 900 includes or is embodied as a processor 904 and a memory 906. The processor 904 may be embodied as any type of processor capable of performing the functions described herein (e.g., executing an application). For example, the processor 904 may be embodied as a multi-core processor(s), a microcontroller, or other processor or processing/controlling circuit. In some examples, the processor 904 may be embodied as, include, or be coupled to an FPGA, an application-specific integrated circuit (ASIC), reconfigurable hardware or hardware circuitry, or other specialized hardware to facilitate performance of the functions described herein.

The main memory 906 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In one example, the memory device is a block addressable memory device, such as those based on NAND or NOR technologies. A memory device may also include a three-dimensional crosspoint memory device (e.g., Intel 3D XPoint™ memory), or another byte addressable write-in-place nonvolatile memory devices. The memory device may refer to the die itself and/or to a packaged memory product. In some examples, 3D crosspoint memory (e.g., Intel 3D XPoint™ memory) may comprise a transistor-less stackable cross-point architecture in which memory cells sit at the intersection of word lines and bit lines and are individually addressable and in which bit storage is based on a change in bulk resistance. In some examples, all or a portion of the main memory 906 may be integrated into the processor 904. The main memory 906 may store various software and data used during operation such as one or more applications, data operated on by the application(s), libraries, and drivers.

The compute circuitry 902 is communicatively coupled to other components of the compute node 900 via the I/O subsystem 908, which may be embodied as circuitry and/or components to facilitate input/output operations with the compute circuitry 902 (e.g., with the processor 904 and/or the main memory 906) and other components of the compute circuitry 902. For example, the I/O subsystem 908 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 908 may form a portion of a system-on-a-chip (SoC) and be incorporated, along with one or more of the processor 904, the main memory 906, and other components of the compute circuitry 902, into the compute circuitry 902.

The one or more illustrative data storage devices 910 may be embodied as any type of device configured for short-term or long-term storage of data such as, for example, memory devices and circuits, memory cards, hard disk drives, solid-state drives, or other data storage devices. Each data storage device 910 may include a system partition that stores data and firmware code for the data storage device 910. Each data storage device 910 may also include one or more operating system partitions that store data files and executables for operating systems depending on, for example, the type of compute node 900.

The communication circuitry subsystem 912 may be embodied as any communication circuit, device, or collection thereof, capable of enabling communications over a network between the compute circuitry 902 and another compute device (e.g., an edge gateway node 812 of the edge computing system 800). The communication circuitry subsystem 912 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, etc.) to effect such communication.

The illustrative communication circuitry subsystem 912 includes a network interface controller (NIC) 920, which may also be referred to as a host fabric interface (HFI). The NIC 920 may be embodied as one or more add-in-boards, daughter cards, network interface cards, controller chips, chipsets, or other devices that may be used by the compute node 900 to connect with another compute device (e.g., an edge gateway node 812). In some examples, the NIC 920 may be embodied as part of a system-on-a-chip (SoC) that includes one or more processors or included on a multichip package that also contains one or more processors. In some examples, the NIC 920 may include a local processor (not shown) and/or a local memory (not shown) that are both local to the NIC 920. In such examples, the local processor of the NIC 920 may be capable of performing one or more of the functions of the compute circuitry 902 described herein. Additionally, or alternatively, in such examples, the local memory of the NIC 920 may be integrated into one or more components of the client compute node at the board level, socket level, chip level, and/or other levels.

Additionally, in some examples, each compute node 900 may include one or more peripheral devices 914. Such peripheral devices 914 may include any type of peripheral device found in a compute device or server such as audio input devices, a display, other input/output devices, interface devices, and/or other peripheral devices, depending on the particular type of the compute node 900. In further examples, the compute node 900 may be embodied by a respective edge compute node in an edge-computing system (e.g., client compute node 802, edge gateway node 812, edge aggregation nodes 822) or like forms of appliances, computers, subsystems, circuitry, or other components.

Figure 10:
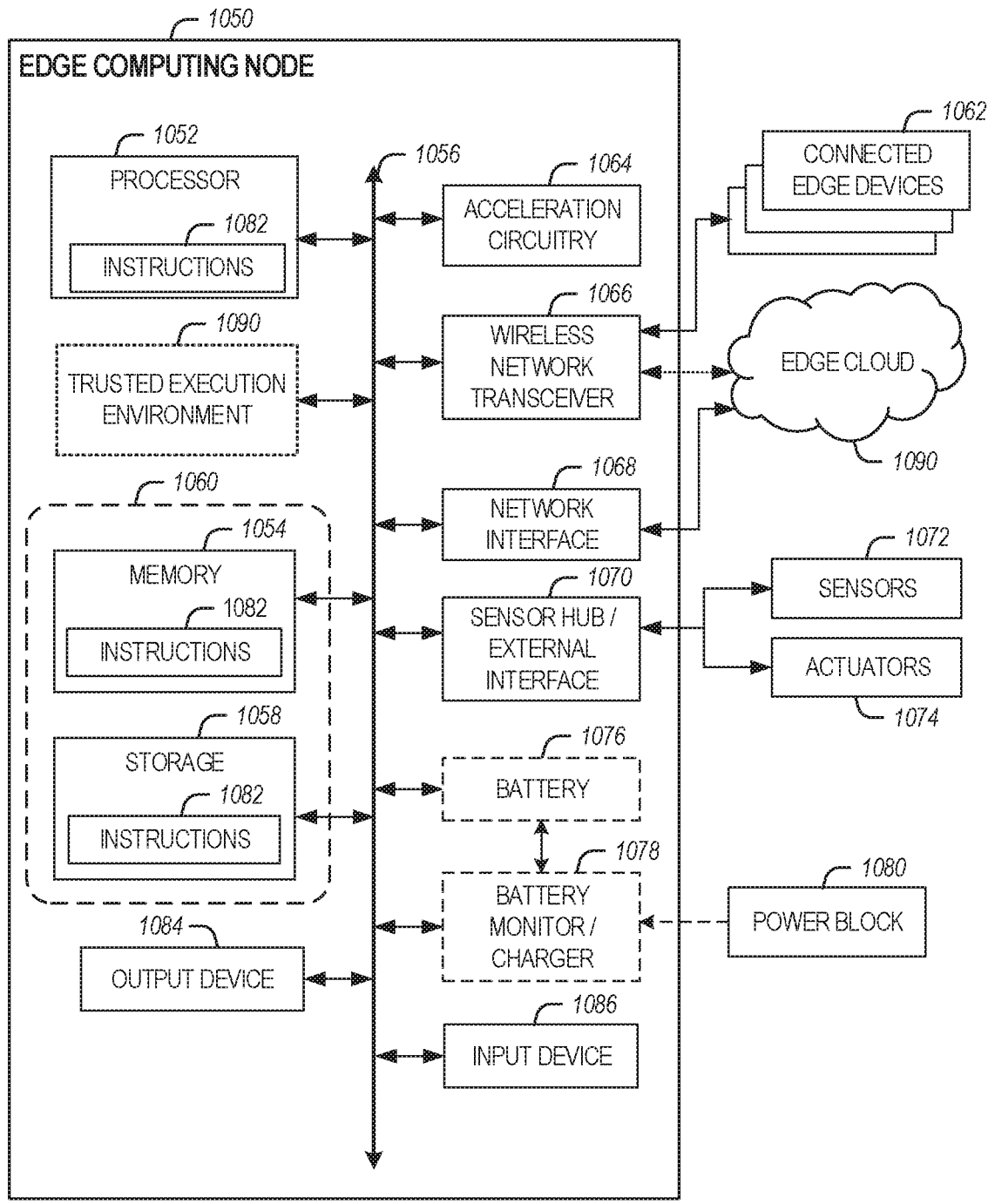
FIG. 10 provides a further overview of example components within a computing device in an edge-computing system for implementing the techniques (e.g., operations, processes, methods, and methodologies) described herein, according to an example.

In a more detailed example, FIG. 10 illustrates a block diagram of an example of components that may be present in an edge computing node 1050 for implementing the techniques (e.g., operations, processes, methods, and methodologies) described herein. The edge computing node 1050 may include any combinations of the components referenced above, and it may include any device usable with an edge communication network or a combination of such networks. The components may be implemented as ICs, portions thereof, discrete electronic devices, or other modules, logic, hardware, software, firmware, or a combination thereof adapted in the edge computing node 1050, or as components otherwise incorporated within a chassis of a larger system.

The edge computing node 1050 may include processing circuitry in the form of a processor 1052, which may be a microprocessor, a multi-core processor, a multithreaded processor, an ultra-low voltage processor, an embedded processor, or other known processing elements. The processor 1052 may be a part of a system on a chip (SoC) in which the processor 1052 and other components are formed into a single integrated circuit, or a single package, such as the Edison™ or Galileo™ SoC boards from Intel Corporation, Santa Clara, Calif. As an example, the processor 1052 may include an Intel® Architecture Core™ based processor, such as a Quark™, an Atom™, an i3, an i5, an i7, or an MCU-class processor, or another such processor available from Intel®. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc.

The processor 1052 may communicate with a system memory 1054 over an interconnect 1056 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1058 may also couple to the processor 1052 via the interconnect 1056. In an example, the storage 1058 may be implemented via a solid-state disk drive (SSDD). Other devices that may be used for the storage 1058 include flash memory cards, such as SD cards, microSD cards, XD picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin-transfer torque (STT)-MRAM, a spintronic magnetic junction memory-based device, a magnetic tunneling junction (MTJ) based device, a DW (Domain Wall) and SOT (Spin-Orbit Transfer) based device, a thyristor-based memory device, or a combination of any of the above, or other memory.

In low power implementations, the storage 1058 may be on-die memory or registers associated with the processor 1052. However, in some examples, the storage 1058 may be implemented using a micro hard disk drive (HDD). Further, any number of new technologies may be used for the storage 1058 in addition to, or instead of, the technologies described, such resistance change memories, phase change memories, holographic memories, or chemical memories, among others.

The components may communicate over the interconnect 1056. The interconnect 1056 may include any number of technologies, including industry-standard architecture (ISA), extended ISA (EISA), peripheral component interconnect (PCI), peripheral component interconnect extended (PCIx), PCI express (PCIe), or any number of other technologies. The interconnect 1056 may be a proprietary bus, for example, used in an SoC based system. Other bus systems may be included, such as an I2C interface, an SPI interface, point to point interfaces, and a power bus, among others.

The interconnect 1056 may couple the processor 1052 to a transceiver 1066, for communications with the connected edge devices 1062. The transceiver 1066 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 1062. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 1066 (or multiple transceivers) may communicate using multiple standards or radios for communications at a different range. For example, the edge computing node 1050 may communicate with close devices, e.g., within about 10 meters, using a local transceiver based on BLE, or another low power radio, to save power. More distant connected edge devices 1062, e.g., within about 50 meters, may be reached over ZigBee or other intermediate power radios. Both communications techniques may take place over a single radio at different power levels or may take place over separate transceivers, for example, a local transceiver using BLE and a separate mesh transceiver using ZigBee.

A wireless network transceiver 1066 (e.g., a radio transceiver) may be included to communicate with devices or services in the edge cloud 1090 via local or wide area network protocols. The wireless network transceiver 1066 may be an LPWA transceiver that follows the IEEE 802.15.4, or IEEE 802.15.4g standards, among others. The edge computing node 1050 may communicate over a wide area using LoRaWAN™ (Long Range Wide Area Network) developed by Semtech and the LoRa Alliance. The techniques described herein are not limited to these technologies but may be used with any number of other cloud transceivers that implement long-range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 1066, as described herein. For example, the transceiver 1066 may include a cellular transceiver that uses spread spectrum (SPA/SAS) communications for implementing high-speed communications. Further, any number of other protocols may be used, such as Wi-Fi® networks for medium speed communications and provision of network communications. The transceiver 1066 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 1068 may be included to provide a wired communication to nodes of the edge cloud 1090 or to other devices, such as the connected edge devices 1062 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 1068 may be included to enable connecting to a second network, for example, a first NIC 1068 providing communications to the cloud over Ethernet, and a second NIC 1068 providing communications to other devices over another type of network.

Given the variety of types of applicable communications from the device to another component or network, applicable communications circuitry used by the device may include or be embodied by any one or more of components 1064, 1066, 1068, or 1070. Accordingly, in various examples, applicable means for communicating (e.g., receiving, transmitting, etc.) may be embodied by such communications circuitry.

The edge computing node 1050 may include or be coupled to acceleration circuitry 1064, which may be embodied by one or more AI accelerators, a neural compute stick, neuromorphic hardware, an FPGA, an arrangement of GPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. Accordingly, in various examples, applicable means for acceleration may be embodied by such acceleration circuitry.

The interconnect 1056 may couple the processor 1052 to a sensor hub or external interface 1070 that is used to connect additional devices or subsystems. The devices may include sensors 1072, such as accelerometers, level sensors, flow sensors, optical light sensors, camera sensors, temperature sensors, a global positioning system (GPS) sensors, pressure sensors, barometric pressure sensors, and the like. The hub or interface 1070 further may be used to connect the edge computing node 1050 to actuators 1074, such as power switches, valve actuators, an audible sound generator, a visual warning device, and the like.

In some optional examples, various input/output (I/O) devices may be present within or connected to, the edge computing node 1050. For example, a display or other output device 1084 may be included to show information, such as sensor readings or actuator position. An input device 1086, such as a touch screen or keypad may be included to accept input. An output device 1084 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the edge computing node 1050.

A battery 1076 may power the edge computing node 1050, although, in examples in which the edge computing node 1050 is mounted in a fixed location, it may have a power supply coupled to an electrical grid. The battery 1076 may be a lithium-ion battery, or a metal-air battery, such as a zinc-air battery, an aluminum-air battery, a lithium-air battery, and the like.

A battery monitor/charger 1078 may be included in the edge computing node 1050 to track the state of charge (SoCh) of the battery 1076. The battery monitor/charger 1078 may be used to monitor other parameters of the battery 1076 to provide failure predictions, such as the state of health (SoH) and the state of function (SoF) of the battery 1076. The battery monitor/charger 1078 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 1078 may communicate the information on the battery 1076 to the processor 1052 over the interconnect 1056. The battery monitor/charger 1078 may also include an analog-to-digital (ADC) converter that enables the processor 1052 to directly monitor the voltage of the battery 1076 or the current flow from the battery 1076. The battery parameters may be used to determine actions that the edge computing node 1050 may perform, such as transmission frequency, mesh network operation, sensing frequency, and the like.

A power block 1080, or other power supply coupled to a grid, may be coupled with the battery monitor/charger 1078 to charge the battery 1076. In some examples, the power block 1080 may be replaced with a wireless power receiver to obtain the power wirelessly, for example, through a loop antenna in the edge computing node 1050. A wireless battery charging circuit, such as an LTC4020 chip from Linear Technologies of Milpitas, Calif., among others, may be included in the battery monitor/charger 1078. The specific charging circuits may be selected based on the size of the battery 1076, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1058 may include instructions 1082 in the form of software, firmware, or hardware commands to implement the techniques described herein. Although such instructions 1082 are shown as code blocks included in the memory 1054 and the storage 1058, it may be understood that any of the code blocks may be replaced with hardwired circuits, for example, built into an application-specific integrated circuit (ASIC).

In an example, the instructions 1082 provided via memory 1054, the storage 1058, or the processor 1052 may be embodied as a non-transitory, machine-readable medium 1060 including code to direct the processor 1052 to perform electronic operations in the edge computing node 1050. The processor 1052 may access the non-transitory, machine-readable medium 1060 over the interconnect 1056. For instance, the non-transitory, machine-readable medium 1060 may be embodied by devices described for the storage 1058 or may include specific storage units such as optical disks, flash drives, or any number of other hardware devices. The non-transitory, machine-readable medium 1060 may include instructions to direct the processor 1052 to perform a specific sequence or flow of actions, for example, as described with respect to the flowchart(s) and block diagram(s) of operations and functionality depicted above. As used in, the terms "machine-readable medium" and "computer-readable medium" are interchangeable.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Each of the block diagrams of FIGS. 9 and 10 are intended to depict a high-level view of components of a device, subsystem, or arrangement of an edge computing node. However, it will be understood that some of the components shown may be omitted, additional components may be present, and a different arrangement of the components shown may occur in other implementations.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field-programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

In some aspects, 5G adoption depends on the ability to provide communication service providers (CoSPs) the ability to provision, manage, adjust, and operate multiple virtual networks over a common set of physical (wireless and wired) network infrastructure, including managing processor core resources efficiently, while minimizing power consumption (e.g., by using one or more of the techniques discussed in connection with FIG. 11-FIG. 20).

Figure 11:
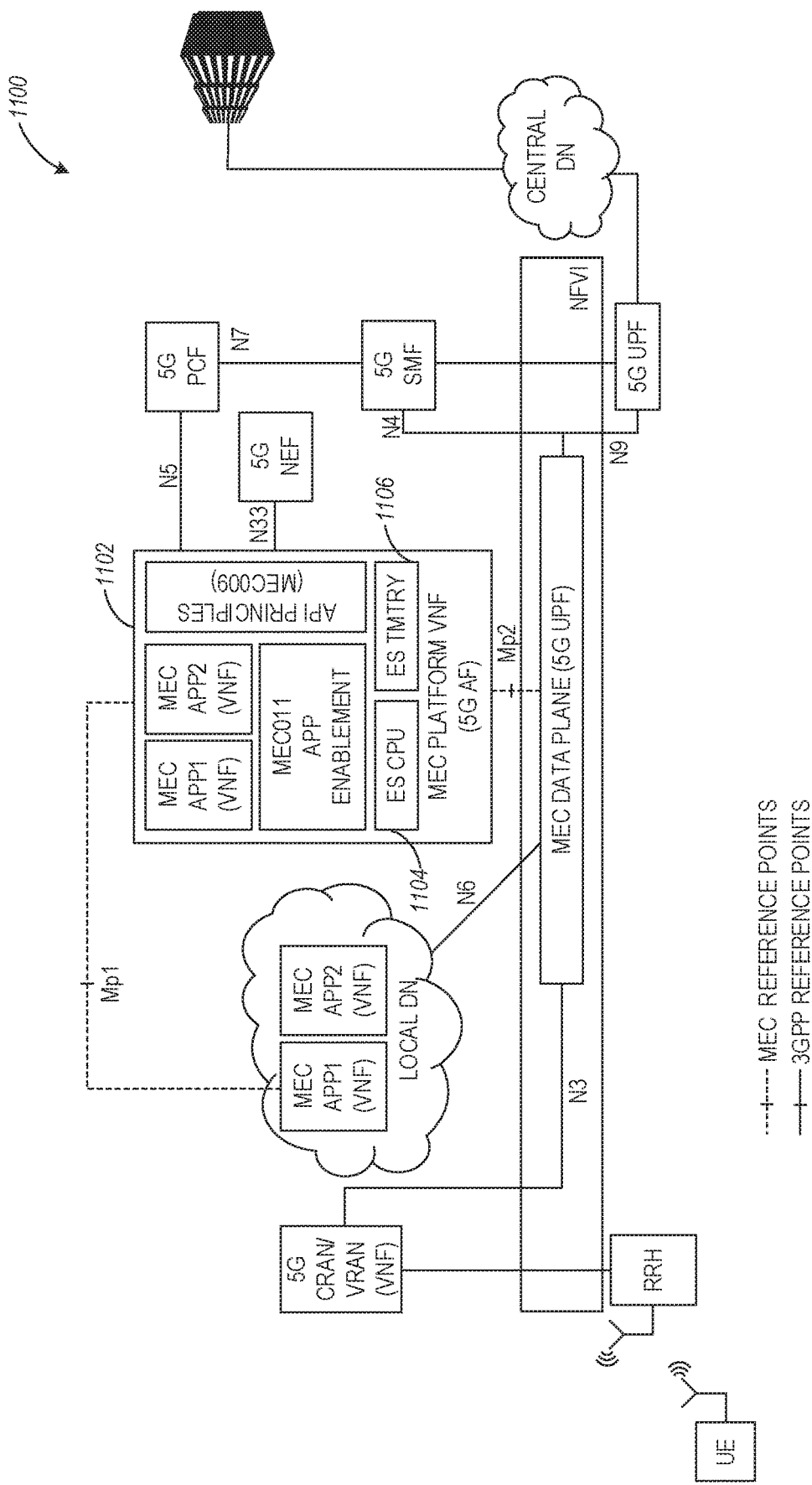
FIG. 11 illustrates a 3GPP-based 5G system architecture using an edge server CPU with dynamic deterministic scaling, and examples of the mapping of MEC entities to some of the 5G system's components (namely, AF and UPF), according to an example.

FIG. 11 illustrates a 3GPP-based 5G system architecture 1100 using an edge server CPU with dynamic deterministic scaling, and examples of the mapping of MEC entities to some of the 5G system's components (namely, AF and UPF), according to an example. The architecture 1100 can be configured to provide functionalities in accordance with the ETSI GS MEC-003 specification and/or the ETSI GR MEC-017 specification.

The considered communications system incorporates a MEC system, the architecture of which is specified in ETSI GS MEC-003, deployed in a 5G network, the system architecture of which is specified in 3GPP TS 23.501. The assumption is to consider all logical functions (i.e. network functions (NFs) and also application functions (AFs)) as virtualized ones. The mapping of MEC entities into a 5G system is depicted in FIG. 11. In particular: a MEC platform is implemented as a particular application function (AF) in 3GPP; the Data Plane in the MEC architecture corresponds to a User Plane Function (UPF) in 3GPP, and the MEC apps are mapped to the local DN (Data Network) in 3GPP.

In some aspects, a starting point is to consider that the End-to-End (E2E) 5G system performance depends not only on the performance of Radio Access Network (RAN) and Core Network (CN) system components alone but also on the performance of the MEC functional entities.

Example: the E2E latency (i.e. between the UE and the MEC application), is composed of the Packet Delay Budget (PDB) (defined in 5G as the E2E delay between the UE and UPF, with a confidence of 98%) and the additional delay between the UPF and the Local DN (where the MEC apps are located). This second latency component is not taken into account by 5G QoS Class Identifier (5QI) characteristics in 3GPP, although it is important for performance optimization, as it is tightly related to the instantiation of the MEC applications. As a consequence, since the user traffic termination point is at the MEC app (located in the DN), network slice-relevant performance metrics (such as the PDB) are not sufficient to describe the overall E2E performance. Instead, MEC application instantiation and the related Virtual Machine (VM) allocation should be carefully considered in order to optimize the total E2E latency, as per the slice requirements.

In some aspects, one or more of the network nodes within the 5G system architecture 1100 (e.g., a network node 1102 used for executing the Mobile Edge platform or VNF) can implement an edge server CPU 1104 and an edge server telemetry module 1106. The edge server CPU 1104 and the telemetry module 1106 can perform functionalities similar to the edge server CPU 434 the telemetry module 441 discussed in connection with FIG. 4A, or discussed in connection with any of FIGS. 12-20.

Figure 12:
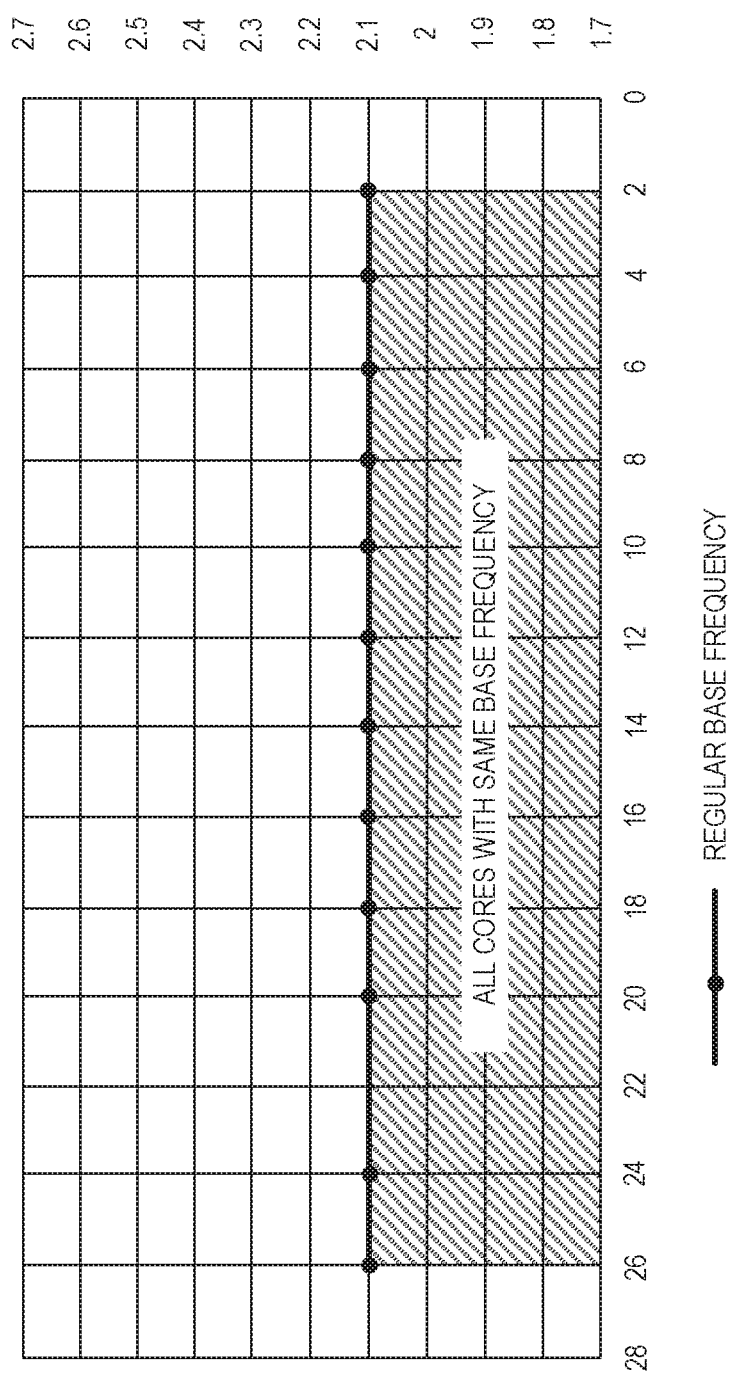
FIG. 12 illustrates the usage of processor cores with the same base frequency, according to an example.

FIG. 12 illustrates the usage of processor cores with the same base frequency (also referred to as center base frequency), according to an example. More specifically, diagram 1200 illustrates a plurality of processor cores that are configured with the same base frequency (e.g., 2.1 GHz). A CPU with processor cores that use a single base frequency can be referred to as a legacy CPU.

Figure 13:
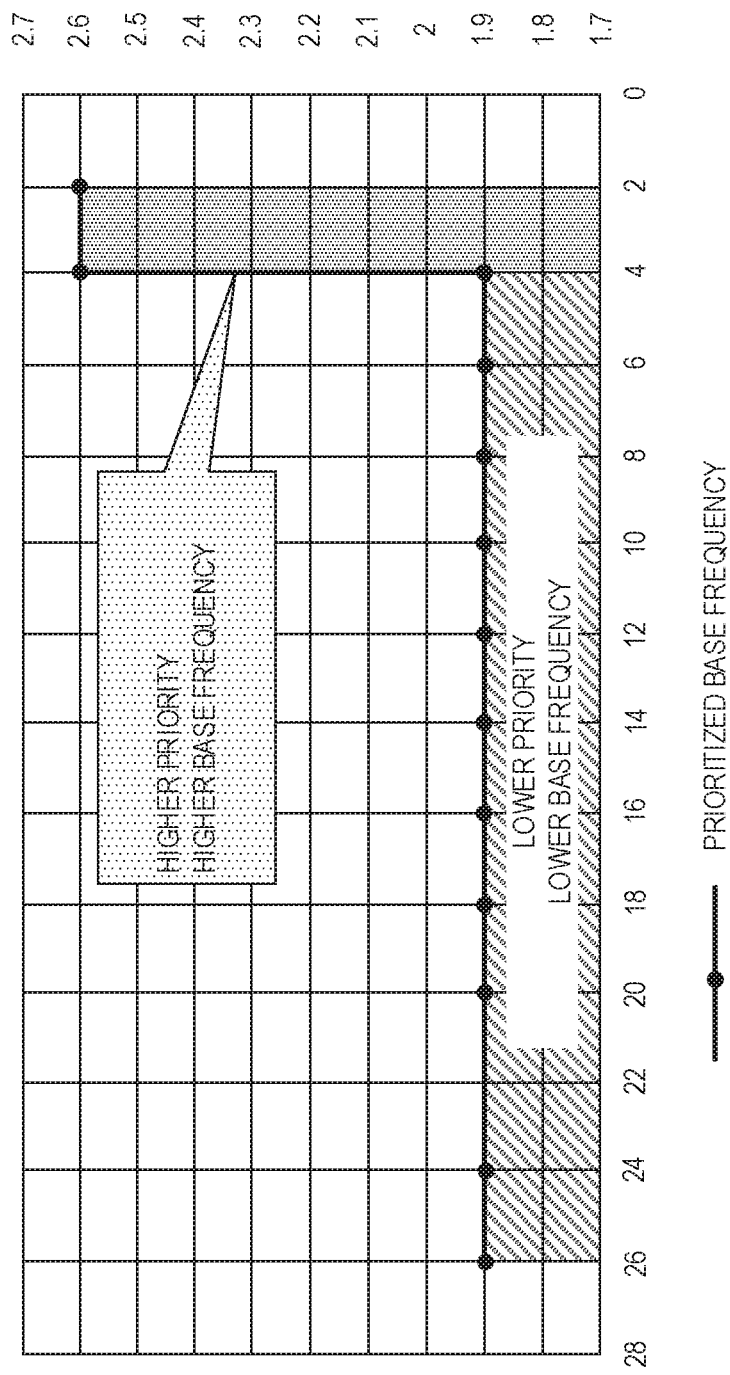
FIG. 13 illustrates the usage of two different sets of processor cores, with the two sets having different base frequencies, according to an example.

FIG. 13 illustrates the usage of two different sets of processor cores, with the two sets having different base frequencies, according to an example. More specifically, diagram 1300 illustrates a plurality of processor cores that are configured with different base frequencies. As illustrated in FIG. 13, processor cores 2-4 are configured with a higher base frequency (e.g., 2.6 GHz), and processor cores 4-26 are configured with a lower base frequency (e.g., 1.9 GHz). The processor cores configured with the lower base frequency can be referred to as low priority cores or a low priority processor core set. The processor cores configured with the higher base frequency can be referred to as high priority cores or a high priority processor core set. A CPU with processor cores that use different priorities and different base frequencies can be used in connection with an edge server CPU configured for dynamic deterministic scaling of processing resources, as discussed herein.

Even though FIG. 13 (and the disclosure herein) discusses the use of only two different base frequencies, the disclosure is not limited in this regard and multiple deterministic base frequencies (e.g., more than two base frequencies) can be used instead. In this regard, the same processor core can be configured to switch between the multiple base frequencies, with minimal power impact, allowing the CPU to scale to a deterministic performance.

Figure 14:
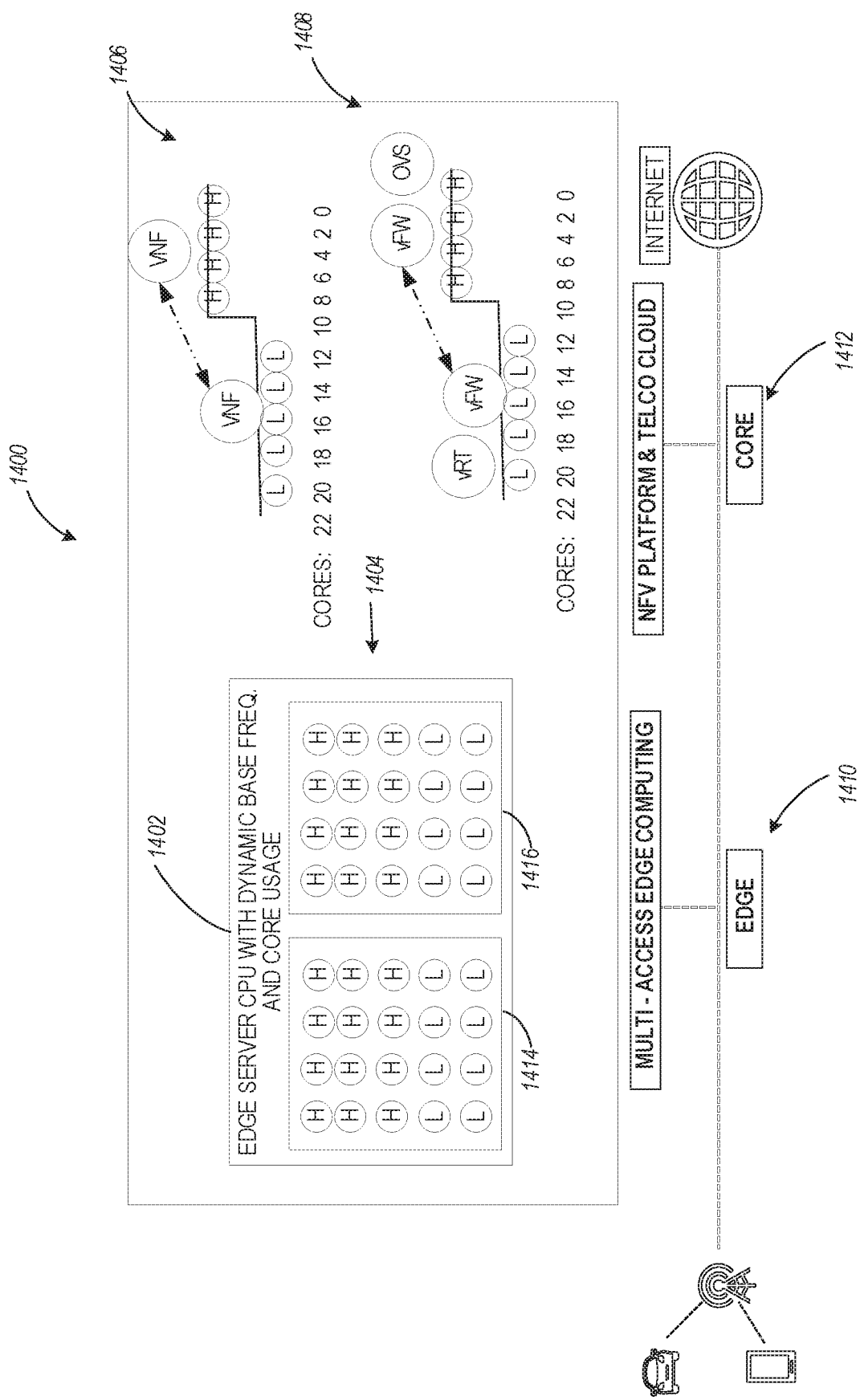
FIG. 14 illustrates a host device using an edge server CPU with dynamic base frequency and core usage, according to an example.

FIG. 14 illustrates a host device 1400 using an edge server CPU 1402 with dynamic base frequency and core usage, according to an example. Referring to FIG. 14, the host device 1400 can be used as a multiaccess Edge computing device near the edge 1410 or as a host device near the core (e.g., 5G core) 1412. In some aspects, the host device 1400 can include an edge server CPU 1402 which can be configured for dynamic base frequency and processor core usage in connection with techniques disclosed herein. Such techniques are also referred to herein as prioritized base frequency (PBF). More specifically, CPU 1402 can include a plurality of cores 1404, which can be separated into two processor core sets (e.g., a low priority core set including cores indicated as "L" and a high-priority core set including cores indicated as "H"). The plurality of cores 1404 can be located on one or more CPU sockets such as sockets 1414 and 1416.

In some aspects, the edge server CPU 1402 is configured to move processing of network traffic, VNFs (e.g., NFV instances), MEC apps, services, or other virtualized functions (e.g., a virtualized router or vRT function, a virtualized firewall or vFW function, and so forth) from the low priority processor core set to the high-priority processor core set based on one or more threshold values in connection with network telemetry parameters (e.g., as provided by a telemetry module as discussed above).

In some aspects, the threshold values can be set by communication service providers (CoSPs) based on the number of UE subscribers considering (latency, density, data quantity, workload—CDN, priority of traffic on an uplink from a UE to the network and vice versa, etc.). Orchestrators (e.g., Ericsson SDI Controller, proprietary or open source SDI, Simple Linux "top" command where a system administrator or a person monitoring the network can make decisions regarding the thresholds based on observing the load via the top command) can be configured to move the Virtual Network Function (VNF) based on whether the predetermined threshold is met (e.g., as seen at graph 1406).

In some aspects, edge server telemetry, including aggregate throughput, can be used in real-time to detect burst events further triggering a predetermined threshold (e.g., via a hardware or a software controller). In some aspects, the threshold can be set to the relative compute capacity of the server for a particular number of subscribers to prevent overflow (i.e., dropping UE subscribers). In some aspects, CoSPs can offer deterministic service level agreements (SLAs) to handle subscriber (UE) traffic/service (e.g., messaging, CDN, etc.) bursts. The mobile core/edge Virtual Network Function (handling subscriber capacity) can be configured to run in the high-priority cores (as seen in graph 1406).

In aspects when the subscriber traffic is low, then the VNF can move to the low priority cores, then back to the high priority cores if necessary, based on a predetermined threshold. The CPU can make the decision on how this transition occurs. For example, the CPU can detect the threshold changes and can change the core profile to respond to the threshold changes, thereby "moving" the VNF to different types of cores. In some aspects, a CoSP can specify a deterministic peak number of subscriber capacity but can benefit from lower utilization (power) when subscriber mobile service demand is lower. Graph 1406 illustrates subscriber VNF movement between different priority cores based on a predetermined threshold (e.g., a threshold number of subscribers, a threshold throughput value, a threshold service utilization for a network service the VNF is providing, and so forth).

Graph 1408 illustrates the same concept of using different priority cores but in connection with a virtual router (vRT) app, a virtual firewall (vFW) app, and an open virtual switch (OVS) app movement based on a predetermined threshold. In some aspects, such predetermined threshold can be associated with a number of users/UEs currently in communication with the host device 1400, network throughput at the host device 1400, detection of burst events, usage of network resources by VNFs or other virtual applications, and so forth. As illustrated by graph 1408, multiple VNFs on host device 1400 (e.g., an edge server) may span a group of high priority cores or low priority cores. Such VNFs may also "move" between using low-priority cores and high-priority cores based on a pre-determined threshold such as service utilization level (e.g., based on a number of subscribers to the service, a number of active connections used by the service, bandwidth usage, throughput, or other telemetry parameters or configurations that can be retrieved from a telemetry module (e.g., 406B).

A CPU performance example of efficiency savings is illustrated in Table 1 below, using a firewall application:

TABLE 1

| CPU | Freq. (GHz) | Cores | VM Cores | Encryption | Throughput | CPU Util. |
|---|---|---|---|---|---|---|
| 6130 | 2.1 | 16 | 2 | | | |
| 6230 | 2.1 | 20 | 2 | | | |
| 6230N | 2.3 | 20 | 2 | Sw | 0.7 | 91% |
| 6230N | 2.3 | 20 | 2 | Qat | 2 | 71% |
| 6230N-PBF | 2.7 | 20 | 2 | Sw | 0.81 | 85% |
| 6230N-PBF | 2.7 | 20 | 2 | qat | 2.3 | 64% |

As seen in the above Table 1, the use of an edge server CPU with dynamic deterministic scaling of processor cores (also referred to as Prioritized Base Frequency or PBF) introduces the capability of providing differentiated levels of base frequency within the system-on-a-chip (SoC), resulting in more efficient use of processor resources and increase throughput. In server deployments with a large number of cores, there is often a workload diversity that requires different levels of performance on cores. This is especially true in Infrastructure-as-a-Service (IaaS) server deployments where tenants run a variety of workloads on the same CPU. In legacy behavior, when the processor becomes power limited, running average power limited (RAPL) brings down the processor frequency uniformly across cores. While this technique may be simple, it does not allow the user the flexibility to keep a subset of cores at a higher frequency than others.

In some aspects, PBF techniques disclosed herein can be characterized by the following technical improvements: substantially the same power usage in comparison to non-PBF enabled CPUs; improved system performance for asymmetric workloads; reduced performance variability for high priority cores; flexibility of creating high priority VM offering; and overall TCO and revenue benefit.

With PBF, a CPU (e.g., 1402 in FIG. 14) stock-keeping unit (SKU) can be manufactured with specific cores designated as high priority (or "H cores") while other cores are designated as a lower priority (or "L cores"). In this regard, PBF can trade off the base frequency on low priority cores for base frequency on the high priority cores. The base frequency for the high/low priority cores can be denoted as P1Hi/Lo. Architecturally, the highest value for P1Hi is the value of P0n in the SKU, with no TDP increase or change to platform thermal solution for PBF. In some aspects, PBF can be implemented with the following features that can be enabled via BIOS and software.

In some aspects, there is a limited set of cores that can be H for a particular SKU (e.g., H range 6-12 H cores). CPU configuration could be either H or L from start (although some implementations may force an initial H core setting). The VNF (Virtual Network Function=Virtual Application) can be moved from H to L cores depending on pre-determined indicator (also can refer to as "busy indicator"). The 2nd set of cores can operate at low frequency. CPU config could be either H or L from start (although some implementations may force initial H core setting).

Figure 15:
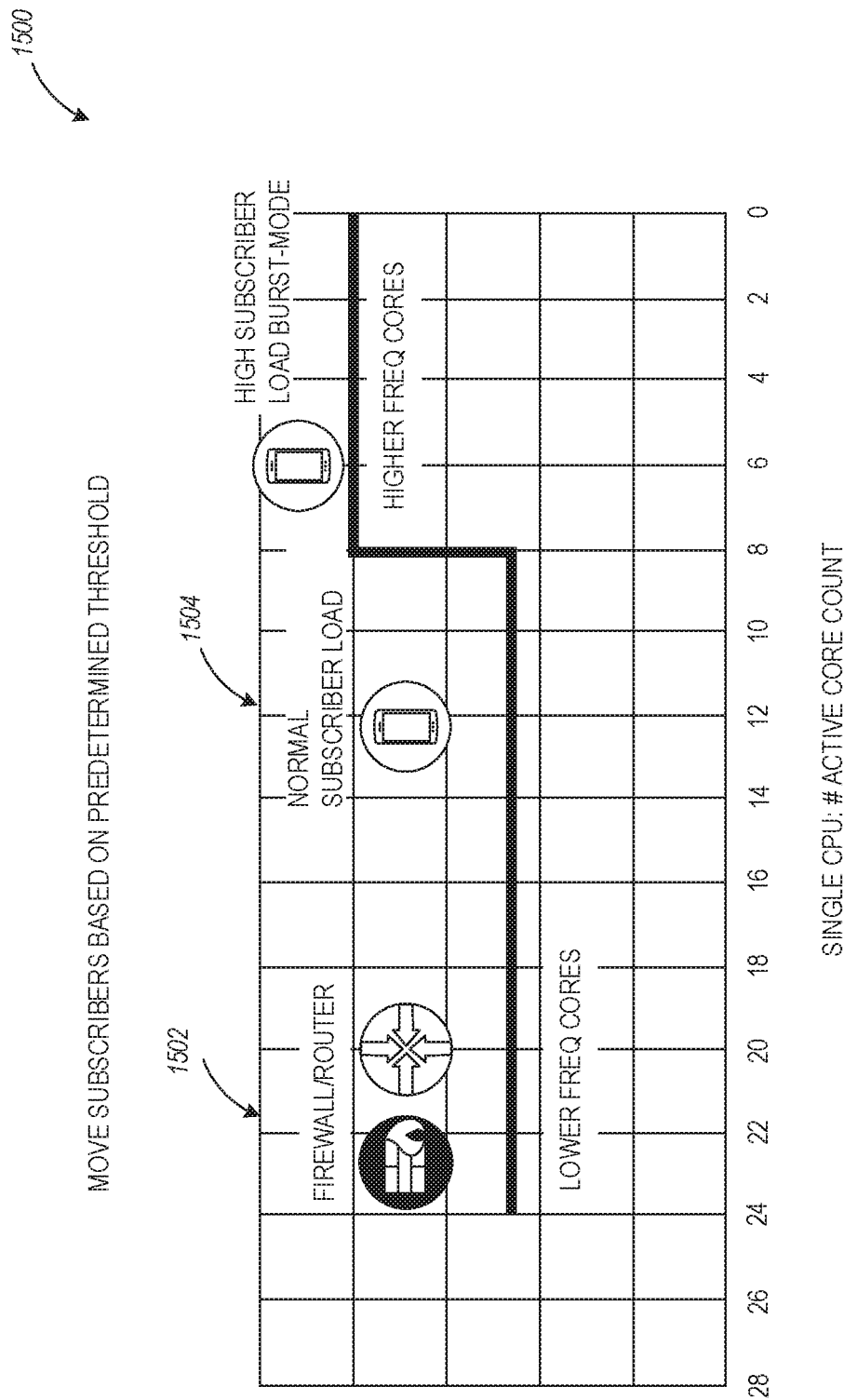
FIG. 15 illustrates moving subscriber applications between a lower frequency and higher frequency cores based on a predetermined threshold, according to an example.

FIG. 15 illustrates a diagram 1500 of moving subscriber applications between a lower frequency and higher frequency cores based on a predetermined threshold, according to examples. An edge server CPU disclosed herein can be configured with a CPU utilization threshold, including priorities of UEs or network traffic. More specifically, monitoring circuitry, such as a server telemetry module or another type of monitoring circuitry within the CPU or outside of the CPU and within the network host, can monitor CPU utilization and detect when CPU resources are utilized above the utilization threshold. Such utilization threshold can be exceeded, for example, in burst mode related processing performed by the CPU in connection with handling communication traffic or application processing, allowing server applications to achieve higher performance, such as increasing the processing number of UEs.

In some aspects, CPU burst mode related processing can take place with the increase of subscriber load, such as increased processing requirements associated with a given application, increased number of UE subscribers using the application, increased number of UE subscribers using different applications that are processed by the same CPU, and so forth. As illustrated in FIG. 15, firewall and router applications 1502 are illustrated as using the low-frequency cores, while a different application 1504 is moved from using the lower frequency cores to using the higher frequency cores based on a higher subscriber load and/or detection of burst mode processing. In this regard, the use of the low priority cores and the high priority cores can be dynamically adjusted (e.g., execution of the instantiated NFV instance for the app can be moved from high to low or vice versa) based on, e.g., utilization of a network service associated with the NFV as indicated by telemetry parameters such as network traffic associated with the NFV, number of subscribers associated with the network service provided by the NFV, a number of processor cores used for executing the NFV, processor core requirements for the NFV, and so forth.

Figure 16:
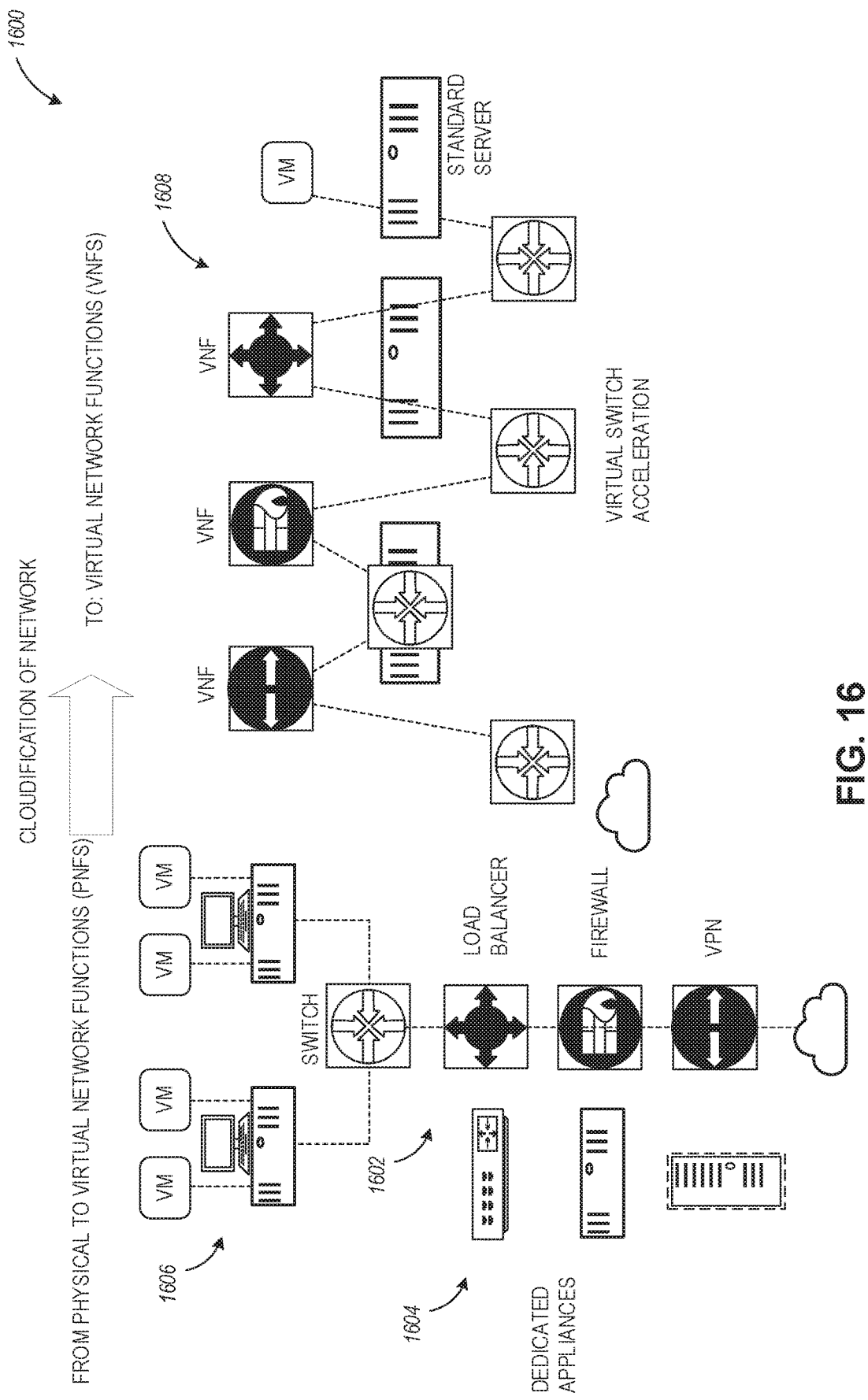
FIG. 16 illustrates cloudification of a network using an edge server with an edge server CPU with dynamic deterministic scaling, according to an example.

FIG. 16 illustrates the cloudification of a network using an edge server with an edge server CPU with dynamic deterministic scaling, according to an example. Referring to FIG. 16, diagram 1600 illustrates physical network functions (PNFs) 1602 executing on dedicated appliances 1604. In this regard, network services (which may be used by virtual machines 1606) are delivered by dedicated physical systems, such as the dedicated appliances 1604, including a load balancer, a firewall, and a VPN server rack, to name a few.

In an example, the illustrated communication network can be cloudified using PBF technology, including an edge server CPU with dynamic deterministic scaling as described herein. More specifically, VNFs 1608 can be used to deliver the network services (e.g., via NVF instances running on virtual machines) using standard servers. In this regard, the cloudification of the network takes place when physical network functions are transitions to virtual network functions. The processor core utilization of the standard server (or servers) executing the VNFs can be configured and managed using techniques discussed herein.

Figure 17:
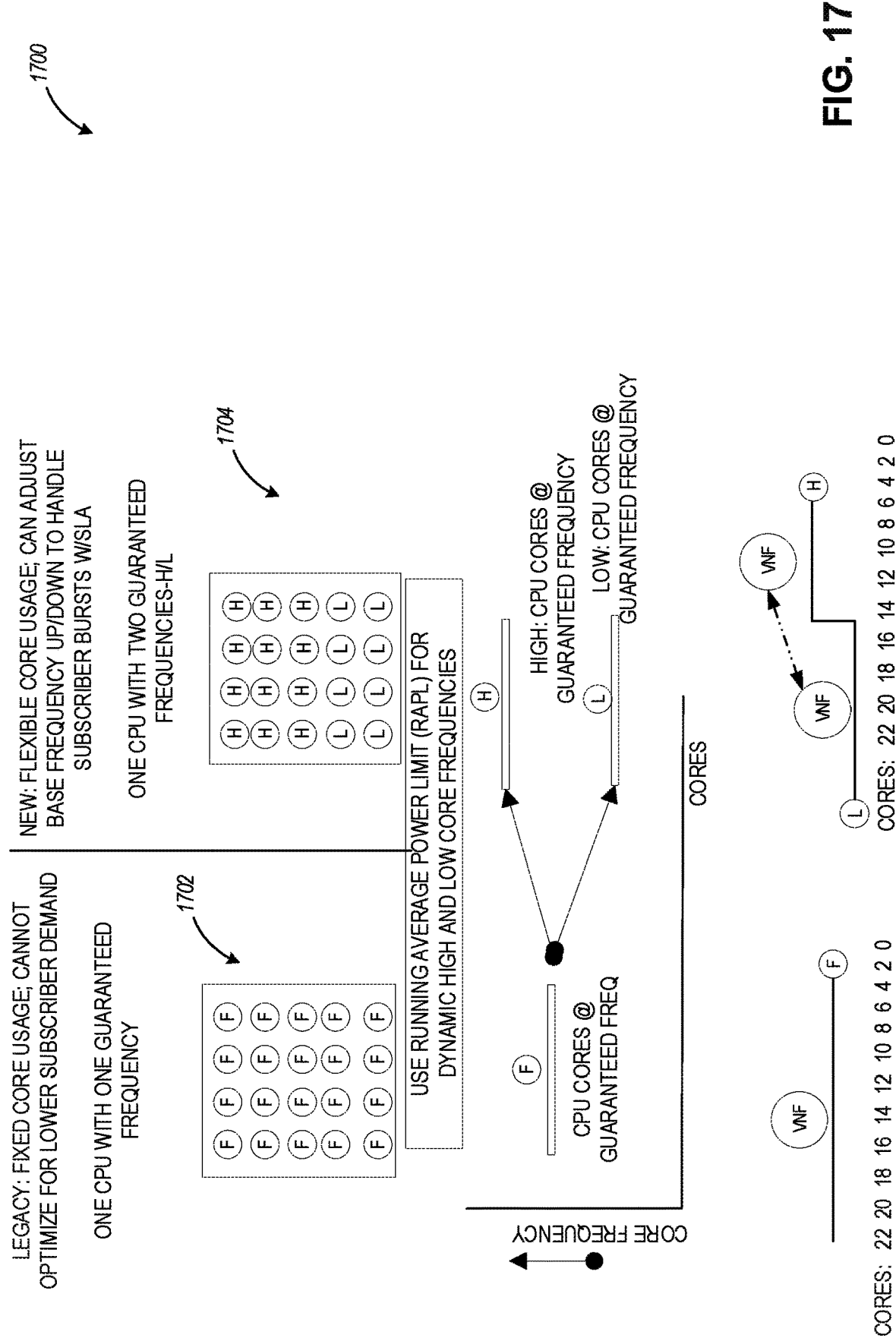
FIG. 17 illustrates a comparison between a legacy CPU with fixed core usage and an edge server CPU with dynamic deterministic scaling using multiple sets of cores with each set using a different base frequency, according to an example.

FIG. 17 illustrates a comparison diagram 1700 between a legacy CPU with fixed core usage and an edge server CPU with dynamic deterministic scaling using multiple sets of cores with each set using a different base frequency, according to an example. Referring to FIG. 17, diagram 1700 illustrates a legacy CPU 1702, which is associated with fixed core usage (all cores operate at a fixed base frequency), without the ability to optimize CPU processing for lower subscriber demand. In this regard, the legacy CPU 1702 can be characterized as a single CPU with a single guaranteed frequency (F) for its cores.

Diagram 1700 further illustrates an edge server CPU 1704 with dynamic deterministic scaling, which can be characterized by flexible core usage and the ability to adjust base frequency up or down in order to handle subscriber bursts (e.g., as can be configured based on a service level agreement). In this regard, the edge server CPU 1704 includes at least two sets of processor cores—a first set that is configured with a guaranteed higher frequency (H) and a second set that is configured with a guaranteed lower frequency (L) as their corresponding base frequencies. In some aspects, the H tier processor cores can be used to address subscriber data bursts at the edge. In some aspects, an MEC orchestrator or another type of MEC or 5G network entity, can move subscriber VNFs from the L tier to the H tier of processor cores based on one or more network telemetry characteristics exceeding a predetermined threshold, and then move the VNFs back down to the L tier when the one or more network telemetry characteristics fall below the predetermined threshold. In this regard, the H cores can be used to address subscriber data bursts at the edge.

Figure 18:
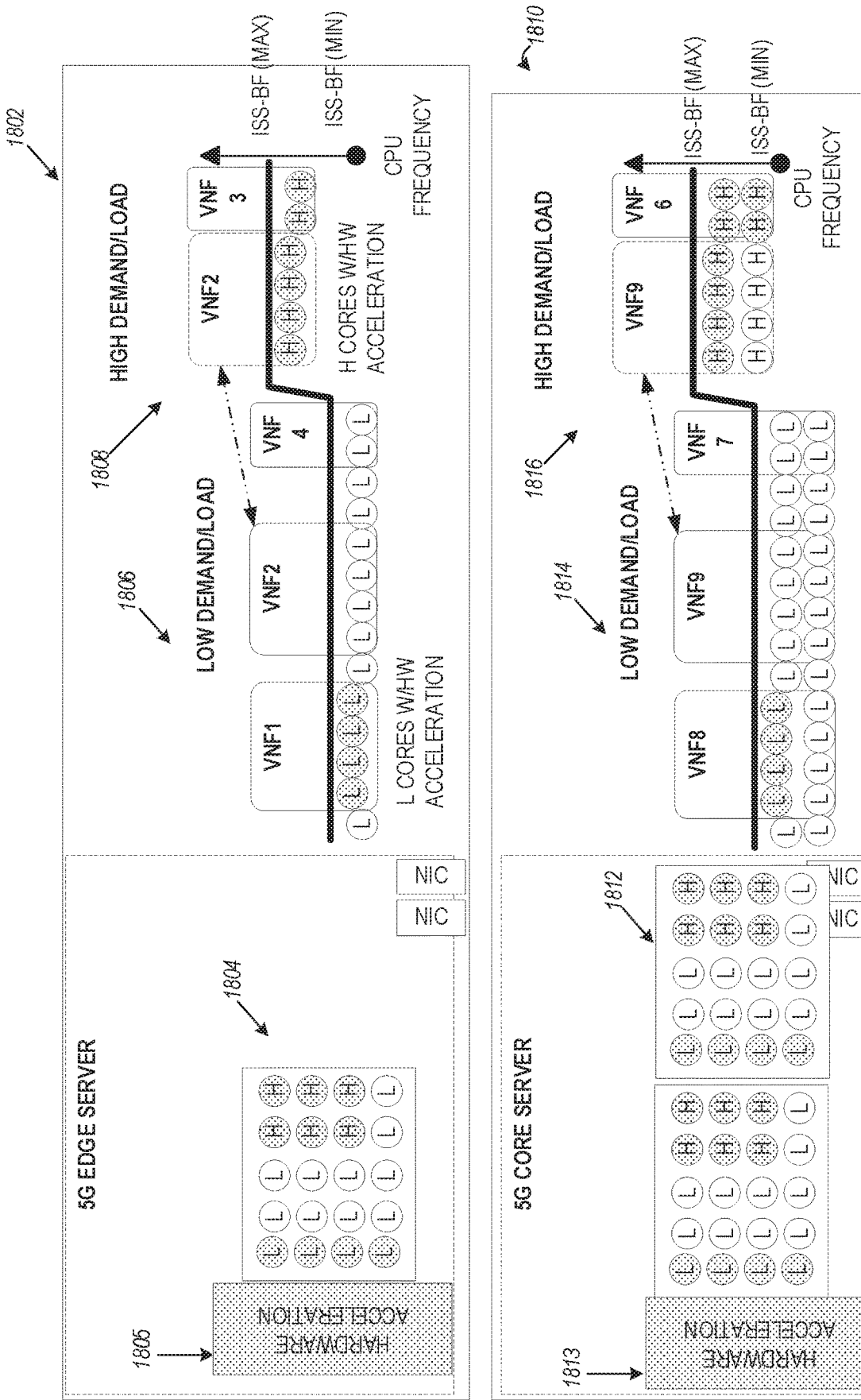
FIG. 18 illustrates a 5G edge server and a 5G core server executing multiple virtualized network functions (VNFs) on a lower frequency (L) cores or higher frequency (H) cores, according to an example.

FIG. 18 illustrates a 5G edge server and a 5G core server executing multiple virtualized network functions (VNFs) on a lower frequency (L) cores or higher frequency (H) cores, according to an example. Referring to FIG. 18, there is illustrated a 5G edge server 1802 and a 5G core server 1810. In some aspects, the 5G edge server 1802 can be an MEC host for implementing one or more MEC platform VNFs or other MEC-related functionalities (e.g., MEC platform manager, orchestrator, and so forth) within a 5G communication architecture (e.g., one or more of the architectures illustrated in connection with FIGS. 1A-11). The 5G edge server 1802 can be physically closer to end-users and can terminate wireless traffic. The 5G core server 1810 can be a host server performing one or more core network-related functionalities associated with the 5G core (e.g., 5G PCF, 5G SMF, 5G UPF, 5G AF, and so forth). The 5G core server 1810 can be in a data center at a telecommunications company or a cloud service provider location.

The 5G edge server 1802 can include a plurality of processor cores 1804, which can include L cores and H cores. In some aspects, the 5G edge server 1802 can instantiate and executed one or more VNFs using the plurality of processor cores 1804. For example, and as illustrated in FIG. 18, VNF1, VNF2, and VNF4 can be instantiated using the L cores 1806, and VNF3 can be instantiated using the H cores 1808. In some aspects, a VNF can be instantiated using one type of cores but can be moved to a different type of cores based on network demand, VNF resource utilization, and so forth (e.g., using core orchestration techniques disclosed herein). For example, VNF2 is initially instantiated using L cores 1806 but can subsequently be relocated so that it is using the H cores 1808.

The 5G core server 1810 can include a plurality of processor cores 1812, which can include L cores and H cores. In some aspects, the 5G core server 1810 can instantiate and execute one or more VNFs using the plurality of processor cores 1812. For example, and as illustrated in FIG. 18, VNF7 and VNF8 can be instantiated using the L cores 1814, while VNF6 can be instantiated using the H cores 1816. In some aspects, a VNF can be instantiated by the 5G core server using one type of cores but can be moved to a different type of cores based on network demand, VNF resource utilization, or other telemetry parameters that can be collected and provided by a telemetry module. For example, VNF9 is initially instantiated by the 5G core server 1810 using L cores 1814, but can subsequently be relocated so that it is using the H cores 1816 based on utilization or other factors. VNF9 can subsequently move back when, for example, the utilization (e.g., number of cores used by the VNF, number of subscribers to the service provided by the VNF, bandwidth used by the VNF, number of open connections maintained by the VNF, and so forth) falls below a threshold.

In some aspects, one or more of the cores 1804 (within the 5G edge server 1802) and 1812 (within the 5G core server 1810) can be accelerated using hardware acceleration (or HW-Acceleration) techniques provided by the accelerators 1805 and 1813 respectively. A VNF (e.g., Fortinet Forti-Gate-VM Application) can use HW-Acceleration using a group of either H or L cores. A security VNF can use the hardware security acceleration contained within Intel® QuickAssist Technology (or QAT) (i.e., https://www.intel-.com/content/www/us/en/architecture-and-technology/intel-quick-assist-technology-overview.html). In some aspect, VNF applications are accelerated by adding Intel® QAT to a software-defined infrastructure (SDI) environment, which provides a software-enabled foundation for security, authentication, and compression, and significantly increases the performance and efficiency of standard platform solutions. In this regard, using hardware acceleration (such as Intel® QAT) improves performance across applications and platforms, including symmetric encryption and authentication, asymmetric encryption, digital signatures, Rivest-Shamir-Adleman (RSA) cryptography, Diffie-Hellman key exchange (DH), Elliptic Curve Cryptography (ECC), and lossless data compression. As illustrated in FIG. 18, L cores 1806 used for VNF1 and H cores 1808 used for VNF2 can be hardware accelerated, and other cores can be accelerated as well. In some aspects, hardware acceleration can be activated using telemetry and core utilization information as well as a predetermined threshold, as discussed herein.

In some aspects, a VNF that is originally instantiated on the 5G edge server 1802 can be relocated to the 5G core server 1810, and vice versa. During the VNF move between the 5G edge server and the 5G core server, the core type usage by the VNF can also change. For example, a VNF that was instantiated at the 5G edge server 1802 using L cores can use L cores or H cores after the move. In some aspects, the VNF move between the 5G edge server and the 5G core server can be initiated and managed by a 5G core orchestrator or a 5G edge/MEC orchestrator.

Figure 19:
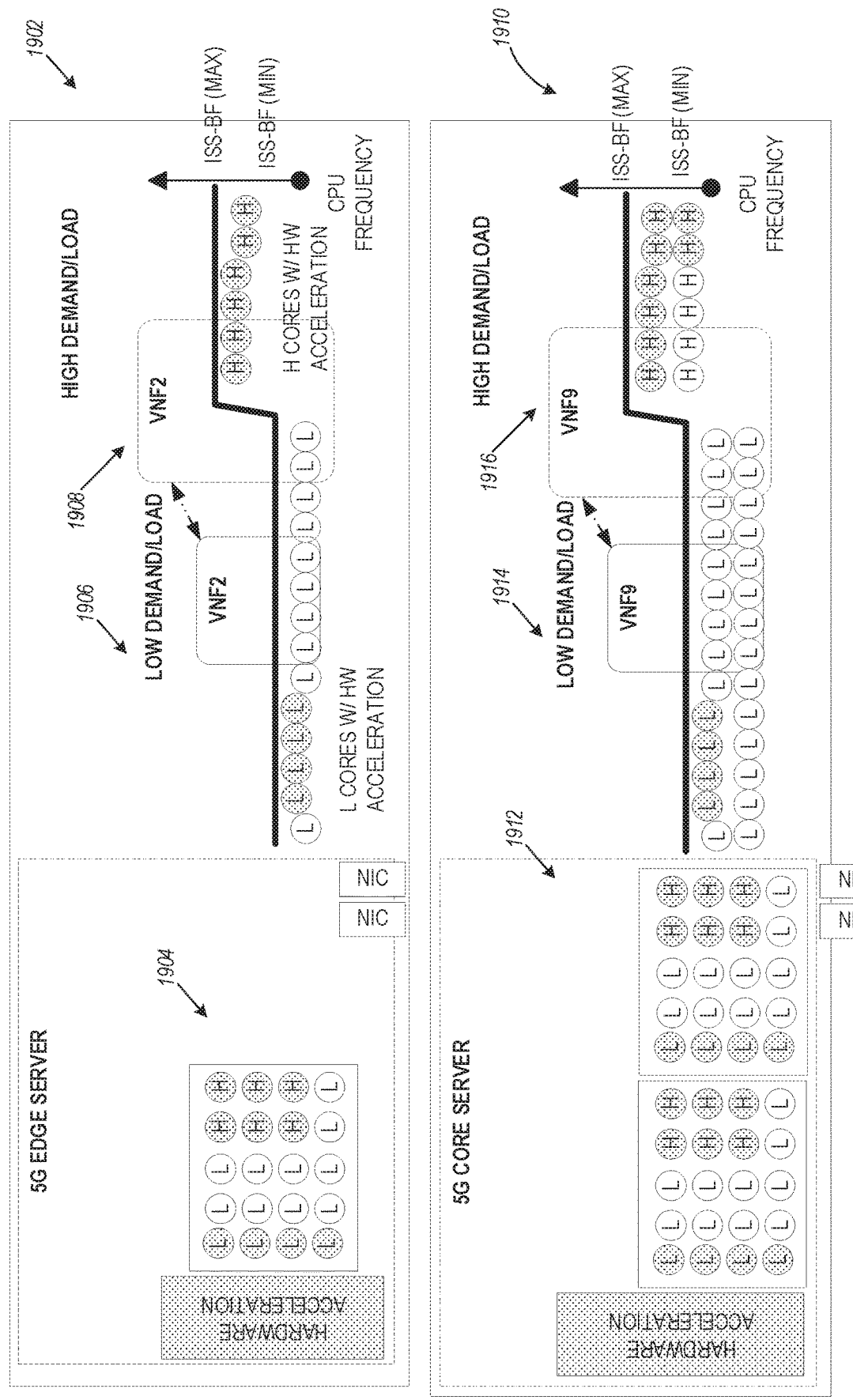
FIG. 19 illustrates a 5G edge server and a 5G core server executing VNFs that can span L cores and H cores, according to an example.

FIG. 19 illustrates a 5G edge server 1902 and a 5G core server 1910 executing VNFs that can span L cores and H cores, according to an example. The 5G edge server 1902 can be a MEC host for implementing one or more MEC platform VNFs or other MEC-related functionalities (e.g., MEC platform manager, orchestrator, and so forth) within a 5G communication architecture (e.g., one or more of the architectures illustrated in connection with FIGS. 1A-11). The 5G edge server 1902 can be physically closer to end-users and can terminate wireless traffic. The 5G core server 1910 can be a host server performing one or more core network-related functionalities associated with the 5G core (e.g., 5G PCF, 5G SMF, 5G UPF, 5G AF, and so forth). The 5G core server 1910 can be in a data center at a telecommunications company or a cloud service provider location.

The 5G edge server 1902 can include a plurality of processor cores 1904, which can include L cores 1906 and H cores 1908. In some aspects, the 5G edge server 1902 can instantiate and execute one or more VNFs using the plurality of processor cores 1904, with the VNF using both L and H cores. For example, and as illustrated in FIG. 19, while VNF2 was originally using the L cores 1906, VNF2 is moved at a later time to use a combination of both the L cores 1906 and the H cores 1908. Additionally, in aspects where a VNF uses both L and H cores within the 5G edge server 1902, one or more of the L and H cores used by the VNF can be hardware accelerated.

The 5G core server 1910 can include a plurality of processor cores 1912, which can include L cores 1914 and H cores 1916. In some aspects, the 5G core server 1910 can instantiate and execute one or more VNFs using the plurality of processor cores 1912 with the VNF using both L and H cores. For example, and as illustrated in FIG. 19, while VNF9 was originally using the L cores 1914, VNF9 is moved at a later time to use a combination of both the L cores 1914 and the H cores 1916. Additionally, in aspects where a VNF uses both L and H cores within the 5G core server 1910, one or more of the L and H cores used by the VNF can be hardware accelerated.

Figure 20:
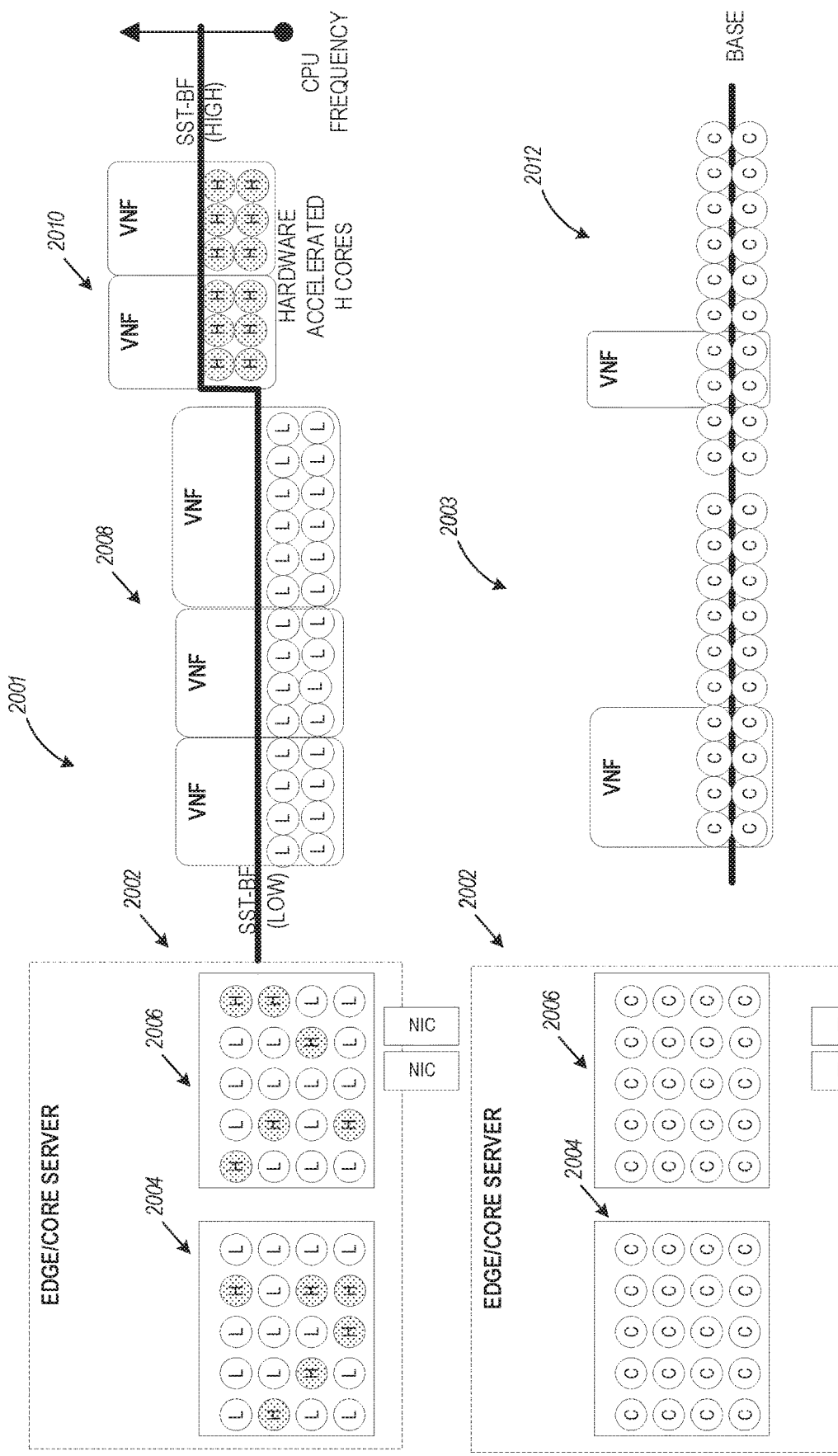
FIG. 20 illustrates 5G edge/core servers executing VNFs using processor cores that can operate in a core base frequency, or a combination of high and low base frequencies using CPUs with dynamic deterministic scaling, according to an example.

FIG. 20 illustrates 5G edge/core server executing VNFs using processor cores that can operate in a core base frequency, or a combination of high and low base frequencies using CPUs with dynamic deterministic scaling, according to an example. The 5G edge/core server 2002 can be a MEC host for implementing one or more MEC platform VNFs or other MEC-related functionalities (e.g., MEC platform manager, orchestrator, and so forth) within a 5G communication architecture, or a host server performing one or more core network-related functionalities associated with the 5G core (e.g., 5G PCF, 5G SMF, 5G UPF, 5G AF, and so forth). FIG. 20 illustrates two operating scenarios (2001 and 2003) for the server 2002.

The server 2002 includes a plurality of processor cores on CPU sockets 2004 and 2006, which (in operating scenario 2003) are configured at the same base frequency (also referred to as base center frequency). In this regard, VNFs 2012 executed by the server 2002 will use one or more of the processor cores from CPU sockets 2004 and 2006 operating at the same base frequency. Table 2 below illustrates 24 processor cores (e.g., the cores of server 2002), which are all configured to operate at the same base frequency of 2.3 GHz.

TABLE 2

Default base frequency enabled for all processor cores

| PROCESSOR CORE | BASE FREQ. (Hz) | MAX FREQ. (Hz) | MIN FREQ. (Hz) |
|---|---|---|---|
| 0 | 2300 | 3600 | 1000 |
| 1 | 2300 | 3600 | 1000 |
| 2 | 2300 | 3600 | 1000 |
| 3 | 2300 | 3600 | 1000 |
| 4 | 2300 | 3600 | 1000 |
| 5 | 2300 | 3600 | 1000 |
| 6 | 2300 | 3600 | 1000 |
| 7 | 2300 | 3600 | 1000 |
| 8 | 2300 | 3600 | 1000 |
| 9 | 2300 | 3600 | 1000 |
| 10 | 2300 | 3600 | 1000 |
| 11 | 2300 | 3600 | 1000 |
| 12 | 2300 | 3600 | 1000 |
| 13 | 2300 | 3600 | 1000 |
| 14 | 2300 | 3600 | 1000 |
| 15 | 2300 | 3600 | 1000 |
| 16 | 2300 | 3600 | 1000 |
| 17 | 2300 | 3600 | 1000 |
| 18 | 2300 | 3600 | 1000 |
| 19 | 2300 | 3600 | 1000 |
| 20 | 2300 | 3600 | 1000 |
| 21 | 2300 | 3600 | 1000 |
| 22 | 2300 | 3600 | 1000 |
| 23 | 2300 | 3600 | 1000 |

In some aspects (in connection with operating scenario 2001), server 2002 can be enabled to use dynamic processor core scaling using techniques discussed herein, so that the processor cores on sockets 2004 and 2006 are configured to operate at different base frequencies (L cores and H cores as illustrated in FIG. 20). Some of the L cores and/or the H cores can be hardware accelerated as previously discussed. VNFs 2008 can be instantiated using the L cores, and VNFs 2010 can be instantiated using the H cores. In some aspects, different subsets of the H and L cores can be hardware accelerated. Additionally, as illustrated in FIG. 20, the H and L cores can be randomly allocated within the sockets based on, e.g., manufacturing process.

Table 3 below illustrates example high or low base frequency assignment for the processor cores of server 2002 under the operating scenario 2001 when dynamic processor core scaling is enabled. As illustrated in Table 3, processor cores 0, 2, 11, 12, and 14-17 are the H cores as they are configured to operate at a high base frequency of 2.8 GHz, and the remaining processor cores are the L cores as they are configured to operate at a low base frequency of 2.1 GHz.

TABLE 3

High or low base frequency enabled for all processor cores

| PROCESSOR CORE | BASE FREQ. (Hz) | MAX FREQ. (Hz) | MIN FREQ. (Hz) |
|---|---|---|---|
| 0 | 2800 | 2800 | 2800 |
| 1 | 2100 | 2100 | 2100 |
| 2 | 2800 | 2800 | 2800 |
| 3 | 2100 | 2100 | 2100 |
| 4 | 2100 | 2100 | 2100 |
| 5 | 2100 | 2100 | 2100 |
| 6 | 2100 | 2100 | 2100 |
| 7 | 2100 | 2100 | 2100 |
| 8 | 2100 | 2100 | 2100 |
| 9 | 2100 | 2100 | 2100 |
| 10 | 2100 | 2100 | 2100 |
| 11 | 2800 | 2800 | 2800 |
| 12 | 2800 | 2800 | 2800 |
| 13 | 2100 | 2100 | 2100 |

TABLE 3-continued

High or low base frequency enabled for all processor cores

| PROCESSOR CORE | BASE FREQ. (Hz) | MAX FREQ. (Hz) | MIN FREQ. (Hz) |
| --- | --- | --- | --- |
| 14 | 2800 | 2800 | 2800 |
| 15 | 2800 | 2800 | 2800 |
| 16 | 2800 | 2800 | 2800 |
| 17 | 2800 | 2800 | 2800 |
| 18 | 2100 | 2100 | 2100 |
| 19 | 2100 | 2100 | 2100 |
| 20 | 2100 | 2100 | 2100 |
| 21 | 2100 | 2100 | 2100 |
| 22 | 2100 | 2100 | 2100 |
| 23 | 2100 | 2100 | 2100 |

In some aspects, in order to use L and/or H cores, a VNF can "pin" to a group of CPU cores (e.g., L cores, H cores, or a combination of L and H cores). As used herein, the term "pin" (or "pinning") a VNF to processor cores indicates assigning CPU cores used for running/executing the VNF (e.g., virtual CPUs used for executing the VNF) to low or high priority processor cores of a hardware device. In some aspects, a VNF can be statically assigned specific H cores, or L cores, or a combination of both H and L cores at the time of starting the VM associated with the VNF. Additionally, a VNF can be dynamically "pinned" to H or L cores using a taskset (or similar) Linux command. Within the VNF, cores can be distributed/assigned to different functions as needed. For example, FortiGate VNF provides the following command within the VNF, listed in Table 4 below, to assign a core (core mask 0xE) to a package redistribution function:

TABLE 4

```
config system affinity-packet-redistribution
edit 1
set interface portX
set affinity-cpumask "0xE"
next
```

In some aspects, the following pseudocode listed in Table 5 below can be used for pinning (e.g., assigning) L cores or H cores of server 2002 as virtual CPU cores associated with executing a VNF using H cores.

TABLE 5

```
<vcpu placetnent='static'>8</vcpu>
<cputune>
    <vcpupin vcpu='0' cpuset='0'/>
    <vcpupin vcpu='1' cpuset='2'/>
    <vcpupin vcpu='2' cpuset='11'/>
    <vcpupin vcpu='3' cpuset='12'/>
    <vcpupin vcpu='4' cpuset='14'/>
    <vcpupin vcpu='5' cpuset='15'/>
    <vcpupin vcpu='6' cpuset='16'/>
    <vcpupin vcpu='7' cpuset='17'/>
</cputune>
```

As seen from the above code, virtual CPUs 0-7 (e.g., CPUs associated with a virtual machine executing the VNF) are pinned to the H cores (0, 2, 11, 12, and 14-17). In some aspects, virtual CPUs can be pinned to a combination of H and L cores. In some aspects, virtual CPUs can be pinned and re-pinned dynamically, based on telemetry parameters discussed herein.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field-programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own or may be combined in any permutation or combination with any one or more of the other examples provided below or throughout the present disclosure.

Example 1 is a processing circuitry arrangement, comprising: processing circuitry, the processing circuitry comprising a plurality of processor cores operating at a center base frequency; and a memory device including instructions embodied thereon, wherein the instructions, which when executed by the processing circuitry, configure the processing circuitry to perform operations to: in response to a request for multi-frequency core operation, configure a first set of the plurality of processor cores to operate at a first modified base frequency and a second set of the plurality of processor cores to operate at a second modified base frequency; retrieve configuration information for a plurality of virtual central processing units (CPUs) of a virtual machine, the plurality of virtual CPUs executing a network function virtualization (NFV) instance instantiated as virtual service in an access network; and pin (e.g., assign) processor cores from the first set or the second set as the plurality of virtual CPUs to execute the NFV instance based on the retrieved configuration information.

In Example 2, the subject matter of Example 1 includes, wherein the first modified base frequency is lower than the center base frequency, and the second modified base frequency is higher than the center base frequency.

In Example 3, the subject matter of Examples 1-2 includes, wherein the configuration information includes a number of virtual CPUs of the plurality of virtual CPUs used for executing the NFV instance and a minimum operating frequency for the number of virtual CPUs.

In Example 4, the subject matter of Examples 1-3 includes, wherein pinning the processor cores is performed dynamically, to adjust a number of pinned processor cores from the first set or the second set based on the utilization of the virtual service within the access network. [0246]1 In Example 5, the subject matter of Examples 1-4 includes, wherein pinning the processor cores is further based on the utilization of the virtual service within the access network being above a utilization threshold.

In Example 6, the subject matter of Examples 2-5 includes, wherein the processing circuitry further performs operations to pin the processor cores from the first set as the plurality of virtual CPUs, based on utilization of the virtual service within the access network being below a utilization threshold.

In Example 7, the subject matter of Example 6 includes, wherein the processing circuitry further performs operations to re-pin the processor cores from the first set to the second set as the plurality of virtual CPUs, based on utilization of the virtual service within the access network being above the utilization threshold.

In Example 8, the subject matter of Examples 1-7 includes, wherein pinning the processor cores is based on network traffic or a number of UEs using the virtual service.

In Example 9, the subject matter of Examples 1-8 includes, wherein the virtual services include at least one of a virtual firewall service; a virtual router service; a virtual load balancer service; a virtual analytics service; a virtual control service; and a virtual management service.

In Example 10, the subject matter of Examples 1-9 includes, wherein the processing circuitry further performs operations to pin a subset of the first set and a subset of the second set as the plurality of virtual CPUs executing the virtual service, based on utilization of the virtual service within the access network.

In Example 11, the subject matter of Examples 1-10 includes, wherein at least one of the first set of processor cores and at least one of the second set of processor cores is hardware accelerated while executing the NFV instance.

In Example 12, the subject matter of Examples 1-11 includes, wherein the first set and the second set of the plurality of processor cores are randomly dispersed within at least one CPU socket, based on a CPU manufacturing process.

Example 13 is at least one non-transitory machine-readable storage medium including instructions, wherein the instructions, when executed by a processing circuitry of a service coordinating entity in an access network, cause the processing circuitry to perform operations comprising: configuring a first set of a plurality of processor cores of the processing circuitry to operate at a first modified base frequency and a second set of the plurality of processor cores to operate at a second modified base frequency, in response to a request for multi-frequency core operation; retrieving configuration information for a plurality of virtual central processing units (CPUs) of a virtual machine, the plurality of vCPUs executing a network function virtualization (NFV) instance instantiated as virtual service in the access network; and pinning processor cores from the first set or the second set as the plurality of virtual CPUs to execute the NFV instance based on the retrieved configuration information.

In Example 14, the subject matter of Example 13 includes, wherein the first modified base frequency is lower than the center base frequency, and the second modified base frequency is higher than the center base frequency.

In Example 15, the subject matter of Examples 13-14 includes, wherein the configuration information includes a number of virtual CPUs of the plurality of virtual CPUs used for executing the NFV instance and a minimum operating frequency for the number of virtual CPUs.

In Example 16, the subject matter of Examples 13-15 includes, wherein pinning the processor cores is performed dynamically, to adjust a number of pinned processor cores from the first set or the second set based on the utilization of the virtual service within the access network.

In Example 17, the subject matter of Examples 13-16 includes, wherein pinning the processor cores is further based on the utilization of the virtual service within the access network being above a utilization threshold.

In Example 18, the subject matter of Examples 14-17 includes, wherein the instructions further cause the processing circuitry to perform operations comprising: pinning the processor cores from the first set as the plurality of virtual CPUs, based on the utilization of the virtual service within the access network being below a utilization threshold.

In Example 19, the subject matter of Example 18 includes, wherein the instructions further cause the processing circuitry to perform operations comprising: re-pinning the processor cores from the first set to the second set as the plurality of virtual CPUs, based on utilization of the virtual service within the access network being above the utilization threshold.

In Example 20, the subject matter of Examples 13-19 includes, wherein pinning the processor cores is based on network traffic or a number of UEs using the virtual service.

In Example 21, the subject matter of Examples 13-20 includes, wherein the virtual services include at least one of a virtual firewall service; a virtual router service; a virtual load balancer service; a virtual analytics service; a virtual control service; and virtual management service.

In Example 22, the subject matter of Examples 13-21 includes, wherein the instructions further cause the processing circuitry to perform operations comprising: pinning a subset of the first set and a subset of the second set as the plurality of virtual CPUs executing the virtual service, based on utilization of the virtual service within the access network.

In Example 23, the subject matter of Examples 13-22 includes, wherein at least one of the first set of processor cores and at least one of the second set of processor cores is hardware accelerated while executing the NFV instance.

In Example 24, the subject matter of Examples 13-23 includes, wherein the first set and the second set of the plurality of processor cores are randomly dispersed within at least one CPU socket, based on a CPU manufacturing process.

Example 25 is a device of a service coordinating entity, comprising: communications circuitry to communicate with a first access network of a plurality of access networks; processing circuitry, the processing circuitry comprising at least a first set and a second set of processor cores operating at corresponding first and second base frequencies; and a memory device including instructions embodied thereon, wherein the instructions, which when executed by the processing circuitry, configure the processing circuitry to perform operations to: in response to a request for establishing a connection with one or more user equipments (UEs) in the first access network, instantiate a plurality of network function virtualization (NFV) instances using the first set of processor cores to communicate with the one or more UEs; monitor network traffic between the service coordinating entity and the one or more UEs in the first access network; and in response to the network traffic increasing above a first threshold value, transfer processing of the network traffic associated with the one or more UEs from the first set of processor cores to the second set of processor cores.

In Example 26, the subject matter of Example 25 includes, wherein the first set of processor cores is a low priority set of processor cores operating at the first base, the first base frequency being lower than the second base frequency.

In Example 27, the subject matter of Example 26 includes, wherein the second set of processor cores is a high priority set of processor cores operating at the second base, the second base frequency being higher than the first base frequency.

In Example 28, the subject matter of Example 27 includes, wherein at least one NFV instance of the plurality of NFV instances is hardware accelerated.

In Example 29, the subject matter of Examples 27-28 includes, wherein the service coordinating entity is a 5G edge server or a 5G core server.

In Example 30, the subject matter of Examples 27-29 includes, wherein at least one NFV instance of the plurality of NFV instances is initially instantiated using at least one of the first set of processor cores and is subsequently relocated to using at least one of the second set of processor cores.

In Example 31, the subject matter of Example 30 includes, wherein the at least one of the first set of processor cores or the at least one of the second set of processor cores is hardware accelerated.

In Example 32, the subject matter of Examples 30-31 includes, wherein the relocating of the at least one NFV is based on 5G network requirements.

In Example 33, the subject matter of Examples 27-32 includes, wherein at least one NFV instance of the plurality of NFV instances is instantiated using at least one of the first set of processor cores and at least one of the second set of processor cores.

In Example 34, the subject matter of Example 33 includes, wherein the at least one of the first set of processor cores or the at least one of the second set of processor cores is hardware accelerated.

In Example 35, the subject matter of Examples 25-34 includes, wherein the plurality of NFV instances are instantiated as virtual services, and the one or more UEs are subscribers to the virtual services.

In Example 36, the subject matter of Example 35 includes, wherein the virtual services include at least one of a virtual firewall service; a virtual router service; a virtual load balancer service; a virtual analytics service; a virtual control service; and a virtual management service.

In Example 37, the subject matter of Examples 35-36 includes, wherein the processing circuitry is further configured to transfer processing of the network traffic associated with the one or more UEs from the first set of processor cores to the second set of processor cores based on utilization of the virtual services by the one or more UEs being above a utilization threshold.

In Example 38, the subject matter of Examples 35-37 includes, wherein the processing circuitry is further configured to: transfer processing of the network traffic associated with the one or more UEs from a subset of the first set of processor cores to a subset of the second set of processor cores based on utilization of the virtual services by the one or more UEs being above a utilization threshold, wherein at least one of the virtual services is instantiated on multiple processor cores within the first set and the second set of processor cores.

In Example 39, the subject matter of Examples 35-38 includes, wherein the processing circuitry is further configured to: dynamically transfer processing of the network traffic associated with the one or more UEs between one or more of the first set of processor cores to one or more of the second set of processor cores based on a utilization threshold associated with utilization of the virtual services by the one or more UEs.

In Example 40, the subject matter of Examples 25-39 includes, wherein the first set of processor cores operates at frequencies below 1.9 GHz, and the second set of processor cores operates at frequencies below 2.6 GHz.

In Example 41, the subject matter of Examples 25-40 includes, wherein the processing circuitry is further configured to: in response to the network traffic decreasing below a second threshold value, transfer processing of the network traffic associated with the one or more UEs from the second set of processor cores to the first set of processor cores.

In Example 42, the subject matter of Examples 25-41 includes, wherein the processing circuitry is further configured to: monitor the network traffic in real-time using a server telemetry function.

In Example 43, the subject matter of Examples 25-42 includes, wherein the processing circuitry is further configured to monitor a number of the one or more UEs communicating with the service coordinating entity via the NFV instances; and in response to the number of the one or more UEs being above a third threshold, transfer processing of the network traffic associated with the one or more UEs from the first set of processor cores to the second set of processor cores.

In Example 44, the subject matter of Example 43 includes, wherein the processing circuitry is further configured to: in response to the number of the one or more UEs falling below a fourth threshold, transfer processing of the network traffic associated with the one or more UEs from the second set of processor cores to the first set of processor cores.

In Example 45, the subject matter of Examples 25-44 includes, wherein each NFV instance of the plurality of NFV instances is a Multi-Access Edge Computing (MEC) application executing on a virtualization infrastructure of the service coordinating entity.

In Example 46, the subject matter of Example 45 includes, wherein the MEC application is at least one of a virtual router (vRTR) application; a virtual firewall (vFW) application; a virtual load balancer (vLB) application; a virtual control (vControl) application; and a virtual management (vMGMT) application.

In Example 47, the subject matter of Examples 25-46 includes, wherein the service coordinating entity is a Multi-Access Edge Computing (MEC) host executing the plurality NFV instance as a corresponding plurality of MEC applications instantiated on a virtualization infrastructure of the service coordinating entity.

In Example 48, the subject matter of Example 47 includes, wherein the MEC host is configured to operate according to a standard from a European Telecommunications Standards Institute (ETSI) MEC standards family.

In Example 49, the subject matter of Examples 25-48 includes, wherein the plurality of access networks are wireless networks operating according to a 3GPP standards family, including a 5G communication standard.

Example 50 is at least one non-transitory machine-readable storage medium including instructions, wherein the instructions, when executed by a processing circuitry of a service coordinating entity in a first access network of a plurality of access networks, the processing circuitry comprising at least a first set and a second set of processor cores operating at corresponding first and second base frequencies, cause the processing circuitry to perform operations comprising: in response to a request for establishing a connection with one or more user equipments (UEs) in an access network of a plurality of available access networks, instantiate a plurality of network function virtualization (NFV) instances using the first set of processor cores or the second set of processor cores to communicate with the one or more UEs; monitor network traffic between the service coordinating entity and the one or more UEs in the first access network; and in response to the network traffic increasing above a first threshold value, transfer processing of the network traffic associated with the one or more UEs from a first set of processor cores to a second set of processor cores of the processing circuitry, wherein the first and second set of processor cores use different base frequencies.

In Example 51, the subject matter of Example 50 includes, wherein the first set of processor cores is a low priority set of processor cores operating at the first base, the first base frequency being lower than the second base frequency.

In Example 52, the subject matter of Examples 50-51 includes, wherein the second set of processor cores is a high priority set of processor cores operating at the second base, the second base frequency being higher than the first base frequency.

In Example 53, the subject matter of Examples 50-52 includes, wherein the first set of processor cores operates at frequencies below 1.9 GHz, and the second set of processor cores operates at frequencies below 2.6 GHz.

In Example 54, the subject matter of Examples 50-53 includes, wherein the instructions further cause the processing circuitry to perform operations comprising: in response to the network traffic decreasing below a second threshold value, transfer processing of the network traffic associated with the one or more UEs from the second set of processor cores to the first set of processor cores.

In Example 55, the subject matter of Examples 50-54 includes, wherein the instructions further cause the processing circuitry to perform operations comprising: monitor the network traffic in real-time using a server telemetry function.

In Example 56, the subject matter of Examples 50-55 includes, wherein the instructions further cause the processing circuitry to perform operations comprising: monitor a number of the one or more UEs communicating with the service coordinating entity via the NFV instances; and in response to the number of the one or more UEs being above a third threshold, transfer processing of the network traffic associated with the one or more UEs from the first set of processor cores to the second set of processor cores.

In Example 57, the subject matter of Example 56 includes, wherein the instructions further cause the processing circuitry to perform operations comprising: in response to the number of the one or more UEs falling below a fourth threshold, transfer processing of the network traffic associated with the one or more UEs from the second set of processor cores to the first set of processor cores.

In Example 58, the subject matter of Examples 50-57 includes, wherein each NFV instance of the plurality NFV instances is a Multi-Access Edge Computing (MEC) application executing on a virtualization infrastructure of the service coordinating entity.

In Example 59, the subject matter of Examples 50-58 includes, wherein the service coordinating entity is a Multi-Access Edge Computing (MEC) host executing the plurality of NFV instance as corresponding one or more MEC applications instantiated on a virtualization infrastructure of the service coordinating entity.

In Example 60, the subject matter of Example 59 includes, wherein the MEC host is configured to operate according to a standard from a European Telecommunications Standards Institute (ETSI) MEC standards family.

Example 61 is a Multi-Access Edge Computing (MEC) device, comprising: telemetry circuitry configured to monitor network traffic between the MEC device and a plurality of User Equipments (UEs) within a communication network of a plurality of communication networks; processing circuitry, the processing circuitry comprising at least a first set and a second set of processor cores operating at corresponding first and second base frequencies, the first base frequency being lower than the second base frequency; and a memory device coupled to the telemetry circuitry and the processing circuitry, the memory device including instructions embodied thereon, wherein the instructions, which when executed by the processing circuitry, configure the processing circuitry to perform operations to: detect, via the telemetry circuitry, a number of the UEs that are in communication with the MEC device via at least one network function virtualization (NFV) instance is above a first threshold value; and in response to the number of the UEs that are in communication with the MEC device being above the first threshold value, transfer processing of network traffic associated with the at least one NFV instance from the first set of processor cores to the second set of processor cores.

In Example 62, the subject matter of Example 61 includes, wherein the processing circuitry is further configured to: detect, via the telemetry circuitry, the number of the UEs that are in communication with the MEC device is below the first threshold value; and in response to the number of the UEs that are in communication with the MEC device being below the first threshold value, transfer processing of network traffic associated with the at least one NFV instance from the second set of processor cores to the first set of processor cores.

In Example 63, the subject matter of Examples 61-62 includes, wherein the processing circuitry is further configured to detect, via one or more telemetry indicators measured by the telemetry circuitry, the network traffic between the plurality of UEs and the MEC device is above a second threshold value; and in response to the network traffic between the plurality of UEs and the MEC device being above the second threshold value, transfer processing of the network traffic from the first set of processor cores to the second set of processor cores.

In Example 64, the subject matter of Example 63 includes, wherein the processing circuitry is further configured to detect, via the one or more telemetry indicators measured by the telemetry circuitry, the network traffic between the plurality of UEs and the MEC device is below the second threshold value; and in response to the network traffic between the plurality of UEs and the MEC device being below the second threshold value, transfer processing of the network traffic from the second set of processor cores to the first set of processor cores.

In Example 65, the subject matter of Examples 61-64 includes, wherein the at least one NFV instances is at least one Multi-Access Edge Computing (MEC) application executing on a virtualization infrastructure of the MEC device.

In Example 66, the subject matter of Example 65 includes, wherein the processing circuitry is further configured to detect, via the telemetry circuitry, a processor burst event associated with network traffic of the at least one MEC application; and in response to the detected processor burst event, transfer processing of the network traffic of the at least one MEC application between the first set of processor cores and the second set of processor cores.

Example 67 is at least one machine-readable medium including instructions that, when executed by processing circuitry, cause the processing circuitry to perform operations to implement of any of Examples 1-66.

Example 68 is an apparatus comprising means to implement of any of Examples 1-66.

Example 69 is a system to implement of any of Examples 1-66.

Example 70 is a method to implement of any of Examples 1-66.

Various modifications and changes may be made to disclosed aspects without departing from the broader scope of the present disclosure. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed aspects require more features than are expressly recited in each claim. Rather, as the following claims reflect, the inventive subject matter lies in less than all features of a single disclosed aspect. Thus the following claims are hereby incorporated into the Detailed Description, with each claim standing on its own as a separate aspect.

What is claimed is:

1. A processing circuitry arrangement, comprising:
processing circuitry, the processing circuitry comprising processor cores associated with a central processing unit (CPU) and operating at a center base frequency; and
a memory device including instructions embodied thereon, wherein the instructions, which when executed by the processing circuitry, configure the processing circuitry to perform operations to:
in response to a request for multi-frequency core operation, configure a first set of the processor cores of the CPU to switch the operating at the center base frequency to operating at a first modified base frequency, and a second set of the processor cores to switch the operating at the center base frequency to operating at a second modified base frequency;
retrieve configuration information for a plurality of virtual CPUs of a virtual machine, the plurality of virtual CPUs executing a network function virtualization (NFV) instance instantiated as a virtual service in an access network;
select based on the configuration information, a first subset of processor cores from the first set and a second subset of processor cores from the second set, wherein a same processor core within the first set or the second set is configured to switch operating between the first subset operating at the first modified base frequency and the second subset operating at the second modified base frequency based on utilization of the virtual service in the access network; and
assign the first subset of processor cores operating at the first modified base frequency and the second subset of processor cores operating at the second modified base frequency as the plurality of virtual CPUs to execute the NFV instance.

2. The processing circuitry arrangement of claim 1, wherein:
the processor cores within the CPU are configured to support multiple deterministic base frequencies, a number of the multiple deterministic base frequencies being greater than two; and
the configuration information includes a number of virtual CPUs of the plurality of virtual CPUs used for executing the NFV instance and a minimum operating frequency for the number of virtual CPUs.

3. The processing circuitry arrangement of claim 1, wherein assigning the processor cores is performed dynamically, to adjust a number of assigned processor cores from the first set or the second set based on utilization of the virtual service within the access network.

4. The processing circuitry arrangement of claim 1, wherein assigning the processor cores is further based on utilization of the virtual service within the access network being above a utilization threshold.

5. The processing circuitry arrangement of claim 1, wherein the first modified base frequency is lower than the center base frequency, and the second modified base frequency is higher than the center base frequency.

6. The processing circuitry arrangement of claim 5, wherein the processing circuitry further performs operations to:

assign the processor cores from the first set as the plurality of virtual CPUs, based on utilization of the virtual service within the access network being below a utilization threshold.

7. The processing circuitry arrangement of claim 6, wherein the processing circuitry further performs operations to:
re-assign the processor cores from the first set to the second set as the plurality of virtual CPUs, based on utilization of the virtual service within the access network being above the utilization threshold,
wherein a same processor core from the first set switches operating from the first modified base frequency to the second modified base frequency.

8. The processing circuitry arrangement of claim 1, wherein the operation to assign the processor cores is based on network traffic or a number of UEs using the virtual service.

9. The processing circuitry arrangement of claim 1, wherein the virtual service is a data plane service or a control plane service, including at least one of:
a virtual firewall service;
a virtual router service;
a virtual load balancer service;
a virtual analytics service;
a virtual control service; and
a virtual management service.

10. The processing circuitry arrangement of claim 1, wherein the processing circuitry further performs operations to:
assign a subset of the first set and a subset of the second set as the plurality of virtual CPUs executing the virtual service, based on utilization of the virtual service within the access network.

11. The processing circuitry arrangement of claim 1, wherein at least one of the processor cores is hardware accelerated while executing the NFV instance.

12. The processing circuitry arrangement of claim 1, wherein the first set and the second set of the processor cores are randomly dispersed within at least one CPU socket, based on a CPU manufacturing process.

13. At least one non-transitory machine-readable storage medium including instructions, wherein the instructions, when executed by a processing circuitry of a service coordinating entity in an access network, the processing circuitry comprising processor cores associated with a central processing unit (CPU) and operating at a center base frequency, cause the processing circuitry to perform operations comprising:
configuring a first set of the processor cores of the CPU to switch the operating at the center base frequency to operating at a first modified base frequency, and a second set of the processor cores to switch the operating at the center base frequency to operating at a second modified base frequency, in response to a request for multi-frequency core operation;
retrieving configuration information for a plurality of virtual central processing units (CPUs) of a virtual machine, the plurality of virtual CPUs executing a network function virtualization (NFV) instance instantiated as a virtual service in the access network;
selecting based on the configuration information, a first subset of processor cores from the first set and a second subset of processor cores from the second set, wherein a same processor core within the first set or the second set is configured to switch operating between the first subset operating at the first modified base frequency and the second subset operating at the second modified base frequency based on utilization of the virtual service in the access network; and
assigning the first subset of processor cores operating at the first modified base frequency and the second subset of processor cores operating at the second modified base frequency as the plurality of virtual CPUs to execute the NFV instance.

14. The at least one non-transitory machine-readable storage medium of claim 13, wherein the configuration information includes a number of virtual CPUs of the plurality of virtual CPUs used for executing the NFV instance and a minimum operating frequency for the number of virtual CPUs.

15. The at least one non-transitory machine-readable storage medium of claim 13, wherein assigning the processor cores is performed dynamically, to adjust a number of assigned processor cores from the first set or the second set based on utilization of the virtual service within the access network.

16. The at least one non-transitory machine-readable storage medium of claim 13, wherein assigning the processor cores is further based on utilization of the virtual service within the access network being above a utilization threshold.

17. The at least one non-transitory machine-readable storage medium of claim 13, wherein the first modified base frequency is lower than the center base frequency, and the second modified base frequency is higher than the center base frequency.

18. The at least one non-transitory machine-readable storage medium of claim 17, wherein the instructions further cause the processing circuitry to perform operations comprising:
assigning the processor cores from the first set as the plurality of virtual CPUs, based on utilization of the virtual service within the access network being below a utilization threshold.

19. A device of a service coordinating entity, comprising:
communications circuitry to communicate with a first access network of a plurality of access networks;
processing circuitry, the processing circuitry comprising at least a first set and a second set of processor cores operating at corresponding first and second base frequencies; and
a memory device including instructions embodied thereon, wherein the instructions, which when executed by the processing circuitry, configure the processing circuitry to perform operations to:
in response to a request for establishing a connection with one or more user equipments (UEs) in the first access network, instantiate a plurality of network function virtualization (NFV) instances using the first set of processor cores to communicate with the one or more UEs;
monitor network traffic between the service coordinating entity and the one or more UEs in the first access network; and
in response to the network traffic increasing above a first threshold value, transfer processing of the network traffic associated with the one or more UEs from the first set of processor cores to the second set of processor cores,
wherein a same processor core within the first set or the second set can be configured to switch operating between a first modified base frequency and a second modified base frequency based on the network traffic increasing above the first threshold value.

20. The device of claim 19, wherein the first set of processor cores is a low priority set of processor cores operating at the first base, the first base frequency being lower than the second base frequency.

21. The device of claim 20, wherein the second set of processor cores is a high priority set of processor cores operating at the second base, the second base frequency being higher than the first base frequency.

22. The device of claim 19, wherein the plurality of NFV instances are instantiated as virtual services, and the one or more UEs are subscribers to the virtual services.

23. The device of claim 22, wherein the processing circuitry is further configured to:
transfer processing of the network traffic associated with the one or more UEs from the first set of processor cores to the second set of processor cores based on at least one of the following: utilization of the virtual services by the one or more UEs being above a utilization threshold and traffic class or priority of the one or more UEs.

24. The device of claim 22, wherein the processing circuitry is further configured to:
transfer processing of the network traffic associated with the one or more UEs from a subset of the first set of processor cores to a subset of the second set of processor cores based on at least one of the following: utilization of the virtual services by the one or more UEs being above a utilization threshold and traffic class or priority of the one or more UEs,
wherein at least one of the virtual services is instantiated on multiple processor cores within the first set and the second set of processor cores.

25. The device of claim 22, wherein the processing circuitry is further configured to:
dynamically transfer processing of the network traffic associated with the one or more UEs between one or more processor cores of the first set and the second set based on a utilization threshold associated with utilization of the virtual services by the one or more UEs.

* * * * *

UNITED STATES PATENT AND TRADEMARK OFFICE
CERTIFICATE OF CORRECTION

PATENT NO. : 11,650,851 B2
APPLICATION NO. : 16/678888
DATED : May 16, 2023
INVENTOR(S) : Palermo et al.

It is certified that error appears in the above-identified patent and that said Letters Patent is hereby corrected as shown below:

In the Claims

In Column 59, Line 19, in Claim 23, after "following:", insert a linebreak

In Column 60, Line 6, in Claim 24, after "following:", insert a linebreak

Signed and Sealed this
Twentieth Day of August, 2024

Katherine Kelly Vidal
*Director of the United States Patent and Trademark Office*